(12) United States Patent
Nakayama et al.

(10) Patent No.: US 7,183,740 B2
(45) Date of Patent: Feb. 27, 2007

(54) MOTOR DRIVE APPARATUS, VEHICLE HAVING THE SAME MOUNTED THEREIN, AND COMPUTER READABLE STORAGE MEDIUM HAVING A PROGRAM STORED THEREIN TO CAUSE COMPUTER TO CONTROL VOLTAGE CONVERSION

(75) Inventors: Hiroshi Nakayama, Toyota (JP); Tomohiro Saitou, Obu (JP); Tadaichi Matsumoto, Okazaki (JP); Shigeto Kajiwara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/538,068

(22) PCT Filed: May 19, 2004

(86) PCT No.: PCT/JP2004/007159

§ 371 (c)(1),
(2), (4) Date: Jun. 9, 2005

(87) PCT Pub. No.: WO2004/114511

PCT Pub. Date: Dec. 29, 2004

(65) Prior Publication Data

US 2006/0055349 A1  Mar. 16, 2006

(30) Foreign Application Priority Data

Jun. 5, 2003 (JP) ............................. 2003-161052

(51) Int. Cl.
*H02P 23/00* (2006.01)

(52) U.S. Cl. ...................... 318/798; 318/806; 318/811; 318/801

(58) Field of Classification Search ................ 318/798, 318/806, 811, 801; 363/98, 40; 327/283
See application file for complete search history.

(56) References Cited

U.S. PATENT DOCUMENTS

| 5,373,195 | A | | 12/1994 | De Doncker et al. |
| 6,091,615 | A | * | 7/2000 | Inoshita et al. ............... 363/98 |
| 6,268,754 | B1 | * | 7/2001 | Sakuma et al. ............. 327/283 |
| 2003/0035305 | A1 | * | 2/2003 | Arai et al. ..................... 363/17 |

FOREIGN PATENT DOCUMENTS

| JP | A 04-145808 | 5/1992 |
| JP | A 7-115730 | 5/1995 |
| JP | A 08-214592 | 8/1996 |
| JP | A 09-163630 | 6/1997 |
| JP | A 11-235022 | 8/1999 |
| JP | A 2000-036308 | 2/2000 |
| JP | A 2002-171606 | 6/2002 |
| JP | A 2002-369505 | 12/2002 |
| JP | A 2003-111203 | 4/2003 |

\* cited by examiner

*Primary Examiner*—Karen Masih
(74) *Attorney, Agent, or Firm*—Oliff & Berridge, PLC

(57) ABSTRACT

A control device receives a power supply current from a current sensor and a reactor current from a current sensor and detects a maximum value and a minimum value from the reactor current and from the detected maximum and minimum values and the power supply current determines whether the reactor current traverses the zero point, and if so the control device generates and outputs a signal to an up converter which responds to the signal by stopping switching to perform an up or down converting operation.

21 Claims, 40 Drawing Sheets

MOTOR DRIVE APPARATUS, VEHICLE HAVING THE SAME MOUNTED THEREIN, AND COMPUTER READABLE STORAGE MEDIUM HAVING A PROGRAM STORED THEREIN TO CAUSE COMPUTER TO CONTROL VOLTAGE CONVERSION

TECHNICAL FIELD

The present invention relates generally to motor drive apparatuses, and particularly to motor drive apparatuses capable of reducing switching noise, vehicles having the same mounted therein, and computer readable storage media having a program stored therein to cause a computer to control voltage conversion contributing to reduced switching noise.

BACKGROUND ART

Recently, hybrid vehicles and electric vehicles are increasingly noted as environmentally conscious vehicles, and some hybrid vehicles are commercially available.

The hybrid vehicle is a vehicle having as a power source a conventional engine and in addition thereto a DC power supply, an inverter, and a motor driven by the inverter. In other words, the engine is driven to obtain a power source and furthermore the DC power supply provides a DC voltage which is in turn converted by the inverter to an AC voltage which is used to rotate the motor to obtain a power source.

Electric vehicles are vehicles having as a power source a DC power supply, an inverter and the motor driven by the inverter.

For such a hybrid or electric vehicle it has also been considered to up-convert a DC voltage received from a DC power supply by an up converter and supply the up-converted DC voltage to an inverter driving a motor (Japanese Patent Laying-Open No. 8-214592).

More specifically, the hybrid or electric vehicle has a motor drive apparatus, as shown in FIG. 42, mounted therein. With reference to FIG. 42, a motor drive apparatus 400 includes a DC power supply B, system relays SR1, SR2, capacitors C1, C2, a bidirectional converter 310, a voltage sensor 320, and an inverter 330.

DC power supply B outputs a DC voltage. System relays SR1, SR2 are turned on by a control device (not shown) to supply the DC voltage received from DC power supply B to capacitor C1. Capacitor C1 smoothes the supplied DC voltage and supplies the smoothed DC voltage to bidirectional converter 310.

Bidirectional converter 310 includes a reactor L1, NPN transistors Tr1, Tr2, and diodes D1, D2. Reactor L1 has one end connected to a power supply line of DC power supply B and the other end to a point intermediate between NPN transistors Tr1 and Tr2, i.e., between the emitter of NPN transistor Tr1 and the collector of NPN transistor Tr2. NPN transistors Tr1 and Tr2 are connected in series between the power supply line and an earth line. NPN transistor Tr1 has a collector connected to the power supply line and NPN transistor Tr2 has an emitter connected to the earth line. Furthermore between the collectors and emitters of NPN transistors Tr1 and Tr2, respectively, diodes D1 and D2, respectively, passing a current from their corresponding emitters to collectors, respectively, are arranged.

Bidirectional converter 310 is controlled by a control circuit (not shown) to turn on/off NPN transistors Tr1, Tr2 to up convert the DC voltage supplied from capacitor C1 and supply an output voltage to capacitor C2. Furthermore, when the hybrid or electric vehicle with motor drive apparatus 400 mounted therein is regeneratively braked, bidirectional converter 310 down-converts a DC voltage generated by an AC motor M1 and converted by inverter 330 and supplies the voltage to DC power supply B.

Capacitor C2 smoothes the DC voltage supplied from bidirectional converter 310 and supplies the smoothed DC voltage to inverter 330. Voltage sensor 320 detects a voltage across capacitor C2 i.e., a voltage Vm output from bidirectional converter 310.

When inverter 330 receives DC voltage from capacitor C2, inverter 330 is controlled by a control device (not shown) to convert the DC voltage to an AC voltage to drive AC motor M1. Thus AC motor M1 is driven to generate a torque designated by a torque command value.

Furthermore when the hybrid or electric vehicle with motor drive apparatus 400 mounted therein is regeneratively braked, inverter 330 is controlled by the control device to convert an AC voltage generated by AC motor M1 to a DC voltage and supply the converted DC voltage via capacitor C2 to bidirectional converter 310.

Thus in motor drive apparatus 400 when AC motor M1 is driven DC power supply B provides a DC voltage which is in turn up-converted and supplied to inverter 330 and when AC motor M1 is regenerated AC motor M1 generates a DC voltage which is in turn converted by inverter 330, and down-converted and supplied to DC power supply B.

Conventional motor drive apparatuses, however, determines from an AC motor's load in magnitude whether to permit or prohibit up conversion control and down conversion control. As such, up conversion control or down conversion control is also effected for a range for which a reactor current inverts in polarity, resulting in disadvantageously increased switching noise and switching loss attributed to NPN transistors Tr1 and Tr2.

With reference to FIGS. 43 and 44 a conventional disadvantage will now be more specifically described. FIG. 43 is timing plots of a reactor current IL uninverted in polarity, currents ITr1 and Itr2 passing through NPN transistors Tr1 and Tr2, and currents ID1 and ID2 passing through diodes D1 and D2. FIG. 44 are timing plots of reactor current IL inverted in polarity, and currents ITr1 and ITr2 passing through NPN transistors Tr1 and Tr2, and currents ID1 and ID2 passing through diodes D1 and D2.

With reference to FIG. 43 shows a case in which the reactor current uninverted in polarity is a positive reactor current IL, i.e., bidirectional converter 310 performs an up-converting operation. A period from time t1 to time t2 corresponds to one cycle of controlling NPN transistors Tr1 and Tr2 in the up-converting operation.

From time t1 through time t3 NPN transistor Tr2 is turned on and a DC current flows through a circuit formed of DC power supply B, reactor L1 and NPN transistor Tr2 from DC power supply B toward NPN transistor Tr2 (hereinafter this direction will be referred to as a positive direction) and reactor L1 stores power. In other words, during this period, current ITr2 flowing through NPN transistor Tr2 increases and so does reactor current IL. At time t3 NPN transistor Tr2 is turned off and NPN transistor Tr1 is turned on. In response, current ITr2 decreases to 0 A and from time t3 through time t2 a DC current flows from reactor L1 via diode D1 toward capacitor C2 in accordance with the power stored in reactor L1.

In that case, current ID1 flowing through diode D1 gradually decreases as time t2 is approached. Accordingly, reactor current IL also decreases as time t2 is approached.

Consequently for the one cycle from time t1 to time t2 NPN transistor Tr1 and diode D2 do not conduct and currents ITr1 and ITr2 are 0 A. Furthermore in this one cycle NPN transistors Tr1, Tr2 are switched only at time t3.

Such an operation is repeated and bidirectional converter 310 performs the up-converting operation, and power supply current Ib output from DC power supply B will be a current corresponding reactor current IL averaged.

With reference to FIG. 44, for the reactor current inverted in polarity, from time t1 through time t4 NPN transistor Tr2 is turned on and at time t4 NPN transistor Tr2 is turned off and NPN transistor Tr1 is turned on. Accordingly from time t1 through time t4 a DC current flows in the positive direction through a circuit formed of DC power supply B, reactor L1 and NPN transistorTr2 and reactor L1 stores power. More specifically in this period current ITr2 flowing through NPN transistor Tr2 increases and reactor current IL also increases. At time t4 NPN transistor Tr2 is turned off and NPN transistor Tr1 is turned on, and current ITr2 decreases to 0 A, and from time t4 through time t5 a DC current flows from reactor L1 via diode D1 toward capacitor C2 in accordance with power stored in reactor L1.

In that case, current ID1 flowing through diode D1 gradually decreases as time t5 is approached. Accordingly, reactor current IL also decreases as time t5 is approached.

At time t5, reactor current IL switches in polarity from positive to negative. In other words, bidirectional converter 310 performs a down-converting operation. Accordingly, from time t5 through time t6 a DC current flows in a direction from capacitor C2 via NPN transistor Tr1 to DC power supply B, and during this period, current ITr1 flowing through NPN transistor Tr1 increases in a negative direction and reactor current IL flowing in the negative direction increases.

Subsequently at time t6 NPN transistor Tr1 is turned off and NPN transistor Tr2 is turned on. In response, current ITr1 decreases to 0 A (indicating that the current flowing in the negative direction decreases) and a circuit formed of DC power supply B, diode D2 and reactor L1 passes a DC current in the negative direction, and current ID2 flowing through diode D2 decreases as time t2 is approached, and reactor current IL also decreases (indicating that a current flowing in a direction from NPN transistor Tr2 toward DC power supply B decreases).

Consequently for the one cycle from time t1 through time t2 NPN transistors Tr1, Tr2 are switched at time t4 and time t6.

Such an operation is repeated and bidirectional converter 310 performs up-converting and down-converting operations. DC power supply B receives/outputs power supply current Ib, which is a current corresponding to reactor current IL averaged and in this case it is 0 A.

As has been described above, NPN transistors Tr1, Tr2 with reactor current IL uninverted in polarity are switched only once during the 1-cycle control period and with reactor current IL inverted in polarity are switched twice in the period.

In other words, a range for which the motor's load reduces and the reactor current's polarity is inverted is also accompanied by an increased frequency of switching of the NPN transistors configuring the bidirectional converter if typical up-converting and down-converting operations are performed. As they switch more frequently, the NPN transistors generate noise more frequently and thus increasingly. Furthermore, as they switch more frequently, the transistors also provide increased switching loss.

DISCLOSURE OF THE INVENTION

The present invention has been made to overcome such disadvantage and contemplates a motor drive apparatus capable of reducing switching noise.

Furthermore the present invention also contemplates a vehicle having mounted therein a motor drive apparatus capable of reducing switching noise.

Furthermore the present invention also contemplates a computer readable storage medium having a program stored therein to cause a computer to control voltage conversion capable of reducing switching noise.

The present motor drive apparatus includes: an inverter driving a motor; a voltage converter including a switching element and a reactor and having the switching element switched to convert a DC voltage between a power supply and the inverter; and a control circuit controlling the voltage converter to stop the switching element from switching when the reactor passes a current traversing the zero point.

Furthermore the present motor drive apparatus includes: a drive device driving a motor; a voltage converter including a switching element and a reactor and having the switching element switched to convert a voltage between a power supply and the drive device; and a control circuit controlling the voltage converter to stop the switching element from switching when the reactor passes a current traversing the zero point while the current varies.

Preferably the control circuit makes a decision from a power supply current input to and output from the power supply and maximum and minimum values of the reactor's current as to whether to stop the switching element from switching and is driven by the decision to control the voltage converter to stop the switching element from switching to perform an up or down converting operation.

Preferably the motor drive apparatus further includes: a first current sensor detecting the power supply current; and a second current sensor detecting the reactor's current, wherein from the reactor's current detected by the second current sensor the control circuit detects maximum and minimum values of the reactor's current and makes a decision from the maximum and minimum values detected and a power supply current detected by the first current sensor as to whether to stop the switching element from switching.

Preferably when the maximum and minimum values are different in polarity and the power supply current flows from the power supply to the voltage converter the control circuit controls the voltage converter to stop the up converting operation.

Preferably when the maximum and minimum values are different in polarity and the power supply current flows from the voltage converter to the power supply the control circuit controls the voltage converter to stop the down converting operation.

Preferably the control circuit makes a decision from a current input to and output from the voltage converter as to whether to stop the switching element from switching and is driven by the decision to control the voltage converter to stop the switching element from switching.

Preferably when the reactor's current does not traverse the zero point the control circuit further controls the voltage converter to have the switching element switched to perform an up or down converting operation.

Preferably the control circuit makes a decision from a mode of operation of the motor and maximum and minimum values of the reactor's current as to whether to stop the switching element from switching and is driven by the decision to control the voltage converter to stop the switching element from switching to perform an up or down converting operation.

Preferably the control circuit makes a decision from a mode of operation of the motor and a power supply current required for the motor to output required power as to whether to stop the switching element from switching and is driven by the decision to control the voltage converter to stop the switching element from switching to perform an up or down converting operation.

Preferably the control circuit makes a decision from a power supply current required for the motor to output required power as to whether to stop the switching element from switching and when the power supply current required is zero the control circuit controls the voltage converter to stop the switching element from switching.

Preferably the control circuit makes a decision from a mode of operation of the motor and a torque required for the motor as to whether to stop the switching element from switching and is driven by the decision to control the voltage converter to stop the switching element from switching to perform an up or down converting operation.

Preferably the control circuit makes a decision from an acceleration pedal position of a vehicle having the motor drive apparatus mounted therein, a mode of operation of the motor, and a torque required for the motor as to whether to stop the switching element from switching and is driven by the decision to control the voltage converter to stop the switching element from switching to perform an up or down converting operation.

Furthermore the present motor drive apparatus includes: a drive device driving a motor; a power generation device generating power; a power generation drive device driving the power generation device; a voltage converter including a switching element and a reactor and having the switching element switched to convert DC voltage between a power supply, and the drive device, the power generation device and the power generation drive device; and a control circuit controlling the voltage converter to stop the switching element from switching while an amount of power supplied via the voltage converter from the drive device, the power generation device and the power generation drive device toward the power supply to charge the power supply is smaller than a power loss value in the voltage converter.

Preferably the amount of power charging the power supply is determined by a load command of the drive device, power consumed by the power generation drive device, and power generated by the power generation device.

Furthermore the motor drive apparatus includes: a drive device driving a motor; a power generation device generating power; a power generation drive device driving the power generation device; a voltage converter including a switching element and a reactor and having the switching element switched to convert DC voltage between a power supply, and the drive device, the power generation device and the power generation drive device; and a control circuit controlling the voltage converter to stop the switching element from switching while an amount of a current supplied via the voltage converter from the drive device, the power generation device and the power generation drive device toward the power supply to charge the power supply is smaller than a current loss value in the voltage converter.

Preferably the motor drive apparatus further includes a current sensor detecting the amount of current charging the power supply.

Furthermore the present invention provides a vehicle including: a wheel; a motor driving the wheel; and the motor drive apparatus of any of claims 1–16 driving the motor.

Furthermore the present invention provides a computer readable storage medium having a program stored therein for causing a computer to control voltage conversion between a power supply and a drive device driving a motor, the program causing the computer to execute: a first step of making a decision as to whether a current flowing through a reactor included in a voltage converter effecting the voltage conversion traverses the zero point; and when the reactor's current traverses the zero point, a second step of controlling the voltage converter to stop a switching element included in the voltage converter from switching while the reactor's current varies while traversing the zero point.

Furthermore the present computer readable storage medium having a program recorded therein for causing a computer to control voltage conversion in a motor drive apparatus, wherein: the motor drive apparatus includes a drive device driving a motor, a power generation device generating power, a power generation drive device driving the power generation device, and a voltage converter converting voltage between a power supply, and the drive device, the power generation device and the power generation drive device; and the program causes a computer to execute a first step of making a decision as to whether an amount of power supplied from the drive device, the power generation device and the power generation drive device toward the power supply to charge the power supply is smaller than a power loss value in the voltage converter, and for the amount of power smaller than the power loss value, a second step of controlling the voltage converter to stop a switching element included in the voltage converter from switching while the amount of power is smaller than the power loss value.

Furthermore the present computer readable storage medium having a program recorded therein for causing a computer to control voltage conversion in a motor drive apparatus, wherein: the motor drive apparatus includes a drive device driving a motor, a power generation device generating power, a power generation drive device driving the power generation device, and a voltage converter converting voltage between a power supply, and the drive device, the power generation device and the power generation drive device; and the program causes a computer to execute a first step of making a decision as to whether an amount of a current supplied from the drive device, the power generation device and the power generation drive device toward the power supply to charge the power supply is smaller than a current loss value in the voltage converter, and for the amount of the current smaller than the current loss value, a second step of controlling the voltage converter to stop a switching element included in the voltage converter from switching while the amount of the current is smaller than the current loss value.

In the present invention a voltage converter transforms a DC voltage applied from a power supply to a drive device (or inverter) and that applied from the drive device or (inverter) to the power supply and when a reactor current traverses the zero point a switching element included in the voltage converter is stopped from switching.

Furthermore in the present invention if an amount of power supplied via the voltage converter to charge the power supply is smaller than that of power lost in the voltage converter the switching element included in the voltage converter is stopped from switching.

Furthermore in the present invention if an amount of a current supplied via the voltage converter to charge the power supply is smaller than that of a current lost in the voltage converter the switching element included in the voltage converter is stopped from switching.

Thus the present invention allows the switching element to switch less frequently. As a result, reduced switching noise and hence reduced switching loss can be achieved.

BEST MODES FOR CARRYING OUT THE INVENTION

Embodiments of the present invention will now be described with reference to the drawings more specifically. In the figures, identical or corresponding components are identically denoted.

First Embodiment

Figure 1:
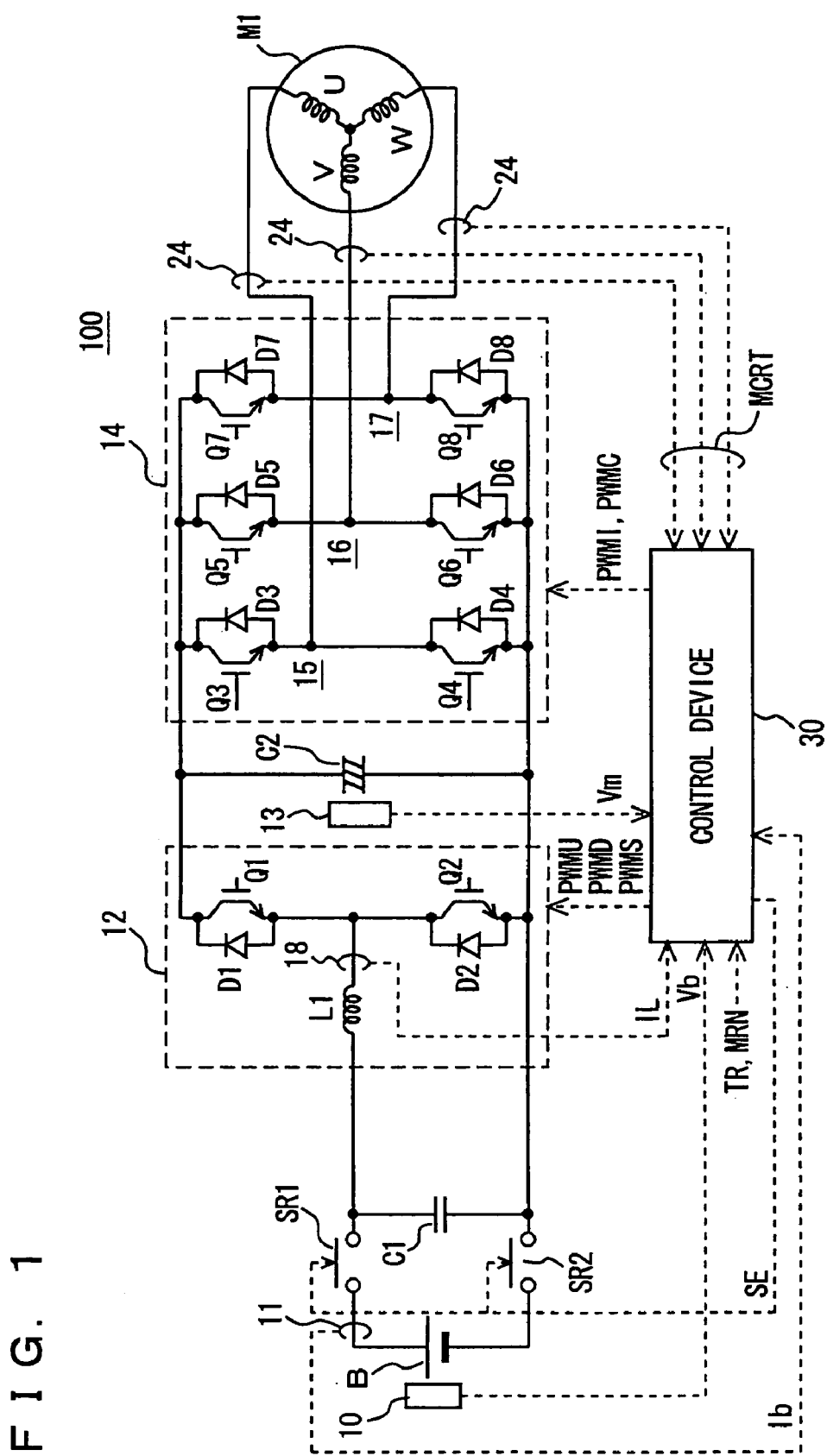
FIG. 1 is a schematic block diagram of a motor drive apparatus in accordance with a first embodiment.

FIG. 1 is a schematic block diagram of a motor drive apparatus in a first embodiment. With reference to FIG. 1, the first embodiment provides a motor drive apparatus 100 including a battery B, voltage sensors 10, 13, current sensors 11, 18, 24, capacitors C1, C2, an up converter 12, an inverter 14, and a control device 30.

An alternate current (AC) motor M1 is a drive motor operated to generate a torque applied to drive a driving wheel of a hybrid vehicle or an electric vehicle. Furthermore, AC motor M1 is a motor that can function as a power generator driven by an engine and operates as an electric motor relative to the engine for example to start the engine.

Up converter 12 includes a reactor L1, NPN transistors Q1, Q2, and diodes D1, D2. Reactor L1 has one end connected to a power supply line of DC power supply B and the other end to a point intermediate between NPN transistors Q1 and Q2, i.e., between the emitter of NPN transistor Q1 and the collector of NPN transistor Q2. NPN transistors Q1, Q2 are connected in series between the power supply line and an earth line. NPN transistor Q1 has a collector connected to the power supply line and NPN transistor Q2 has an emitter connected to the earth line. Furthermore between the collectors and emitters of NPN transistors Q1 and Q2 are arranged diodes D1 and D2, respectively, passing a current from the emitters to the collectors, respectively.

Inverter 14 is formed of a U-phase arm 15, a V-phase arm 16, and a W-phase arm 17. U, V and W-phase arms 15, 16 and 17 are provided in parallel between the power supply line and the earth line.

U-phase arm 15 is formed of series connected NPN transistors Q3 and Q4. V-phase arm 16 is formed of series connected NPN transistors Q5 and Q6. W-phase arm 17 is formed of series connected NPN transistors Q7 and Q8. Furthermore, between the collectors and emitters of NPN transistors Q3–Q8 are arranged diodes D3–D8, respectively, passing a current from the emitters to collectors.

Each phase arm has an intermediate point connected to a corresponding phase end of a corresponding phase coil of AC motor M1. More specifically, AC motor M1 is a 3-phase permanent magnet motor, and the three, U, V and W-phase coils each have one end connected at a midpoint together, and the U-phase coil has the other end to a point intermediate between NPN transistors Q3 and Q4, the V-phase coil has the other end connected to a point intermediate between NPN transistors Q5 and Q6, and the W-phase coil has the other end connected to a point intermediate between NPN transistors Q7 and Q8.

DC power supply B is implemented by a nickel hydrogen or lithium ion or similar, secondary battery. Voltage sensor 10 detects a voltage Vb output from DC power supply B and outputs the detected voltage Vb to control device 30.

System relays SR1, SR2 are turned on/off by a signal SE issued from control device 30. More specifically, system relays SR1, SR2 are turned on by signal SE issued from control device 30 and having a logical high level and turned off by signal SE output from control device 30 and having a logical low level.

Current sensor 11 detects a power supply current Ib input to/output from DC power supply B and outputs the detected power supply current Ib to control device 30.

Capacitor C1 smoothes a DC voltage supplied from DC power supply B and supplies the smoothed DC voltage to up converter 12.

Up converter 12 up converts the DC voltage supplied from capacitor C1 and supplies the up-converted DC voltage to capacitor C2. More specifically, when up converter 12 receives a signal PWMU from control device 30, up converter 12 up-converts the DC voltage in accordance with a period for which signal PWMU turns on NPN transistor Q2, and supplies the up-converted DC voltage to capacitor C2.

Furthermore, when up converter 12 receives a signal PWMD from control device 30, up converter 12 down-converts a DC voltage supplied from inverter 14 via capacitor 12 and supplies the down-converted DC voltage to DC power supply B.

Furthermore, up converter 12 operates in response to a signal PWMS received from control device 30 to stop switching to perform an up-converting operation or a down-converting operation.

Capacitor C2 smoothes a DC voltage output from up converter 12 and supplies the smoothed DC voltage to inverter 14.

Voltage sensor 13 detects a voltage Vm across capacitor C2 and outputs the detected voltage Vm to control device 30.

When inverter 14 receives a DC voltage from capacitor C2, inverter 14 operates in response to a signal PWM1 received from control device 30 to convert the DC voltage to an AC voltage to drive AC motor M1. AC motor M1 is thus driven to generate a torque designated by a torque command value TR.

Furthermore, when the hybrid or electric vehicle with motor drive apparatus 100 mounted therein is regeneratively braked, inverter 14 converts an AC voltage generated by AC motor M1 to a DC voltage in accordance with a signal PWMC received from control device 30, and supplies the DC voltage via capacitor C2 to up converter 12.

It should be noted that regenerative braking as referred to herein includes braking accompanied with regenerative power generation when the driver of the hybrid or electric vehicle operates a foot brake, and releasing the foot brake and an accelerator pedal as well while the vehicle runs to regeneratively generate power while decelerating (or stopping accelerating) the vehicle.

Current sensor 18 detects reactor current IL flowing through reactor L1 and outputs the detected reactor current IL to control device 30.

Current sensor 24 detects a motor current MCRT flowing through AC motor M1 and outputs the detected motor current MCRT to control device 30.

Control device 30 receives torque command value TR and a motor rotation rate MRN from an externally provided electrical control unit (ECU), voltage Vb from voltage sensor 10, power supply current Ib from current sensor 11, voltage Vm from voltage sensor 13, reactor current IL from current sensor 18, and motor current MCRT from current sensor 24, and operates in accordance with voltage Vm, torque command value TR and motor current MCRT and follows a method, as will be described later, to generate signal PWMI applied to control switching NPN transistors Q3–Q8 of inverter 14 when inverter 14 drives AC motor M1, and control device 30 outputs the generated signal PWMI to inverter 14.

Furthermore, when inverter 14 drives AC motor M1, control device 30 operates in accordance with voltages Vb, Vm, torque command value TR and motor rotation rate MRN and follows a method, as will be described later, to generate signal PWMU applied to control switching NPN transistors Q1 and Q2 of up converter 12 and output the generated signal PWMU to up converter 12.

Furthermore, when the hybrid or electric vehicle having motor drive apparatus 100 mounted therein is regeneratively braked, control device 30 operates in accordance with voltage Vm, torque command value TR and motor current MCRT to generate signal PWMC applied to convert an AC voltage generated by AC motor M1 to a DC voltage and output the generated signal PWMC to inverter 14. In that case, the inverter 14 NPN transistors Q3–Q8 are switched as controlled by signal PWMC. Inverter 14 thus converts an AC voltage generated by AC motor M1 to a DC voltage and supplies the DC voltage to up converter 12.

Furthermore, control device 30 in regenerative braking operates in accordance with voltages Vb, Vm, torque command value TR and motor rotation rate MRN to generate signal PWMD applied to down convert a DC voltage supplied from inverter 14, and output the generated signal PWMD to up converter 12. The AC voltage generated by AC motor M1 is thus converted to a DC voltage, and down converted and supplied to DC power supply B.

Furthermore, control device 30 operates in accordance with power supply current Ib from current sensor 11 and reactor current I]L from current sensor 18 to determine in a method as described later whether reactor current IL traverses the zero point and if so then control device 30 generates signal PWMS applied to stop NPN transistors Q1 and Q2 from switching and outputs the generated signal PMWS to up converter 12.

Figure 2:
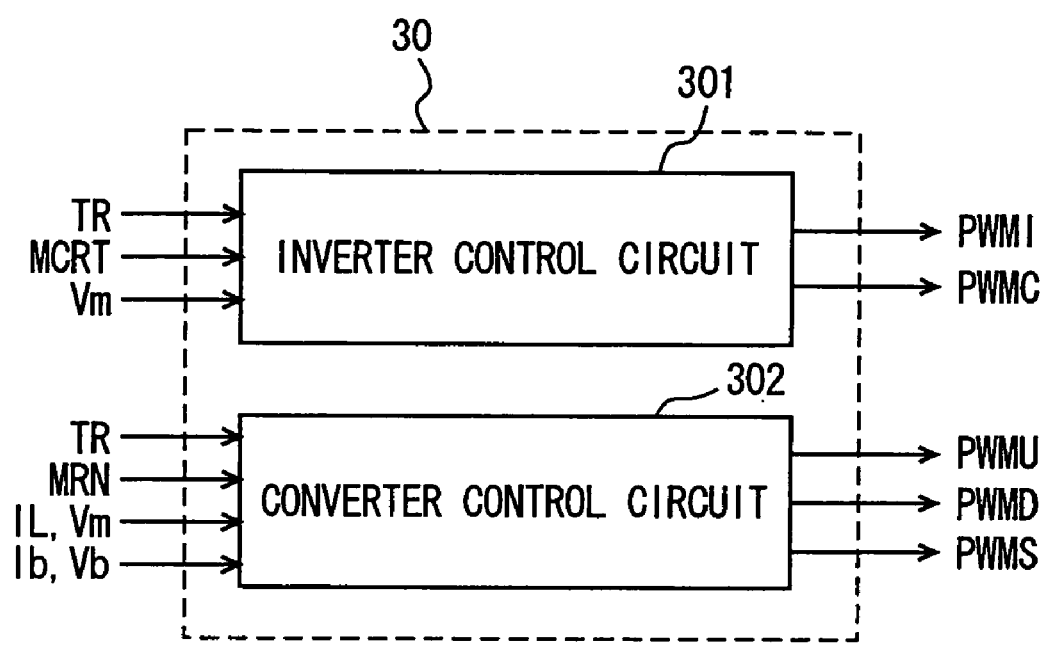
FIG. 2 is a block diagram of the control device shown in FIG. 1.

FIG. 2 is a block diagram of control device 30 shown in FIG. 1. With reference to the figure, control device 30 includes an inverter control circuit 301 and a converter control circuit 302.

Inverter control circuit 301 operates in accordance with torque command value TR, motor current MCRT and voltage Vm and when AC motor M1 is driven inverter control circuit 301 follows a method, as will be described later, to generate signal PWMI applied to turn on/off NPN transistors Q3–Q8 of inverter 14 and output the generated signal PWMI to inverter 14.

Furthermore, when the hybrid or electric vehicle having motor drive apparatus 100 mounted therein is regeneratively braked, inverter control circuit 301 operates in accordance with torque command value TR, motor current MCRT and voltage Vm to generate and output to an inverter 14 signal PWMC applied to convert AC voltage generated by AC motor M1 to DC voltage.

Converter control circuit 302 operates in accordance with power supply current Ib and reactor current IL and follows a method, as will be described later, to determine whether reactor current IL traverses the zero point and if so then converter control circuit 302 generates signal PWMS applied to stop NPN transistors Q1 and Q2 from switching and output the generated signal PWMS to up converter 12. If reactor current IL does not traverse the zero point, then converter control circuit 302 generates signal PWMU or PWMD, as described hereinafter, to control up converter 12 to perform an up converting operation or a down converting operation.

More specifically, converter control circuit 302 operates in accordance with torque command value TR, voltages Vb, Vm and motor rotation rate MRN and when AC motor M1 is driven converter control circuit 302 follows a method as described later to generate signal PWMU applied to turn on/off NPN transistors Q1, Q2 of up converter 12 and output the generated signal PWMU to up converter 12.

Furthermore, when the hybrid or electric vehicle having motor drive apparatus 100 mounted therein is regeneratively braked, converter control circuit 302 operates in accordance with torque command value TR, voltages Vb, Vm and motor rotation rate MRN to generate signal PWMD applied to down-convert a DC voltage received from inverter 14 and output the generated signal PWMD to up converter 12.

Thus up converter 12 can also down-convert a voltage by signal PWMD applied to down-convert a DC voltage, and accordingly has the function of a bidirectional converter.

Figure 3:
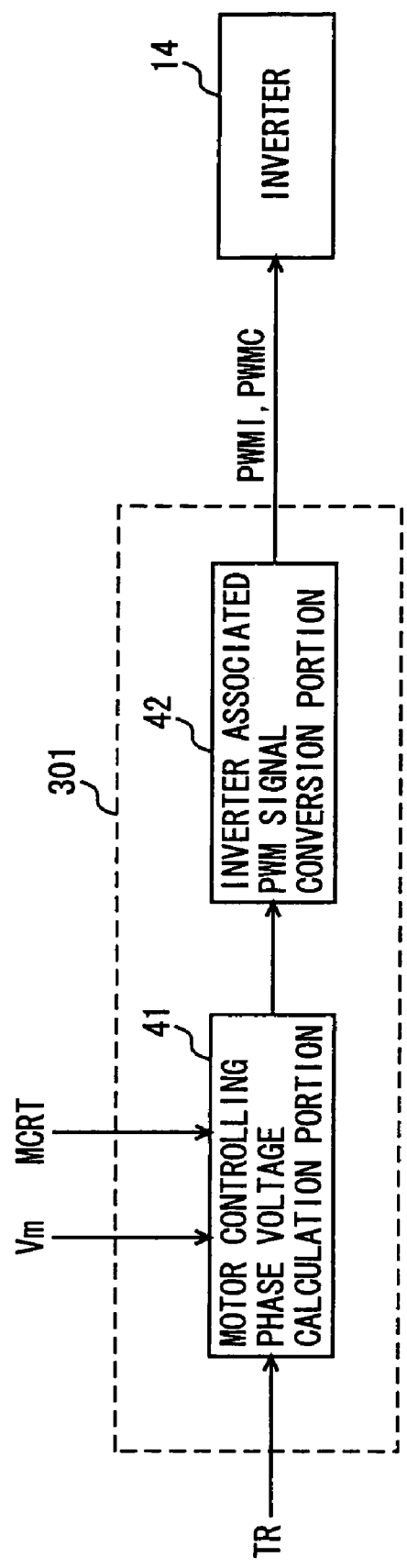
FIG. 3 is a block diagram of the inverter control circuit shown in FIG. 2.

FIG. 3 is a block diagram of inverter control circuit 301 shown in FIG. 2. With reference to the figure, inverter control circuit 301 includes a motor controlling phase voltage calculation portion 41 and an inverter associated PWMC signal conversion portion 42.

Motor controlling phase voltage calculation portion 41 receives voltage Vm output from up converter 12, i.e., receives from voltage sensor 13 a voltage input to inverter 14, receives from current sensor 24 motor current MCRT flowing at its phase of AC motor M1, and torque command value TR from the external ECU, and motor controlling phase voltage calculation portion 41 operates in accordance with torque command value TR, motor current MCRT and voltage Vm to calculate a voltage applied to the coil of each phase of AC motor M1 and outputs to an obtained calculation to inverter associated PWMC signal conversion portion 42.

Inverter associated PWMC signal conversion portion 42 operates in accordance with the calculation received from motor controlling phase voltage calculation portion 41 to in effect generates signal PWMI or signal PWMC turning on/off each NPN transistor Q3–Q8 of inverter 14 and output the generated signal PWMI or PWMC to each NPN transistor Q3–Q8.

Thus inverter 14 has NPN transistors Q3–Q8 switched, as controlled, to control a current passed to each phase of AC motor M1 so that AC motor M1 outputs a designated torque. Thus a motor drive current is controlled and a motor torque in accordance with torque command value TR is output.

Figure 4:
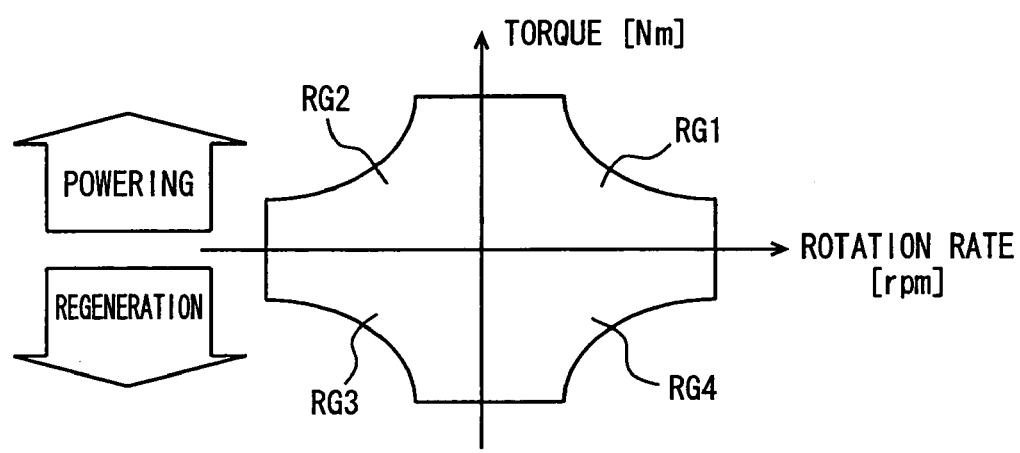
FIG. 4 shows a relationship between a motor's torque and rate of rotation.

Note that whether inverter control circuit 301 generates signal PWMI or signal PWMC depends on a relationship between torque command value TR and motor rotation rate MRN. FIG. 4 shows a relationship between a motor's torque and rotation rate. With reference to the figure, when the torque-rotation rate relationship exists in a region RG1 or a region RG2, AC motor M1 operates in a drive mode, i.e., a powering mode, and when the torque-rotation rate relationship exists in a region RG3 or a region RG4, AC motor M1 operates in a regeneration mode.

Accordingly inverter control circuit 301 for the torque command value TR-motor rotation rate MRN relationship existing in region RG1 or RG2 generates signal PWMI and for the relationship in region RG3 or RG4 generates signal PWMC.

Figure 5:
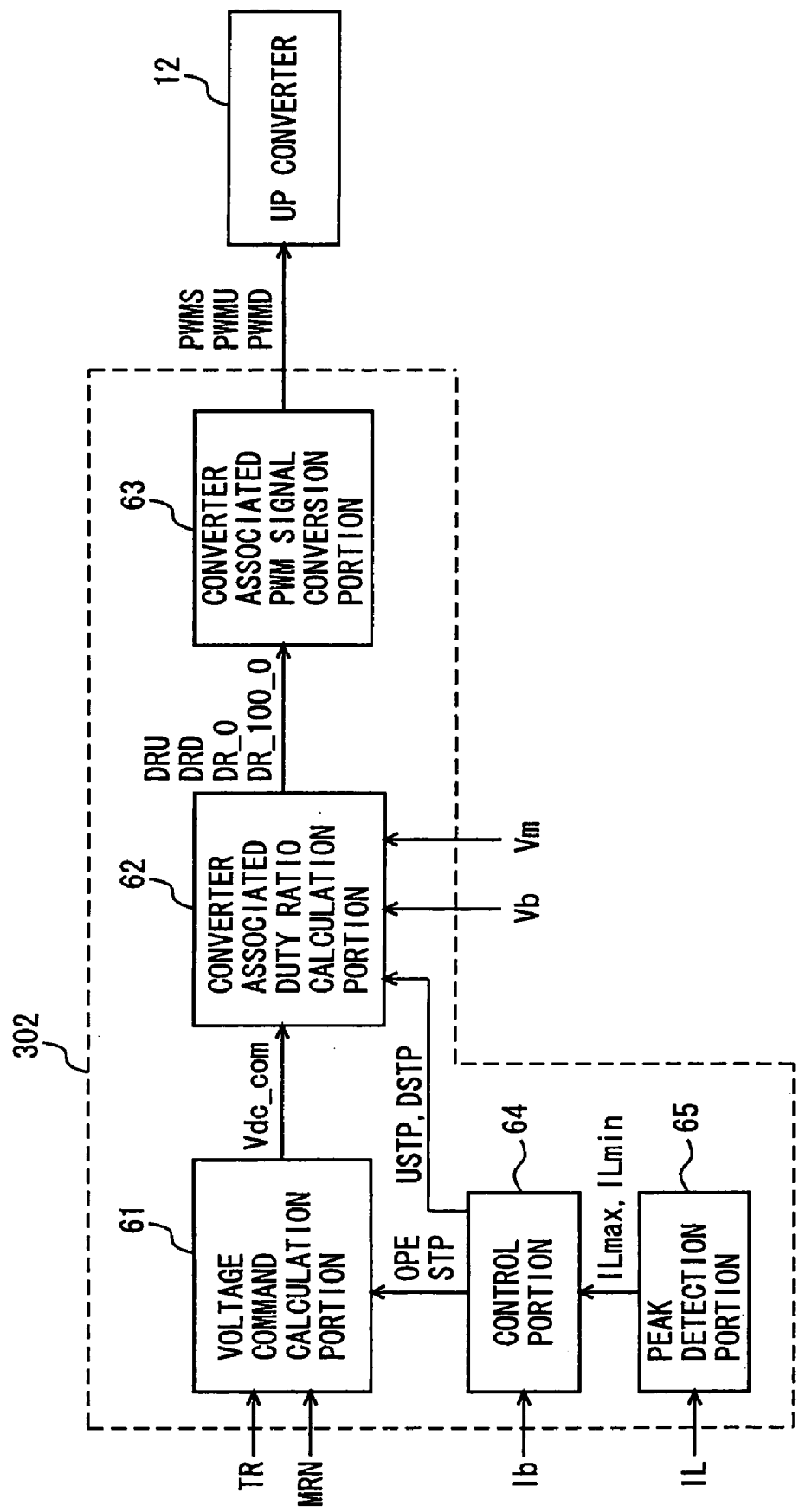
FIG. 5 is a block diagram of the converter control circuit shown in FIG. 2.

FIG. 5 is a block diagram of converter control circuit 302 shown in FIG. 2. With reference to the figure, converter control circuit 302 includes a voltage command calculation portion 61, a converter associated duty ratio calculation portion 62, a converter associated PWM signal conversion portion 63, a control portion 64, and a peak detection portion 65.

When voltage command calculation portion 61 receives a signal OPE from control portion 64, voltage command calculation portion 61 operates in accordance with torque command value TR and motor rotation rate MRN received from the external ECU to calculate an optimum (or target) value of voltage Vm input to inverter 14, i.e., a voltage command Vdc_com and output it to converter associated duty ratio calculation portion 62.

Furthermore, when voltage command calculation portion 61 receives a signal STP from control portion 64, voltage command calculation portion 61 calculates a voltage command Vdc_com_0 applied to set a target value of inverter input voltage Vm to voltage Vb output from DC power supply B, and outputs voltage command Vdc_com_0 to converter associated duty ratio calculation portion 62.

Converter associated duty ratio calculation portion 62 receives voltage Vb from voltage sensor 10, voltage Vm (equal the inverter input voltage) from voltage sensor 13, and voltage command Vdc_com or Vdc_com_0 from voltage command calculation portion 61. When converter associated duty ratio calculation portion 62 receives voltage command Vdc_com from voltage command calculation portion 61, converter associated duty ratio calculation portion 62 operates in accordance with voltage Vb to calculate a duty ratio DRU or DRD applied to set inverter input voltage Vm to voltage command Vdc_com output from voltage command calculation portion 61, and output duty ratio DRU or DRD to converter associated PWM signal conversion portion 63.

If voltage Vb is up converted to set inverter input voltage Vm to be voltage command Vdc_com, converter associated duty ratio calculation portion 62 for inverter input voltage Vm reduced to be lower than voltage command Vdc_com calculates duty ratio DRU for moving a DC current in a direction from DC power supply B toward inverter 14 to match inverter input voltage Vm to voltage command Vdc_com and outputs the duty ratio to converter associated PWM signal conversion portion 63, and for inverter input voltage Vm increased to be higher than voltage command Vdc_com calculates duty ratio DRD for moving a DC current in a direction from inverter 14 to DC power supply B to match inverter input voltage Vm to voltage command Vdc_com and outputs the duty ratio to converter associated PWM signal conversion portion 63. Converter control circuit 302 thus provides feedback control to match inverter input voltage Vm to voltage command Vdc_com.

When converter associated duty ratio calculation portion 62 receives voltage command Vdc_com_0 from voltage command calculation portion 61 and a signal USTP from control portion 64, converter associated duty ratio calculation portion 62 calculates a duty ratio DR_0 having set an on-duty of NPN transistor Q1 and Q2 to 0% and outputs duty ratio DR_0 to converter associated PWM signal conversion portion 63.

Furthermore, when converter associated duty ratio calculation portion 62 receives voltage command Vdc_com_0 from voltage command calculation portion 61 and a signal DSTP from control portion 64, converter associated duty ratio calculation portion 62 calculates a duty ratio DR_100_0 having set an on-duty of NPN transistor Q1 to 100% and that of NPN transistor Q2 to 0%, and outputs duty ratio DR_100_0 to converter associated PWM signal conversion portion 63.

Converter associated PWM signal conversion portion 63 operates in accordance with duty ratio DRU received from converter associated duty ratio calculation portion 62 to generate signal PWMU applied to turn on/off NPN transistors Q1, Q2 of up converter 12, and output the generated signal PWMU to up converter 12.

Furthermore, converter associated PWM signal conversion portion 63 operates in accordance with duty ratio DRD received from converter associated duty ratio calculation portion 62 to generate signal PWMD applied to turn on/off NPN transistors Q1, Q2 of up converter 12, and output the signal to up converter 12.

Furthermore, converter associated PWM signal conversion portion 63 operates in accordance with duty ratio DR_0 or DR_100_0 received from converter associated duty ratio calculation portion 62 to generate signal PWMS applied to stop the up converter 12 NPN transistors Q1, Q2 from switching, and output the generated signal PWMS to up converter 12.

In that case, converter associated PWM signal conversion portion 63 operates in accordance with duty ratio DR_0 to generate a signal PWMS1 (a type of signal PWMS) having set an on-duty of NPN transistor Q1, Q2 to 0%, and output the signal to the up converter 12 NPN transistors Q1, Q2.

Furthermore, converter associated PWM signal conversion portion 63 operates in accordance with duty ratio DR_100_0 to generate a signal PWMS2 (a type of signal PWMS) having set an on-duty of NPN transistor Q1 to 100% and that of NPN transistor Q2 to 0%, and output the signal to the up converter 12 NPN transistors Q1, Q2.

Increasing the on-duty of the lower NPN transistor Q2 of up converter 12 can increase power stored in reactor L1 and thus provide an output of higher voltage. By contrast, increasing the on-duty of the upper NPN transistor Q1 provides reduced voltage on the power supply line. Accordingly, the NPN transistors Q1, Q2 duty ratio can be controlled to control the power supply line's voltage to attain any voltage of at least that output from DC power supply B.

Control portion 64 determines from a maximum value ILmax and a minimum value ILmin of reactor current IL provided from peak detection portion 65 to determine whether reactor current IL traverses the zero point. If so, control portion 64 generates and outputs signal STP to voltage command calculation portion 61. Otherwise, control portion 64 generates and outputs signal OPE to voltage command calculation portion 61.

When reactor current IL traverses the zero point, control portion 64 determines from power supply current Ib from current sensor 11 whether reactor current IL traverses the zero point in an up converting operation or a down converting operation. If control portion 64 determines that reactor current IL traverses the zero point in the up converting operation, signal USTP is generated and output to converter associated duty ratio calculation portion 62. If control portion 64 determines that reactor current IL traverses the zero point in the down converting operation, signal DSTP is generated and output to converter associated duty ratio calculation portion 62.

Peak detection portion 65 detects a maximum and minimum values ILmax and ILmin of reactor current IL as based thereon provided from current sensor 18 and outputs the detected maximum and minimum values ILmax and ILmin to control portion 64.

Voltage command Vdc_com_0 is a command for setting a target voltage of voltage Vm corresponding to a voltage output from up converter 12 to voltage Vb output from DC power supply B. Accordingly, when converter associated duty ratio calculation portion 62 receives signal USTP from control portion 64, converter associated duty ratio calculation portion 62 generates a duty ratio DR_0 for stopping the up converting operation of up converter 12 and setting voltage Vm output from up converter 12 to voltage Vb. Duty ratio DR_0 is a duty ratio setting an on-duty of NPN transistors Q1, Q2 to 0%, and NPN transistors Q1, Q2 turned off allows a DC current to be supplied from DC power supply B via diode D1 to capacitor C2 and up converter 12 outputs voltage Vm equal to voltage Vb. Accordingly, converter associated duty ratio calculation portion 62 is adapted to generate duty ratio DR_0 when it receives voltage command Vdc_com_0 from voltage command calculation portion 61 and signal USTP from control portion 64.

Furthermore, when converter associated duty ratio calculation portion 62 receives voltage command Vdc_com_0 from voltage command calculation portion 61 and signal DSTP from control portion 64, converter associated duty ratio calculation portion 62 generates a duty ratio DR_100_0 for stopping the down converting operation of up converter 12 and setting voltage Vm output from up converter 12 to voltage Vb. Duty ratio DR_100_0 is a duty ratio setting an on duty of NPN transistor Q1 to 100% and that of NPN transistor Q2 to 0%, and NPN transistors Q1 and Q2 turned on and off, respectively, cause a DC current to flow from capacitor C2 to DC power supply B and up converter 12 outputs voltage Vm equal to voltage Vb. Accordingly, converter associated duty ratio calculation portion 62 is adapted to generate duty ratio DR_100_0 when it receives voltage command Vdc_com_0 from voltage command calculation portion 61 and signal DSTP from control portion 64.

Thus generating duty ratio DR_0 to turn off NPN transistors Q1 and Q2 can stop NPN transistors Q1 and Q2 from switching to perform an up converting operation, and generating duty ratio DR_100_0 to turn on and off NPN transistors Q1 and Q2, respectively, can stop NPN transistors Q1 and Q2 from switching to perform a down converting operation.

Figure 6:
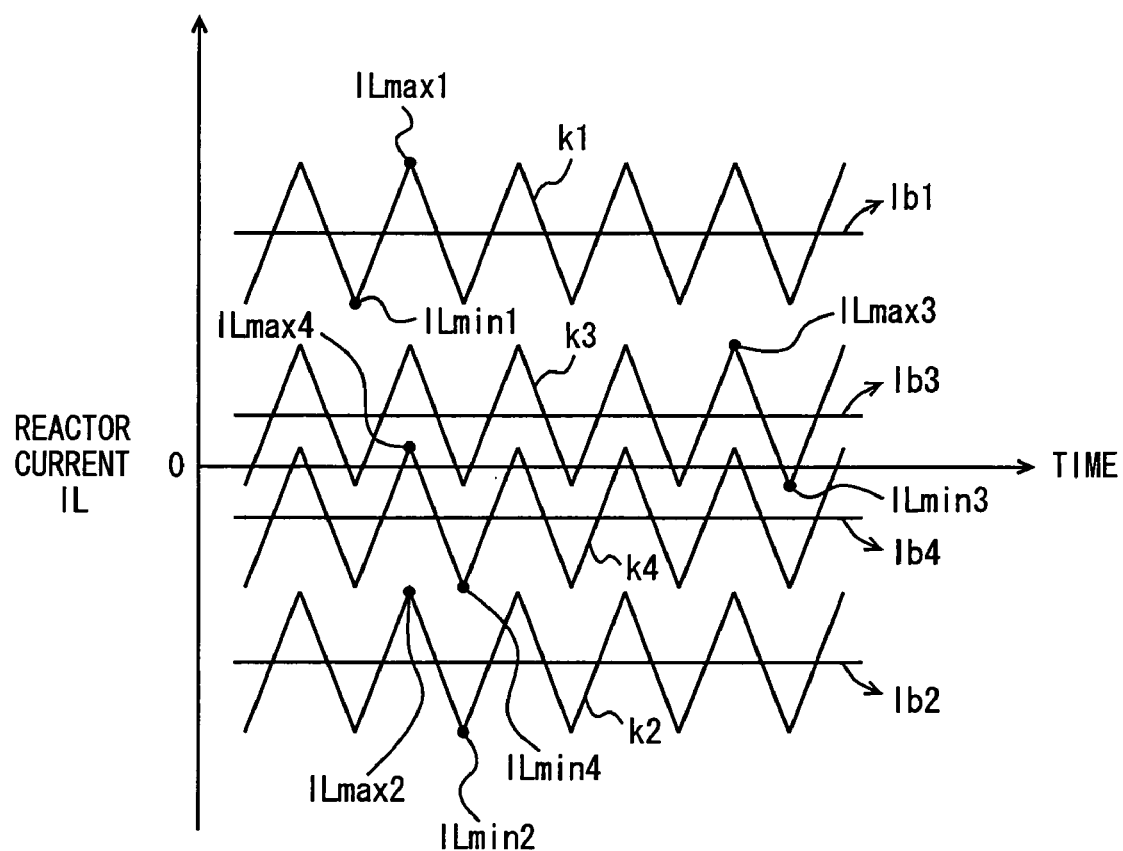
FIG. 6 is timing plots of a reactor current.

FIG. 6 is timing plots of reactor current IL. With reference to the figure, how a decision is made as to whether reactor current IL traverses the zero point will be described. When reactor current IL follows a curve k1 or k2, reactor current IL does not traverse the zero point. In that case, reactor current IL has a maximum value ILmax1 and a minimum value ILmin1 identical in polarity or a maximum value ILmax2 and a minimum value ILmin2 identical in polarity.

When reactor current IL follows a curve k3 or k4, reactor current IL traverses the zero point. In that case, reactor current IL has a maximum value ILmax3 and minimum value ILmin3 different in polarity or a maximum value ILmax4 and minimum value ILmax4 different in polarity.

Control portion 64 determines whether reactor current IL received from peak detection portion 65 has maximum and minimum values ILmax and ILmin identical in polarity and if so control portion 64 determines that reactor current IL does not traverse the zero point. If maximum and minimum values ILmax and ILmin are different in polarity, control portion 64 determines that reactor current IL traverses the zero point, and signal STP is generated and output to voltage command calculation portion 61.

When control portion 64 determines that maximum and minimum values ILmax and ILmin are identical in polarity, control portion 64 then determines whether the values are positive. If so, control portion 64 determines that up converter 12 is performing an up converting operation, and generates and outputs signal OPE to voltage command calculation portion 61. If the values are negative, control portion 64 determines that up converter 12 is performing a down converting operation, and generates and outputs signal OPE to voltage command calculation portion 61.

Note that if maximum or minimum value ILmax or ILmin is positive, power supply current Ib1 is positive, and if maximum or minimum value ILmax or ILmin is negative, power supply current Ib2 is negative, and control portion 64 accordingly may determine whether power supply current Ib from current sensor 11 is positive in place of whether maximum or minimum value ILmax or ILmin is positive.

That reactor current IL or power supply current Ib is positive means that reactor current IL or power supply current Ib flows in a direction from DC power supply B toward up converter 12, and that the current is negative means that the current flows in a direction from up converter 12 toward DC power supply B.

If control portion 64 determines that maximum and minimum values ILmax and ILmin are different in polarity, i.e., that reactor current IL traverses the zero point, control portion 64 then determines whether power supply current Ib from current sensor 11 is positive. If so, i.e., power supply current Ib=Ib3, control portion 64 determines that up converter 12 is performing an up converting operation, and generates and outputs signal USTP to converter associated duty ratio calculation portion 62. If power supply current Ib is positive, the current flows in a direction from DC power supply B toward up converter 12, and control portion 64 is accordingly adapted to determine that up converter 12 is performing the up converting operation.

If power supply current Ib is negative, i.e., power supply current Ib=Ib4, control portion 64 determines that up converter 12 is performing a down converting operation, and generates and outputs signal DSTP to converter associated duty ratio calculation portion 62. If power supply current Ib is negative, the current is flowing in a direction from up converter 12 toward DC power supply B, and control portion 64 is accordingly adapted to determine that up converter 12 is performing the down converting operation.

Control portion 64 thus determines from the reactor current IL maximum and minimum values ILmax and ILmin and power supply current Ib whether rector current IL traverses the zero point and whether up converter 12 is performing an up converting operation or a down converting operation.

Figure 7:
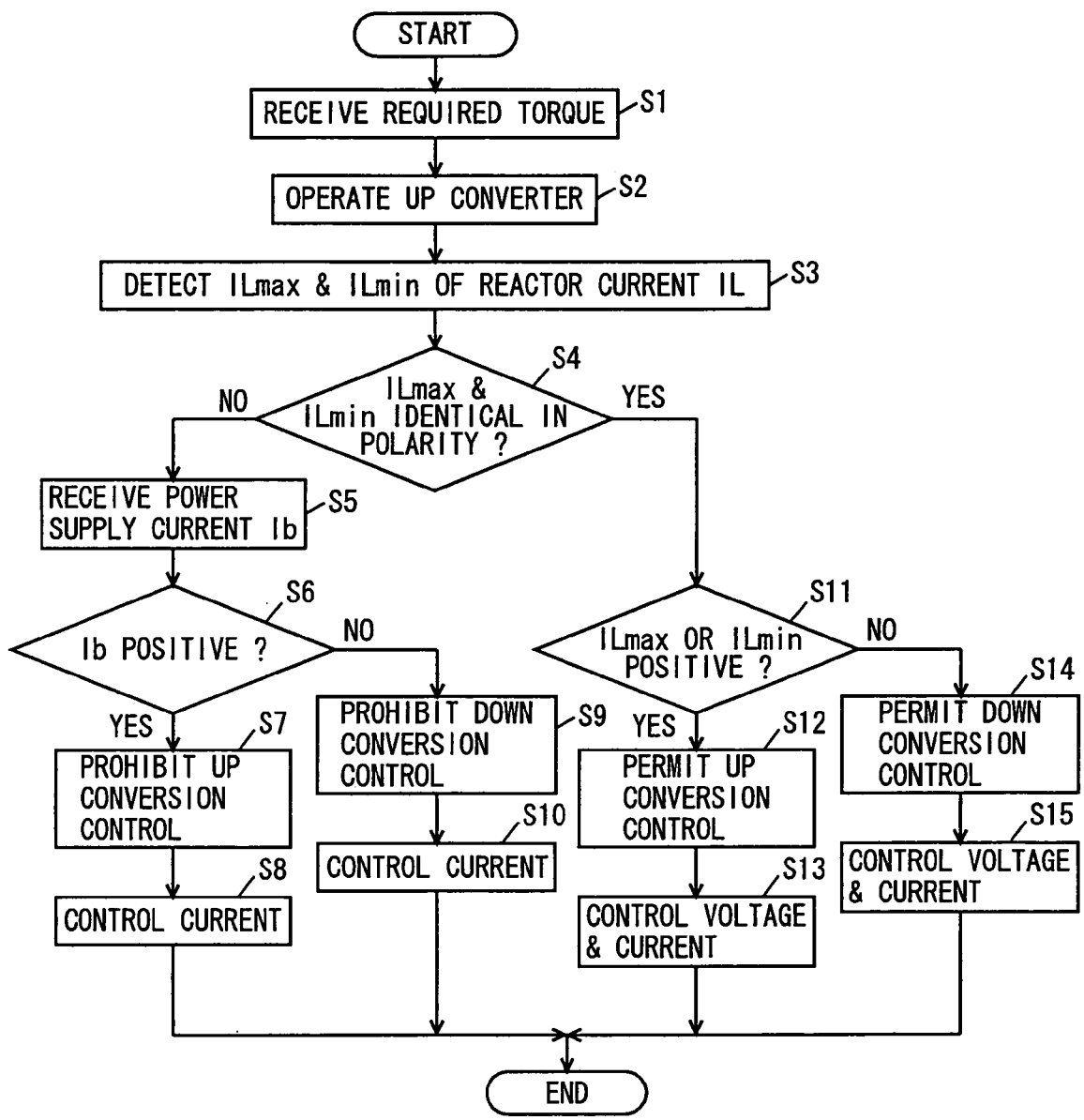
FIG. 7 is a flow chart for illustrating an operation of voltage conversion reducing switching noise in the first embodiment.

FIG. 7 is a flow chart for illustrating an operation of voltage conversion contributing to reduced switching noise in the first embodiment. With reference to the figure, when a series of operation is started, converter control circuit 302 receives a torque command value TR (i.e., a required torque) from the external ECU (step S1). Furthermore, converter control circuit 302 receives motor rotation rate MRN from the external ECU, voltage Vb from voltage sensor 10, and voltage Vm from voltage sensor 13. The converter control circuit 302 voltage command calculation portion 61 uses torque command value TR and motor rotation rate MRN and follows the above described method to calculate voltage command Vdc_com and output it to converter associated duty ratio calculation portion 62. Converter associated duty ratio calculation portion 62 is driven by voltage command Vdc_com received from voltage command calculation portion 61 and voltages Vb and Vm and follows the above described method to generate and output a duty ratio DRU or DRD to converter associated PWM signal conversion portion 63. Converter associated PWM signal conversion portion 63 is driven by duty ratio DRU or DRD received from converter associated duty ratio calculation portion 62 to generate and output signal PWMU or PWMD to up converter 12. Up converter 12 operates in response to signals PWMU and PWMD to perform up converting and down converting operations, respectively (step S2).

Subsequently, the converter control circuit 302 peak detection portion 65 receives reactor current IL from current sensor 18 and detects the current's maximum and minimum values ILmax and ILMin (step S3). Control portion 64 receives maximum and minimum values ILmax and ILmin from peak detection portion 65 and determines whether the values are identical in polarity (step S4).

If control portion 64 determine that the values are different in polarity, control portion 64 generates and outputs signal STP to voltage command calculation portion 61, and control portion 64 receives power supply current Ib from current sensor 11 (step S5) and determines whether the current is positive or negative (step S6).

If power supply current Ib is positive, control portion 64 determines that up converter 12 is performing an up converting operation, and generates and outputs signal USTP to converter associated duty ratio calculation portion 62, and voltage command calculation portion 61 generates voltage command Vdc_com_0 as based on signal STP provided from control portion 64 and outputs voltage command Vdc_com_0 to converter associated duty ratio calculation portion 62. Converter associated duty ratio calculation portion 62 generates duty ratio DR_0 from voltage command Vdc_com_0 received from voltage command calculation portion 61 and signal USTP received from control portion 64 and outputs it to converter associated PWM signal conversion portion 63. Converter associated PWM signal conversion portion 63 is driven by duty ratio DR_0 received from converter associated duty ratio calculation portion 62 to generate a signal PWMS1 for stopping an up converting operation and output the signal to up converter 12. Converter control circuit 302 thus prohibits up conversion control (step S7).

Up converter 12 operates in response to signal PWMS1 from converter control circuit 302 to stop NPN transistors Q1, Q2 from switching and supply a DC current required for an operation of inverter 14 from DC power supply B via diode D1 to capacitor 2. In other words, a current is controlled (step S8), and a series of operation thus ends.

By contrast, if at step S6 a decision is made that power supply current Ib is negative, then control portion 64 determine that up converter 12 is performing a down converting operation, and generates and outputs signal DSTP to converter associated duty ratio calculation portion 62, and voltage command calculation portion 61 generates voltage command Vdc_com_0 as based on signal STP provided from control portion 64, and outputs it to converter associated duty ratio calculation portion 62. Converter associated duty ratio calculation portion 62 generates duty ratio DR_100_0 from voltage command Vdc_com_0 provided from voltage command calculation portion 61 and signal DSTP provided from control portion 64 outputs it to converter associated PWM signal conversion portion 63. Converter associated PWM signal conversion portion 63 is driven by the received duty ratio DR_100_0 to generate signal PWMS2 for stopping the down converting operation and output the signal to up converter 12. Converter control circuit 302 thus prohibits down conversion control (step S9).

Up converter 12 operates in response to signal PWMS2 from converter control circuit 302 to stop NPN transistors Q1, Q2 from switching, and supply a DC current via NPN transistor Q1 from capacitor C2 to DC power supply B. In other words, a current is controlled (step S10), and a series of operations thus ends.

If at step S4 a decision is made that the reactor current IL maximum and minimum values ILmax and ILmin are identical in polarity, control portion 64 determines that reactor current IL does not traverse the zero point, and control portion 64 further determines whether maximum or minimum value ILmax or ILmin is positive or negative (step S11). If maximum or minimum value ILmax or ILmin is positive, reactor current IL is positive, and control portion 64 determines that up converter 12 is performing an up converting operation, and generates and outputs signal OPE to voltage command calculation portion 61. Voltage command calculation portion 61 receives signal OPE from control portion 64, and in response uses torque command value TR and motor rotation ratio MRN received from the external ECU and follows the above described method to calculate voltage command Vdc_com and output it to converter associated duty ratio operation portion 62.

Converter associated duty ratio operation portion 62 is driven by voltage command Vdc_com from voltage command calculation portion 61 and voltages Vb, Vm and follows the above described method to generate and output duty ratio DRU to converter associated PWM signal conversion portion 63. Converter associated PWM signal conversion portion 63 is driven by duty ratio DRU received from converter associated duty ratio calculation portion 62 to generate and output signal PWMU to up converter 12. Converter control circuit 302 thus permits up conversion control (step S12).

In response, up converter 12 has NPN transistors Q1, Q2 turned on/off in response to signal PWMU output from converter control circuit 302 to up convert voltage Vb output from DC power supply B so that voltage Vm attains voltage command Vdc_com, and supply the up converted DC voltage toward capacitor C2. In other words, voltage and current are controlled (step S13), and a series of operations thus ends.

By contrast, if at step S11 the reactor current IL has negative maximum or minimum value ILmax or ILmin, reactor current IL is negative, and the converter control circuit 302 control portion 64 determines that up converter 12 is performing a down converting operation, and generates and outputs signal OPE to voltage command calculation portion 61. Voltage command calculation portion 61 receives signal OPE from control portion 64, and in response uses torque command value TR and motor rotation rate MRN received from the external ECU and follows the above described method to calculate and output voltage command Vdc_com to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRD to converter associated PWM signal conversion portion 63. Converter associated PWM signal conversion portion 63 is driven by the received duty ratio DRD to generate and output signal PWMD to up converter 12. Converter control circuit 302 thus permits down conversion control (step S14).

In response, up converter 12 has NPN transistors Q1, Q2 turned on/off in response to signal PWMD output from converter control circuit 302 to down convert voltage Vm across capacitor C2 so that voltage Vm attains voltage command Vdc_com and supply the down converted DC voltage to DC power supply B. In other words, voltage and current are controlled (step S15), and a series of operations thus ends.

Thus converter control circuit 302 determines from the reactor current IL maximum and minimum values ILmax and ILmin and power supply current Ib whether reactor current IL traverses the zero point and if so converter control circuit 302 controls up converter 12 to stop switching to perform an up converting operation or a down converting operation, and if reactor current IL does not traverse the zero point, converter control circuit 302 controls up converter 12 to switch to perform the up converting operation or the down converting operation.

Up converter 12 can thus have NPN transistors Q1, Q2 switched less frequently to contribute to reduced switching noise. Furthermore, as the transistors switch less frequently, reduced switching loss can be achieved.

Note that at step S4 when the reactor current IL maximum and minimum values ILmax and ILmin are different in polarity, the converter control circuit 302 control portion 64 determines that reactor current IL traverses the zero point, and making a decision that reactor current IL traverses the zero point is equivalent to making a decision that reactor current IL is inverted in polarity.

By contrast, when the reactor current IL maximum and minimum values ILmax and ILmin are identical in polarity, control portion 64 determines that reactor current IL does not traverse the zero point, and making a decision that reactor current IL does not traverse the zero point is equivalent to making a decision that reactor current IL is not inverted in polarity.

With reference again to FIG. 1, motor drive apparatus 100 generally operates, as will be described hereinafter. When the general operation starts, control device 30 generates and outputs a signal SE having the high level to system relays SR1, SR2. This turns on system relays SR1, SR2 and DC power supply B supplies a DC voltage via system relays SR1, SR2 to capacitor C1. Capacitor C1 smoothes the received DC voltage and supplies it to up converter 12.

Voltage sensor 10 detects voltage Vb output from DC power supply B and outputs the detected voltage Vb to control device 30. Furthermore, voltage sensor 13 detects voltage Vm across capacitor C2 and outputs the detected voltage Vm to control device 30. Furthermore, current sensor 24 detects motor current MCRT flowing through AC motor M1 and outputs it to control device 30, and control device 30 receives torque command value TR and motor rotation rate MRN from the external ECU.

In response, control device 30 is driven by voltages Vb, Vm, motor current MCRT and torque command value TR and follows the above described method to generate and output signal PWMI or PWMC to inverter 14. Furthermore, when inverter 14 drives AC motor M1, it is driven by voltages Vb, Vm, torque command value TR and motor rotation rate MRN and follows the above described method to generate signal PWMU for controlling switching NPN transistors Q1, Q2 of up converter 12 and output the generated signal PWMU to up converter 12. When inverter 14 converts an AC voltage generated by AC motor M1 to a DC voltage, it is driven by voltages Vb, Vm, torque command value TR and motor rotation rate MRN and follows the above described method to generate signal PWMD for controlling switching NPN transistors Q1, Q2 of up converter 12 and output the generated signal PWMD to up converter 12.

Up converter 12 operates in response to signal PWMU to turn on/off NPN transistor Q2 to up convert voltage Vb output from DC power supply B and supply the up converted DC voltage to capacitor C2. Capacitor C2 smoothes the received DC voltage and supplies it to inverter 14. Inverter 14 converts the smoothed DC voltage to AC voltage by signal PWMI output from control device 30 to drive AC motor M1. AC motor M1 thus generates a torque designated by torque command value TR.

Furthermore, inverter 14 converts AC voltage generated by AC motor M1 to DC voltage by signal PWMC output from control device 30, and supplies the converted DC voltage to up converter 12. Up converter 12 down converts the received DC voltage by signal PWMD output from control device 30 and supplies the down converted DC voltage to DC power supply B to charge DC power supply B.

In response, current sensor 13 detects power supply current Ib output from DC power supply B and outputs the detected power supply current Ib to control device 30. Furthermore, current sensor 18 detects reactor current IL flowing through reactor L1 and outputs the detected reactor current IL to control device 30.

The control device 30 converter control circuit 302 detects the reactor current IL maximum and minimum values ILmax and ILmin and determines from the detected values in the above-described method whether reactor current IL traverses the zero point.

If so, converter control circuit 302 further makes a decision from power supply current Ib as to whether reactor current IL traverses the zero point in an up converting operation or a down converting operation. If converter control circuit 302 determines that reactor current IL traverses the zero point in the up converting operation, it generates signal PWMS1 for stopping the up converting operation and outputs the signal to up converter 12. Up converter 12 has NPN transistors Q1, Q2 turned off in response to signal PWMS1, and up converter 12 stops switching to perform the up converting operation. If converter control circuit 302 determines that reactor current IL traverses the zero point in the down converting operation, it generates signal PWMS2 for stopping the down converting operation and outputs the signal to up converter 12. Up converter 12 has NPN transistor Q1 turned on in response to signal PWMS2 and NPN transistor Q2 turned off, and up converter 12 stops switching to perform the down converting operation.

If reactor current IL does not traverse the zero point, converter control circuit 302 further makes a decision as to whether the reactor current IL maximum or minimum value ILmax or ILmin is positive or negative. If the value is positive, converter control circuit 302 generates signal PWMU for permitting an up converting operation and outputs the signal to up converter 12. The up converter 12 NPN transistors Q1, Q2 are turned on/off in response to signal PWMU, and up converter 12 switches to perform the up converting operation. If maximum or minimum value ILmax or ILmin is negative, converter control circuit 302 generates signal PWMD for permitting a down converting operation and outputs the signal to up converter 12. The up converter 12 NPN transistors Q1, Q2 are turned on/off in response to signal PWMD, and up converter 12 switches to perform the down converting operation.

Thus in motor drive apparatus 100 when reactor current IL traverses the zero point the up converter 12 NPN transistors Q1, Q2 stop switching. The transistors can thus switch less frequently and thus provide reduced switching noise. Furthermore, as they switch less frequently, reduced switching loss can also be achieved.

Note that in the present invention the control of voltage conversion that contributes to reduced switching noise is in effect performed by a central processing unit (CPU) reading from a read only memory (ROM) a program including each step of the FIG. 7 flow chart, and executing the read program and following the FIG. 7 flow chart to control up converter 12 to switch to perform an up converting or down converting operation. Accordingly, the ROM corresponds to a computer (CPU) readable storage medium having recorded therein the program including each step of the FIG. 7 flow chart.

Furthermore while in the above description power supply current Ib is detected by current sensor 11 and reactor current IL is detected by current sensor 18, the present invention is not limited thereto and power supply current Ib and reactor current IL may be calculated as based on voltage Vm from voltage sensor 13. Between reactor current IL and voltage Vm, Vm=L×IL/T is established, wherein L represents an inductance of reactor L1 and T represents a switching cycle. Voltage Vm is known as it is detected by voltage sensor 13, and inductance L and switching cycle T are also known. Reactor current IL can thus be calculated and an average value of the calculated reactor current IL corresponds to power supply current Ib.

The calculated reactor current IL's maximum and minimum values ILmax and ILmin are detected, and the detected values and the calculated power supply current Ib are used and the above described method is followed to determine whether reactor current IL traverses the zero point and if so an up converting or down converting operation by a switching operation is stopped. Otherwise, the up converting or down converting operation by the switching operation is performed.

In that case, converter control circuit 302 further includes a calculation portion. The calculation portion holds inductance L and switching cycle T and substitutes voltage Vm from voltage sensor 13 into Vm=L×IL/T to calculate reactor current IL and therefrom calculates power supply current Ib. The calculation portion outputs the calculated reactor current IL to peak detection portion 65 and outputs power supply current Ib to control portion 64.

From the reactor current IL from the calculation portion, peak detection portion 65 detects and outputs maximum and minimum values ILmax and ILmin to control portion 64.

Note that while in the above description current sensor 18 is provided internal to up converter 12, the present invention is not limited thereto and current sensor 18 may be provided external to up converter 12.

Furthermore in the first embodiment if power supply current Ib detected is zero, NPN transistors Q1, Q2 may be stopped from switching. More specifically, in the present embodiment, power supply current Ib may be referred to to determine whether NPN transistors Q1, Q2 should be stopped.

Stopping NPN transistors Q1, Q2 for power supply current Ib of zero can maintain power transmission and reception in balance without a particular process, as before and after the transistors are stopped from switching, up converter 12 passes an invariable amount of power.

In this case, power supply current Ib may be replaced with a voltage applied to up converter 12.

The remainder is as has been described previously.

Second Embodiment

Figure 8:
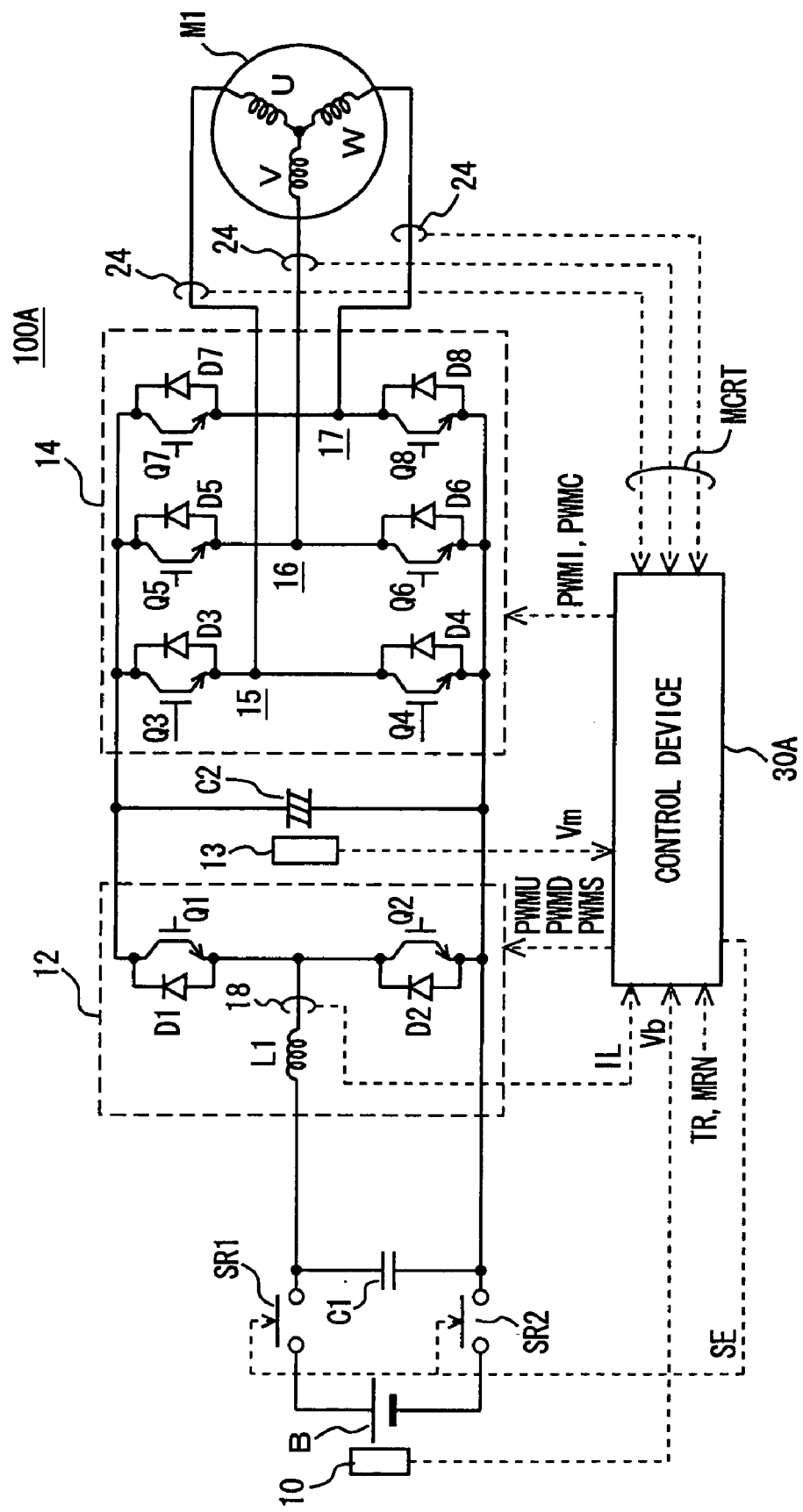
FIG. 8 is a schematic block diagram of a motor drive apparatus in a second embodiment.

FIG. 8 is a block diagram schematically showing the motor drive apparatus in a second embodiment. With reference to the figure, a motor drive apparatus 100A corresponds to motor drive apparatus 100 minus current sensor 11 and having control device 30 replaced with a control device 30A.

Control device 30A determines from torque command value TR and motor rotation rate MRN from the external ECU and maximum and minimum values ILmax and ILmin of reactor current IL from current sensor 18 in a method, as will be described hereinafter, whether reactor current IL traverses the zero point. If so, control device 30A controls up converter 12 to stop switching to perform an up converting or down converting operation, otherwise control device 30A controls up converter 12 to switch to perform the up converting or down converting operation.

Control device 30A other than that provides the same function as control device 30.

Figure 9:
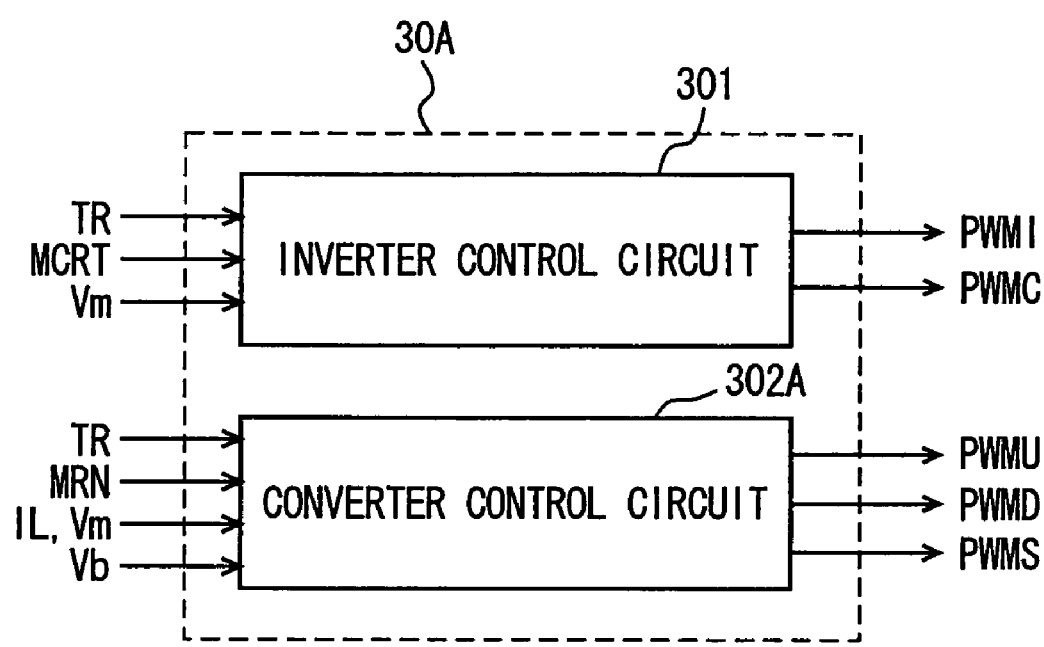
FIG. 9 is a block diagram of the control device shown in FIG. 8.

FIG. 9 is a block diagram of the FIG. 8 control device 30A. With reference to the figure, control device 30A corresponds to control device 30 having converter control circuit 302 replaced with a converter control circuit 302A.

Converter control circuit 302A determines from torque command value TR, motor rotation rate MRN and reactor current IL in a method, as will be described hereinafter, whether reactor current IL traverses the zero point and if so converter control circuit 302A generates signal PWMS for stopping NPN transistors Q1, Q2 from switching and outputs the generated signal PWMS to up converter 12. If reactor current IL does not traverse the zero point, converter control circuit 302A generates signal PWMU or PWMD to control up converter 12 to switch to perform an up converting or down converting operation.

Converter control circuit 302A other than that provides the same function as converter control circuit 302.

Figure 10:
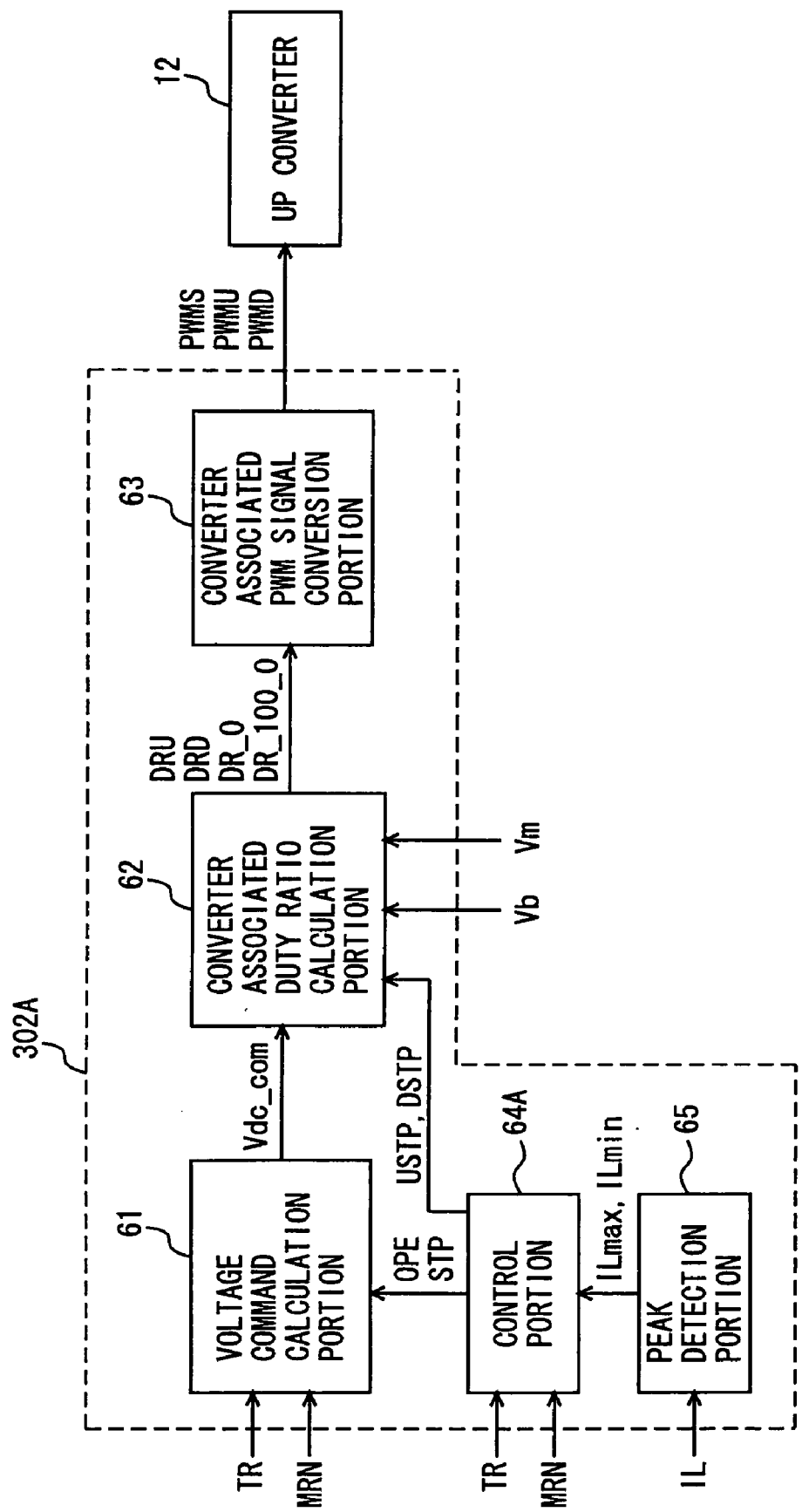
FIG. 10 is a block diagram of the converter control circuit shown in FIG. 9.

FIG. 10 is a block diagram of the FIG. 9 converter control circuit 302A. With reference to the figure, converter control circuit 302A corresponds to converter control circuit 302 having control portion 64 replaced with a control portion 64A.

Control portion 64A receives torque command value TR and motor rotation rate MRN from the external ECU and therefrom determines whether AC motor M1 operates in a powering mode or a regeneration mode.

More specifically, control portion 64A holds the FIG. 4 motor torque-rotation rate relationship in the form of a map and determines whether AC motor M1 operates in the powering mode or the regeneration mode from in which one of the map's regions RG1–RG4 torque command value TR and motor rotation rate MRN from the external ECU exist.

More specifically, control portion 64A determines that AC motor M1 operates in the powering mode when torque command value TR and motor rotation rate MRN from the external ECU exist in regions RG1, RG2, and control portion 64A determines that AC motor M1 operates in the regeneration mode when torque command value TR and motor rotation rate MRN from the external ECU exist in regions RG3, RG4.

If AC motor M1 operates in the regeneration mode, control portion 64A determines whether reactor current IL has maximum value ILmax smaller than zero, and if so, control portion 64A generates and outputs signal OPE to voltage command calculation portion 61, otherwise generates and outputs signals STP and DSTP to voltage command calculation portion 61 and converter associated duty ratio calculation portion 62, respectively.

If AC motor M1 operates in the regeneration mode whether reactor current IL has maximum value ILmax smaller than zero is determined because when the motor operates in the regeneration mode, reactor current IL varies in accordance with curve k2 or k4 shown in FIG. 6, and for maximum value ILmax smaller than zero reactor current IL does not traverse the zero point and otherwise reactor current IL traverses the zero point, and accordingly by determining whether maximum value ILmax is smaller than zero, whether reactor current IL traverses the zero point can be determined.

Furthermore, if AC motor M1 operates in the powering mode, control portion 64A determines whether reactor current IL has minimum value ILmin larger than zero. If so, control portion 64A generates and outputs signal OPE to voltage command calculation portion 61, otherwise generates and outputs signal STP and USTP to voltage command calculation portion 61 and converter associated duty ratio calculation portion 62, respectively.

If AC motor M1 operates in the powering mode whether reactor current IL has minimum value ILmin larger than zero is determined because when the motor operates in the powering mode, reactor current IL varies in accordance with curve k1 or k3 shown in FIG. 6, and for minimum value ILmin larger than zero reactor current IL does not traverse the zero point and otherwise reactor current IL traverses the zero point, and accordingly by determining whether minimum value ILmin is larger than zero, whether reactor current IL traverses the zero point can be determined.

Figure 11:
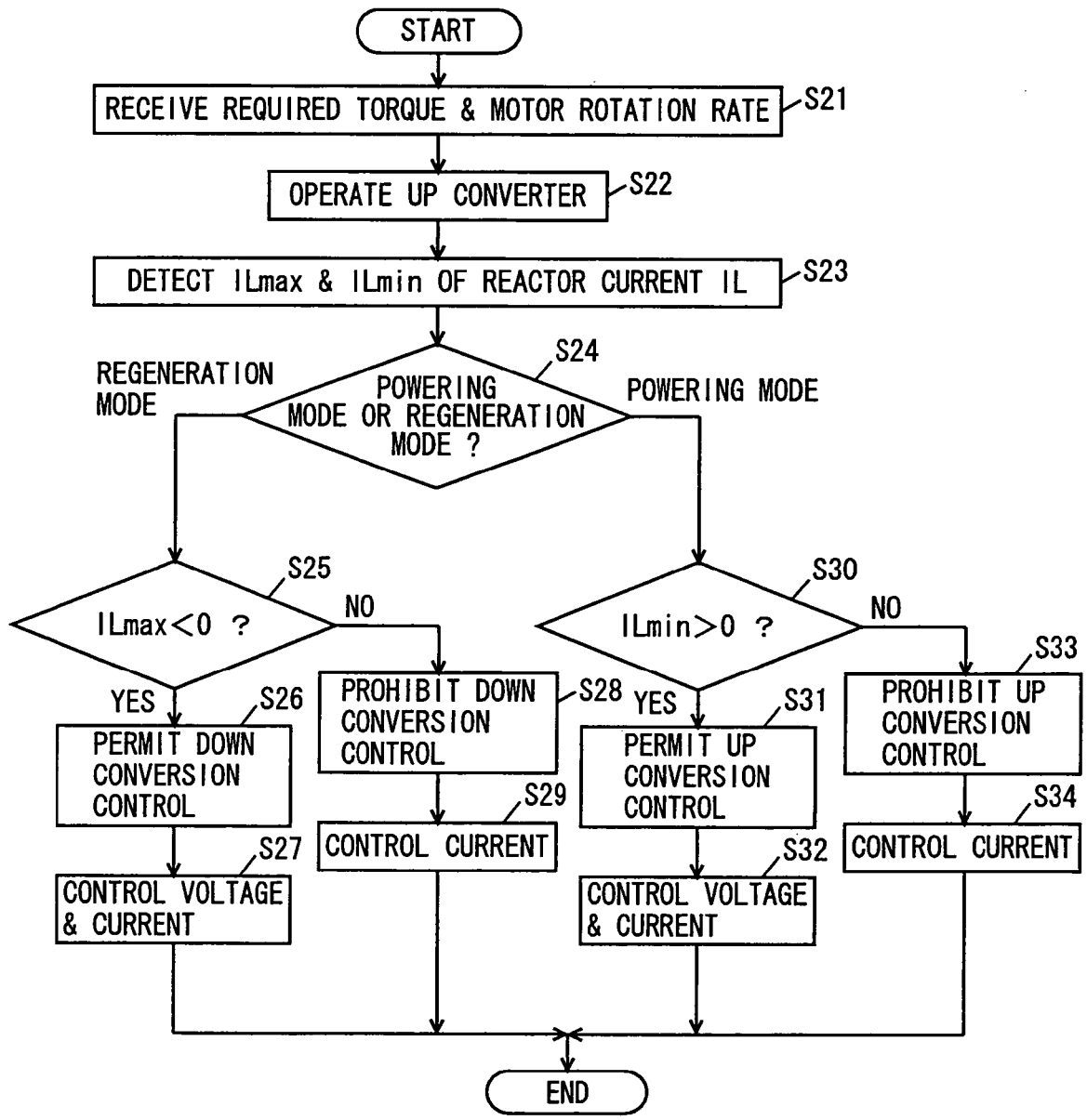
FIG. 11 is a flow chart for illustrating an operation of voltage conversion reducing switching noise in the second embodiment.

FIG. 11 is a flow chart for illustrating an operation of power conversion contributing to reduced switching noise in the second embodiment. With reference to the figure, when a series of operation is started, converter control circuit 302A receives torque command value TR (i.e., a required torque) and motor rotation rate MRN from the external ECU (step S21). Furthermore, converter control circuit 302A receives voltages Vb and Vm from voltage sensors 10 and 13, respectively. The converter control circuit 302A voltage command calculation portion 61 uses torque command value TR and motor rotation rate MRN and follows the above described method to calculate voltage command Vdc_com and output it to converter associated duty ratio calculation portion 62. Converter associated duty ratio calculation portion 62 is driven by voltage command Vdc_com received from voltage command calculation portion 61 and voltages Vb and Vm and follows the above described method to generate and output a duty ratio DRU or DRD to converter associated PWM signal conversion portion 63. Converter associated PWM signal conversion portion 63 is driven by duty ratio DRU or DRD received from converter associated duty ratio calculation portion 62 to generate and output signal PWMU or PWMD to up converter 12. Up converter 12 operates in response to signals PWMU and PWMD to switch to perform up converting and down converting operations, respectively (step S2). Subsequently, the converter control circuit 302A peak detection portion 65 receives reactor current IL from current sensor 18 and detects the current's maximum and minimum values ILmax and ILmin (step S23). Control portion 64A receives torque command value TR and motor rotation rate MRN from the external ECU and determines therefrom in the above method whether AC motor M1 operates in the regeneration mode or the powering mode (step S24).

If AC motor M1 operates in the regeneration mode, control portion 64A further determines whether reactor current IL received from peak detection portion 65 has maximum value ILmax smaller than zero (step S25).

If maximum value ILmax is smaller than zero, control portion 64A determines that reactor current IL does not traverse the zero point, and control portion 64A generates and outputs signal OPE to voltage command calculation portion 61. Voltage command calculation portion 61, having received signal OPE from control portion 64A, uses torque command value TR and motor rotation rate MRN from the external ECU and follows the above described method to calculate voltage command Vdc_com and outputs it to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRD to converter associated PWM signal conversion portion 63. Converter associated PWM signal conversion portion 63 is driven by duty ratio DRD received from converter associated duty ratio calculation portion 62 to generate and output signal PWMD to up converter 12. Converter control circuit 302A thus permits down conversion control (step S26).

In response, up converter 12 has NPN transistors Q1, Q2 turned on/off in response to signal PWMD from converter control circuit 302A to down convert voltage Vm across capacitor C2 to attain voltage command Vdc_com, and the down converted DC voltage is supplied to DC power supply B. Thus voltage and current are controlled (step S27), and the series of operation ends.

In contrast if at S25, reactor current IL has maximum value ILmax equal to or larger than zero control portion 64A determine that when up converter 12 performs a down converting operation reactor current IL traverses the zero point, and signals STP and DSTP are generated and output to voltage command calculation portion 61 and converter associated duty ratio calculation portion 62, respectively. Voltage command calculation portion 61, having received signal STP from control portion 64A, calculates and outputs voltage command Vdc_com_0 to converter associated duty ratio calculation portion 62.

Converter associated duty ratio calculation portion 62 is driven by Vdc_com_0 and signal DSTP from voltage command calculation portion 61 and control portion 64A, respectively, and follows the above described method to generate and output duty ratio DR_100_0 to converter associated PWM signal conversion portion 63. Converter associated PWM signal conversion portion 63 is driven by DR_100_0 to generate and output signal PWMS2 to up converter 12. Converter control circuit 302A thus prohibits down conversion control (step S28).

In response, up converter 12 has NPN transistor Q1 turned on in response to signal PWMS2 from converter control circuit 302A and has NPN transistor Q2 turned off in response to signal PWMS2, and up converter 12 stops switching to perform a down converting operation, and supplies a DC current via NPN transistor Q1 from capacitor C2 to DC power supply B. In other words, a current is controlled (step S29), and the series of operation ends.

If at step S24 a decision is made that AC motor M1 operates in the powering mode, the converter control circuit 302A control portion 64A determines whether reactor current IL received from peak detection portion 65 has minimum value ILmin larger than zero (step S30).

If so, then control portion 64A determines that reactor current IL does not traverse the zero point, and generates and outputs signal OPE to voltage command calculation portion 61. Voltage command calculation portion 61, having received signal OPE from control portion 64A, uses torque command value TR and motor rotation rate MRN received from the external ECU and follows the above described method to calculate voltage command Vdc_com and output it to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRU to converter associated PWM signal conversion portion 63. Converter associated PWM signal conversion portion 63 is driven by duty ratio DRU to generate and output signal PWMU to up converter 12. Converter control circuit 302A thus permits up conversion control. (step S31).

In response, up converter 12 has NPN transistors Q1, Q2 turned on/off in response to signal PWMU output from converter control circuit 302A to up convert DC voltage Vb provided from DC power supply B so that up converter 12 outputs voltage Vm matching voltage command Vdc_com, and the up converted DC voltage is supplied to capacitor C2, i.e., voltage and current are controlled (step S32). The series of operations thus ends.

In contrast, if at step S30 reactor current IL has minimum value ILmin equal to or smaller than zero, control portion 64A determines that when up converter 12 performs an up converting operation reactor current IL traverses the zero point, and control portion 64A generates and outputs signals STP and USTP to voltage command calculation portion 61 and converter associated duty ratio calculation portion 62, respectively.

In response, voltage command calculation portion 61 operates in response to signal STP received from control portion 64A to generate and output voltage command Vdc_com_0 to converter associated duty ratio calculation portion 62. Converter associated duty ratio calculation portion 62 is driven by voltage command Vdc_com_0 from voltage command calculation portion 61 and signal USTP from control portion 64A to generate and output duty ratio DR_0 to converter associated PWM signal conversion portion 63. Converter associated PWM signal conversion portion 63 is driven by duty ratio DR_0 to generate and output signal PWMS1 to up converter 12. Converter control circuit 302A thus prohibits up conversion control (step S33).

In response to signal PWMS1 up converter 12 stops NPN transistors Q1, Q2 from switching and supplies a DC current required for an operation of inverter 14 via diode D1 from DC power supply B to capacitor C2, i.e., a current is controlled (step S34). The series of operation thus ends.

Thus converter control circuit 302A determines a mode of operation of AC motor M1 from torque command value TR and motor rotation rate MRN and from the determined mode of operation and the reactor current IL maximum value ILmax and minimum value ILmin determines whether reactor current IL traverses the zero point. If so, converter control circuit 302A controls up converter 12 to stop switching to perform an up converting or down converting operation, otherwise converter control circuit 302A controls up converter 12 to switch to perform the up converting or down converting operation.

Thus up converter 12 can have NPN transistors Q1, Q2 switching less frequently and thus providing reduced switching noise. Furthermore, NPN transistors Q1, Q2 switching less frequently can contribute to reduced switching loss.

Note that in the present invention the control of voltage conversion that contributes to reduced switching noise is in effect performed by a central processing unit (CPU) reading from a read only memory (ROM) a program including each step of the FIG. 11 flow chart, and executing the read program and following the FIG. 11 flow chart to control up converter 12 to switch to perform an up converting or down converting operation. Accordingly, the ROM corresponds to a computer (CPU) readable storage medium having recorded therein the program including each step of the FIG. 11 flow chart.

Motor drive apparatus 100A provides a general operation corresponding to that of motor drive apparatus 100 having an operation of converter control circuit 302 contributing to reduced switching noise replaced with that of converter control circuit 302A.

The remainder is identical to that of the first embodiment.

Third Embodiment

Figure 12:
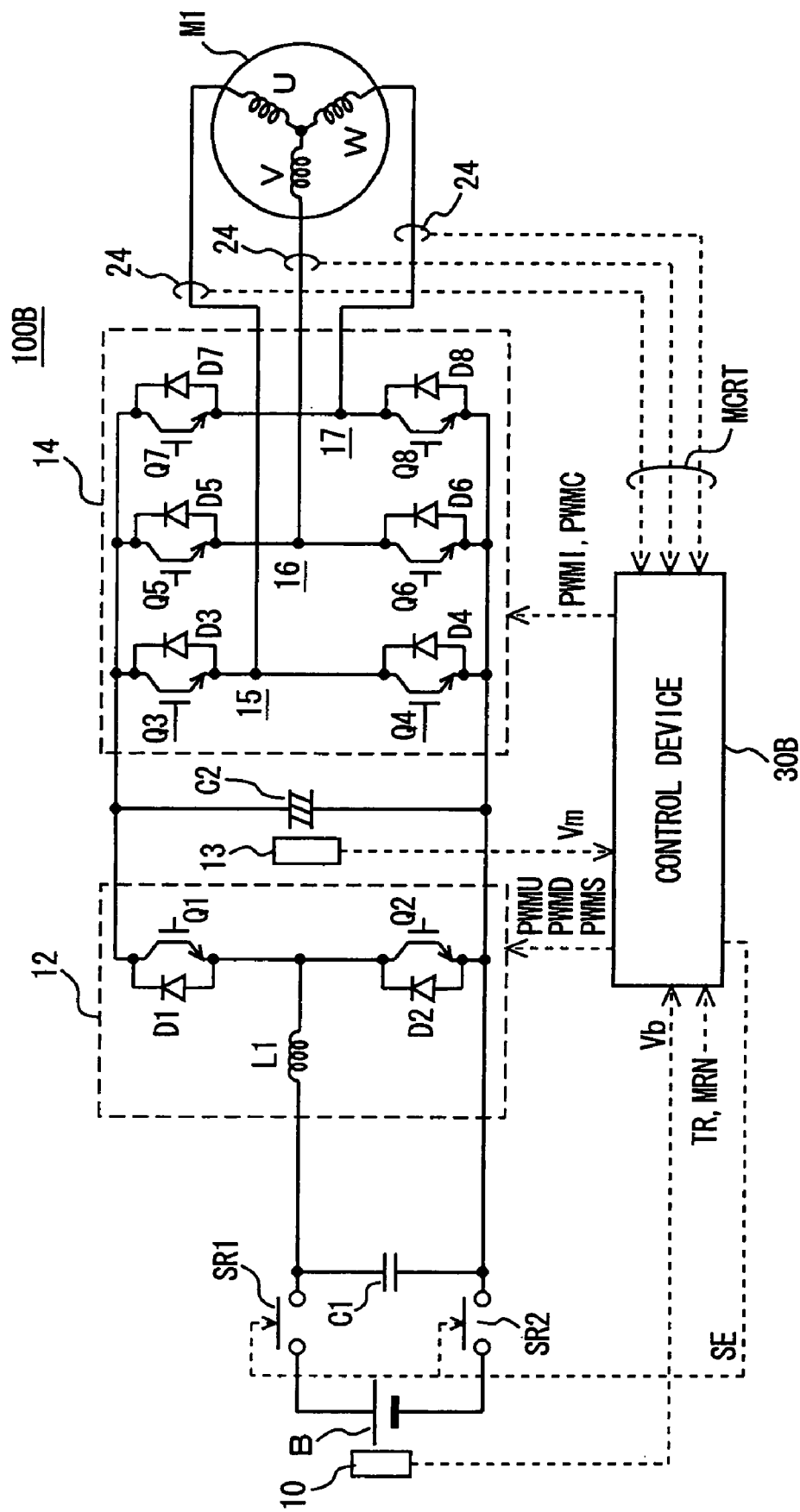
FIG. 12 is a schematic block diagram of a motor drive apparatus in a third embodiment.

FIG. 12 is a block diagram schematically showing the motor drive apparatus in a third embodiment. With reference to the figure, the third embodiment provides a motor drive apparatus 100B corresponding to motor drive apparatus 100 minus current sensors 11, 18 and having control device 30 replace with a control device 30B.

Control device 30B determines from torque command value TR and motor rotation rate MRN from an external ECU in a method, as will be described hereinafter, whether reactor current IL traverses the zero point. If so, control device 30B controls up converter 12 to stop switching to perform an up converting or down converting operation, otherwise control device 30B controls up converter 12 to switch to perform the up converting or down converting operation.

Control device 30B other than that provides the same function as control device 30.

Figure 13:
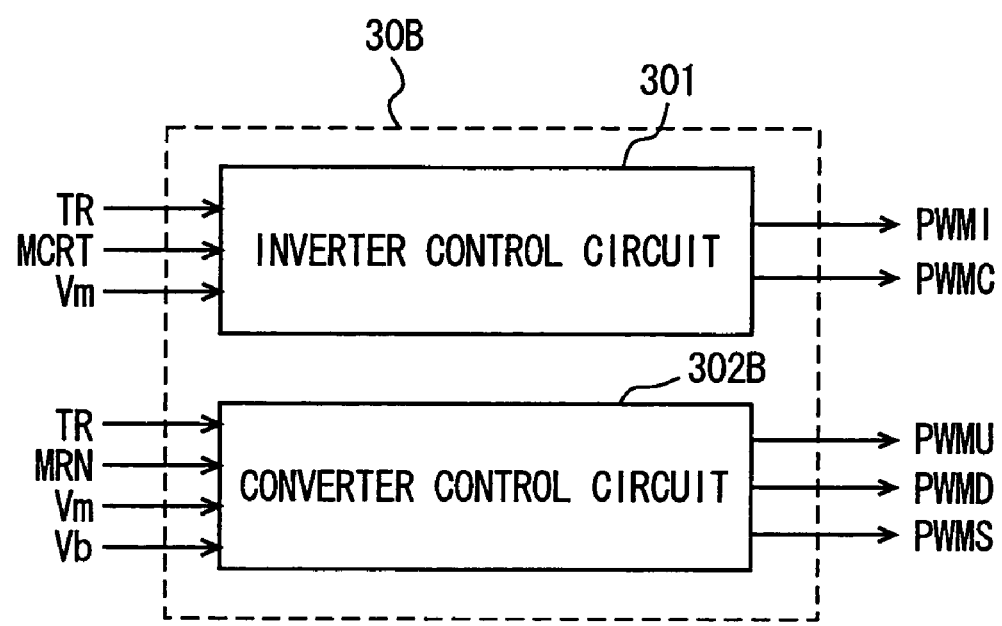
FIG. 13 is a block diagram of the control device shown in FIG. 12.

FIG. 13 is a block diagram of the FIG. 12 control device 30B. With reference to the figure, control device 30B corresponds to control device 30 having converter control circuit 302 replaced with a converter control circuit 302B.

Converter control circuit 302B determines from torque command value TR and motor rotation rate MRN in a method, as will be described hereinafter, whether reactor current IL traverses the zero point and if so converter control circuit 302B generates signal PWMS for stopping NPN transistors Q1, Q2 from switching and outputs the generated signal PWMS to up converter 12. If reactor current IL does not traverse the zero point, converter control circuit 302B generates signal PWMU or PWMD to control up converter 12 to switch to perform an up converting or down converting operation.

Converter control circuit 302B other than that performs the same function as converter control circuit 302.

Figure 14:
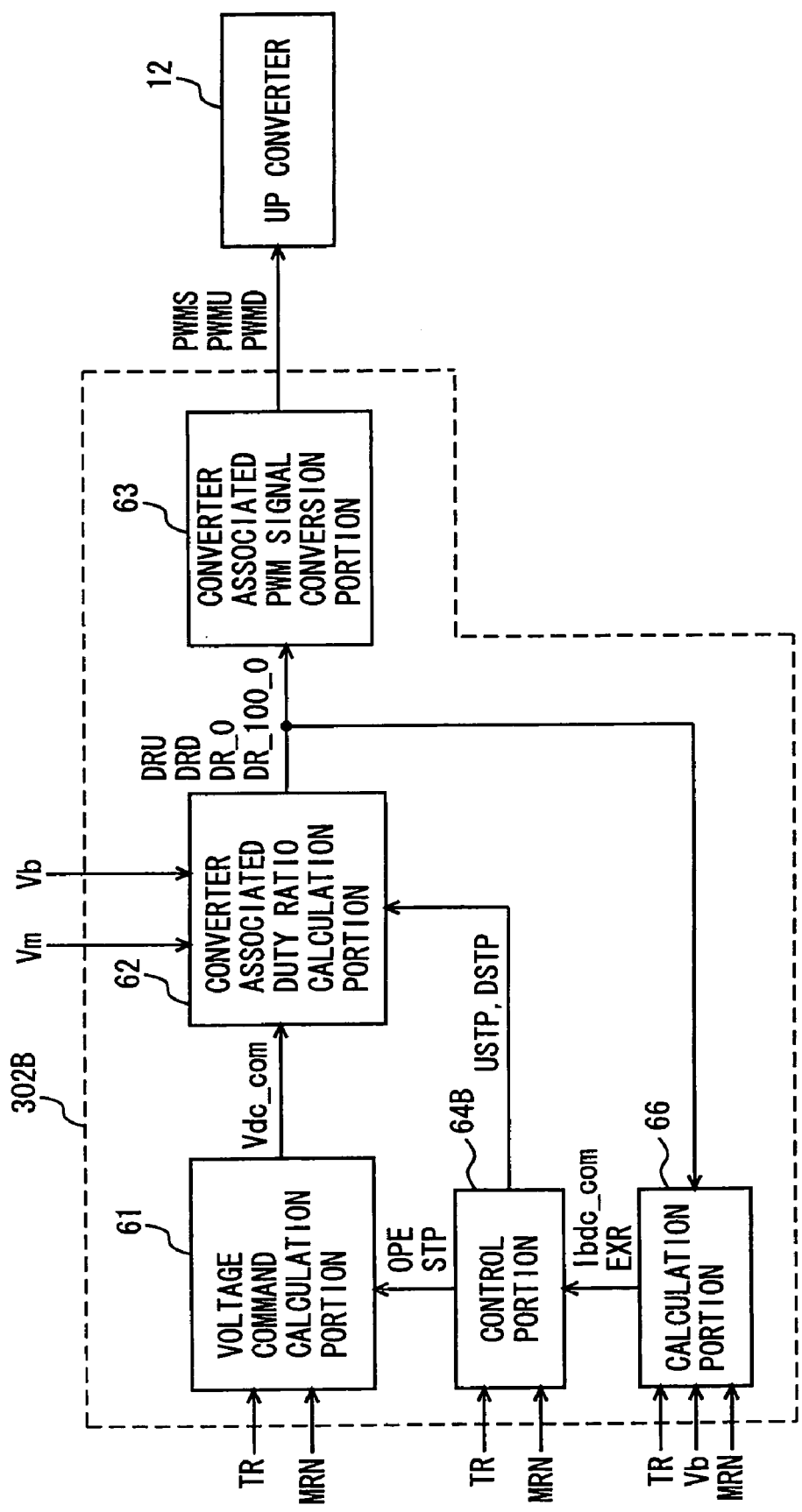
FIG. 14 is a block diagram of the converter control circuit shown in FIG. 13.

FIG. 14 is a block diagram of the FIG. 13 converter control circuit 302B. With reference to the figure, converter control circuit 302B corresponds to converter control circuit 302 having control portion 64 and peak detection portion 65 replaced with a control portion 64B and a calculation portion 66, respectively.

Calculation portion 66 receives torque command value TR and motor rotation rate MRN from the external ECU and voltage Vb from voltage sensor 10, and substitutes torque command value TR and motor rotation rate MRN into an expression:

$$Pcom = TR \times MRN \qquad (1)$$

to calculate required power Pcom which is substituted into an expression:

$$\left. \begin{array}{l} \frac{1}{2}L(\text{ILdc\_com})^2 = Pcom \\ \rightarrow \text{ILdc\_com} = \sqrt{\frac{2Pcom}{L}} \end{array} \right\} \qquad (2)$$

to calculate a reactor current ILdc_com required for AC motor M1 to output required power Pcom, wherein L represents the reactor's inductance and ILdc_com represents a required reactor current.

Furthermore, calculation portion 66 substitutes required power Pcom calculated by expression (1) into an expression:

$$\left. \begin{array}{l} \frac{1}{2}C(\text{Vdc\_com})^2 = Pcom \\ \rightarrow \text{Vdc\_com} = \sqrt{\frac{2Pcom}{C}} \end{array} \right\} \qquad (3)$$

to calculate voltage command Vdc_com of up converter 12, wherein C represents a capacitance of a capacitor close to an input of the inverter, and Vdc_com represents the up converter's voltage command value.

Calculation portion 66 substitutes voltage command Vdc_com calculated by expression (3) and voltage Vb received from voltage sensor 10 into an expression:

$$EXR = \frac{\text{Vdc\_com}}{Vb} \qquad (4)$$

to calculate a voltage conversion ratio EXR.

Furthermore, calculation portion 66 substitutes required reactor current ILdc_com calculated by expression (2) and duty ratio DR (DRU or DRD) provided from converter associated duty ratio calculation portion 62 into an expression:

$$ILdc\_com = Ibdc\_com \times DR \quad (5)$$

to calculate a power supply current Ibdc_com required for AC motor M1 to output required power Pcom, wherein DR represents on-duty of transistor Q2.

Note that required power supply current Ibdc_com is a current flowing in a single control period of NPN transistors Q1, Q2.

Calculation portion 66 outputs the calculated voltage conversion ratio EXR and required power supply current Ibdc_com to control portion 64B.

Control portion 64B receives torque command value TR and motor rotation rate MRN from the external ECU, and receives voltage conversion ratio EXR and required power supply current Ibdc_com from calculation portion 66.

Figure 15:
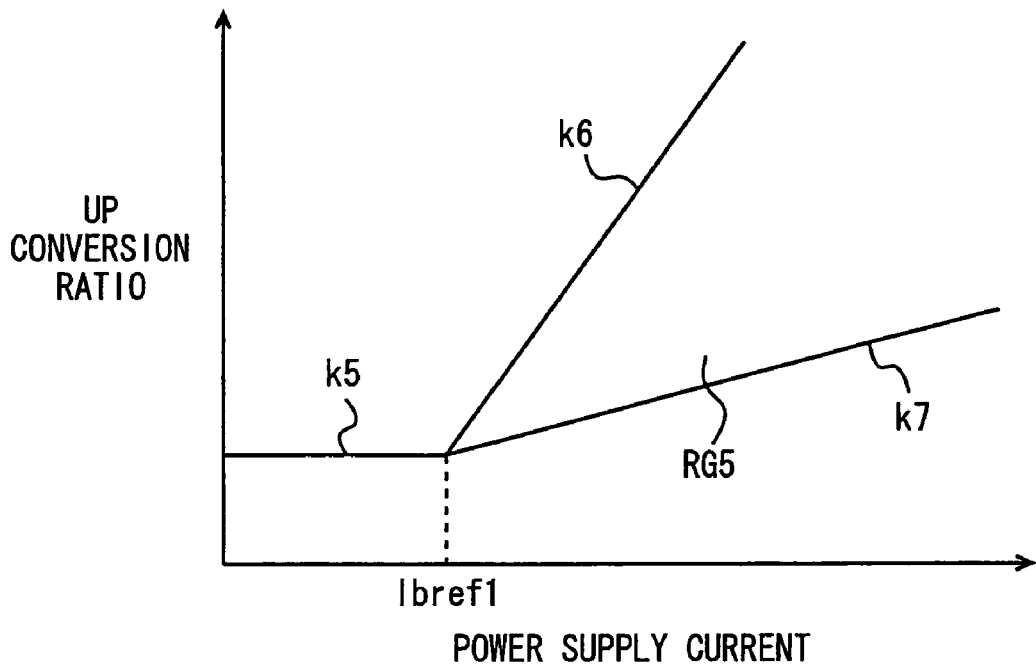
FIG. 15 represents a relationship between an up-conversion ratio and a power supply current.

Furthermore, control portion 64B holds a map representing a relationship between an up conversion ratio and power supply current Ib and a map representing a relationship between a down conversion ratio and power supply current Ib. FIG. 15 represents a relationship between the up conversion ratio and power supply current Ib, and FIG. 16 represents that between the down conversion ratio and power supply current Ib.

With reference to FIG. 15, Ibref1 represents a positive critical current value, which is a current value of power supply current Ibdc_com required when reactor current IL traverses the zero point when AC motor M1 operates in the powering mode.

When power supply current Ib is equal to or smaller than positive critical current value Ibref1 the up conversion ratio holds a constant value in accordance with a straight line k5. When power supply current Ib is larger than positive critical current value Ibref1, the up conversion ratio exists in a region RG5 surrounded by straight lines k6 and k7.

Figure 16:
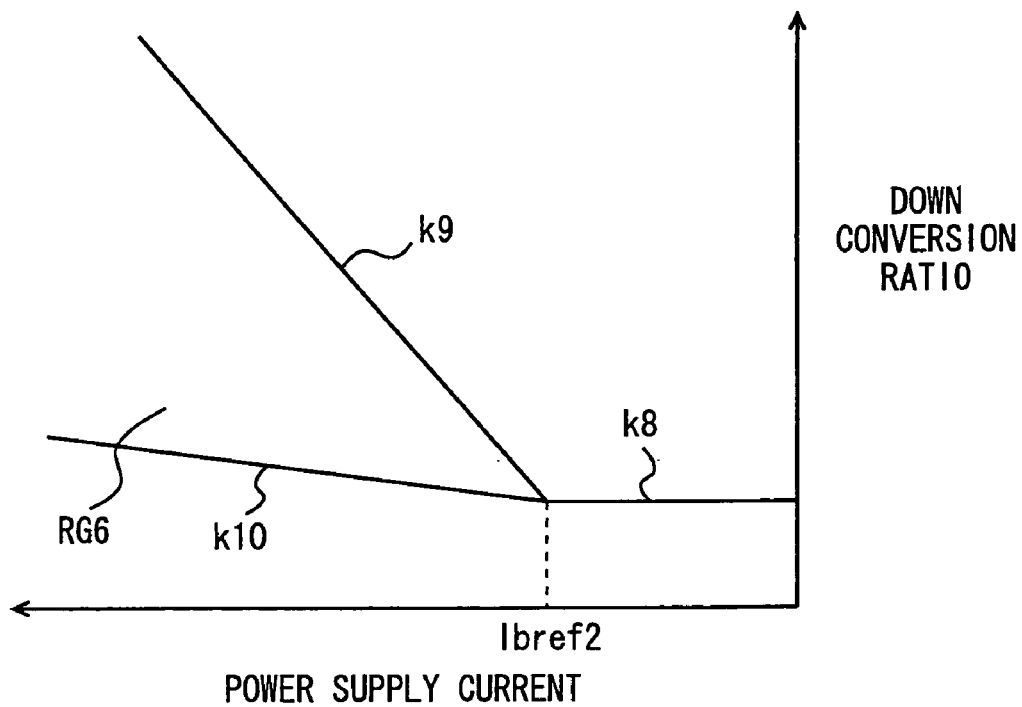
FIG. 16 represents a relationship between a down-conversion ratio and a power supply current.

With reference to FIG. 16, Ibref2 represents a negative critical current value, which is a current value of power supply current Ibdc_com required when reactor current IL traverses the zero point when AC motor M1 operates in the regeneration mode.

When power supply current Ib is equal to or larger than negative critical current value Ibref2 the down conversion ratio holds a constant value in accordance with a straight line k8. When power supply current Ib is smaller than negative critical current value Ibref2, the down conversion ratio exists in a region RG6 surrounded by straight lines k9 and k10.

Control portion 64B holds the FIG. 15 map and the FIG. 16 map.

Control portion 64B determines from torque command value TR and motor rotation rate MRN in the above described method whether AC motor M1 operates in the regeneration mode or the powering mode. If the motor operates in the powering mode, control portion 64B determines whether voltage conversion ratio EXR (in this scenario, the up conversion ratio) and required power supply current Ibdc_com received from calculation portion 66 exist in the FIG. 15 map on straight line k5 or in region RG5.

If voltage conversion ratio EXR and required power supply current Ibdc_com exist on straight line k5, control portion 64B determines that reactor current IL traverses the zero point. If voltage conversion ratio EXR and required power supply current Ibdc_com exist in region RG5, control portion 64B determines that reactor current IL does not traverse the zero point.

Determining that voltage conversion ratio EXR and required power supply current Ibdc_com exist on straight line k5 corresponds to determining whether required power supply current Ibdc_com is larger than positive critical current value Ibref1, and determining that the current is equal to or smaller than the value. Determining that voltage conversion ratio EXR and required power supply current Ibdc_com exist in region RG5 corresponds to determining whether the current is larger than positive critical current value Ibref1, and determining that the current is larger than the value.

When voltage conversion ratio EXR and required power supply current Ibdc_com exist on straight line k5, control portion 64B generates and outputs signals STP and USTP to voltage command calculation portion 61 and converter associated duty ratio calculation portion 62, respectively.

When voltage conversion ratio EXR and required power supply current Ibdc_com exist in region RG5, control portion 64B generates and outputs signal OPE to voltage command calculation portion 61.

If AC motor M1 operates in the regenerative mode, control portion 64B determines whether voltage conversion ratio EXR (in this scenario, the down conversion ratio) and required power supply current Ibdc_com received from calculation portion 66 exist in the FIG. 16 map on straight line k8 or in region RG6.

If voltage conversion ratio EXR and required power supply current Ibdc_com exist on straight line k8, control portion 64B determines that reactor current IL traverses the zero point. If voltage conversion ratio EXR and required power supply current Ibdc_com exist in region RG6, control portion 64B determines that reactor current IL does not traverse the zero point.

Determining that voltage conversion ratio EXR and required power supply current Ibdc_com exist on straight line k8 corresponds to determining whether required power supply current Ibdc_com is smaller than negative critical current value Ibref2, and determining that the current is equal to or larger than the value. Determining that voltage conversion ratio EXR and required power supply current Ibdc_com exist in region RG6 corresponds to determining whether the current is smaller than negative critical current value Ibref2, and determining that the current is smaller than the value.

When voltage conversion ratio EXR and required power supply current Ibdc_com exist on straight line k8, control portion 64B generates and outputs signals STP and USTP to voltage command calculation portion 61 and converter associated duty ratio calculation portion 62, respectively.

When voltage conversion ratio EXR and required power supply current Ibdc_com exist in region RG6, control portion 64B generates and outputs signal OPE to voltage command calculation portion 61.

Note that in converter control circuit 302B converter associated duty ratio calculation portion 62 outputs the calculated duty ratios DRU and DRD to converter associated PWM signal conversion portion 63 and calculation portion 66.

Figure 17:
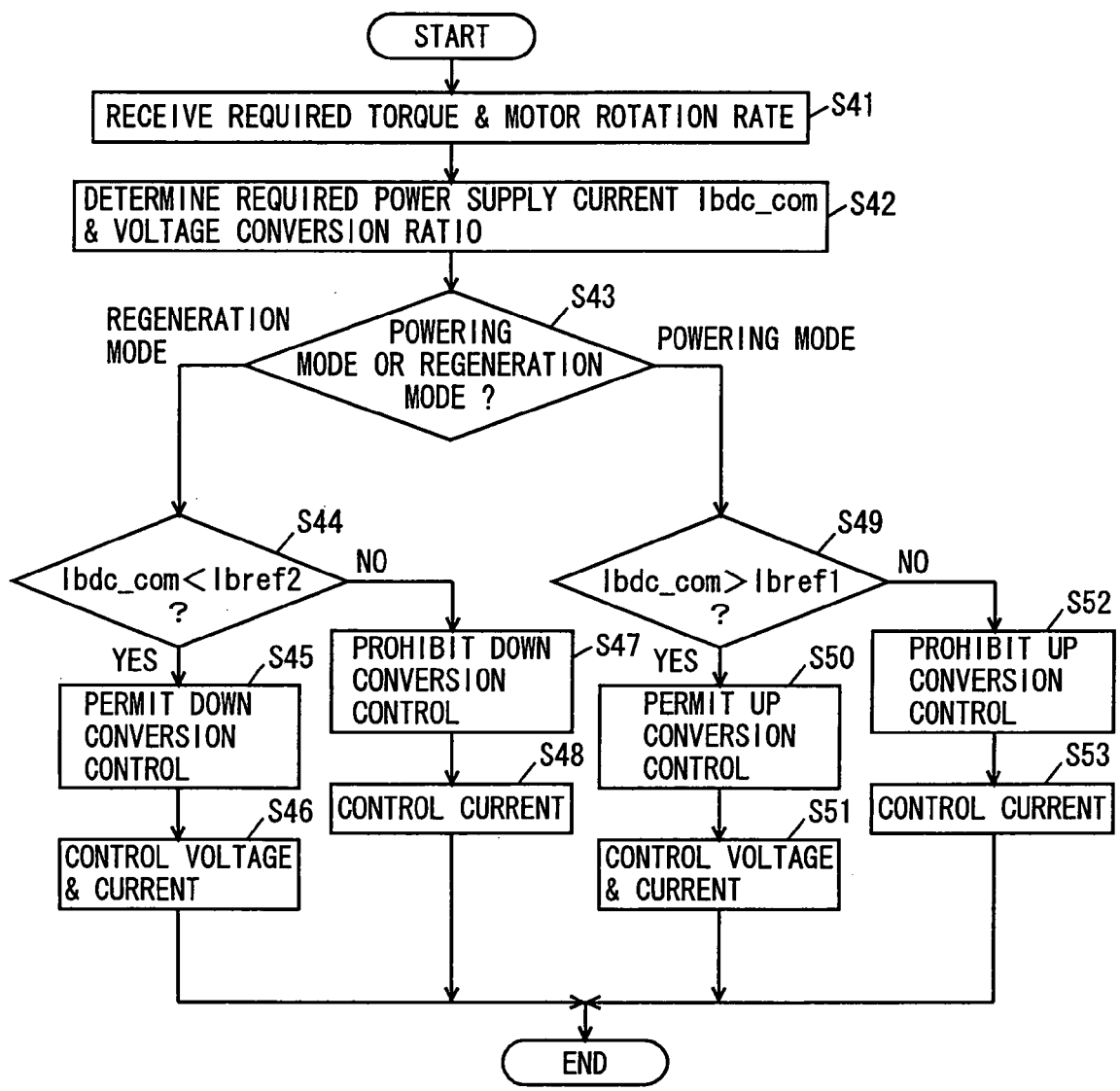
FIG. 17 is a flow chart for illustrating an operation of voltage conversion reducing switching noise in a third embodiment.

FIG. 17 is a flow chart for illustrating an operation of voltage conversion contributing to reduced switching noise in the third embodiment. With reference to figure, when a series of operation starts, converter control circuit 302B receives torque command value TR (i.e., a required torque) and motor rotation rate MRN from an external ECU (step S41), and the converter control circuit 302B calculation portion 66 uses torque command value TR and motor rotation rate MRN and follows the above described method to calculate and output required power supply current Ibdc_com and voltage conversion ratio EXR to control portion 64B. Required power supply current Ibdc_com and motor rotation ratio MRN are thus determined (step S42).

Control portion 64B receives torque command value TR and motor rotation rate MRN from the external ECU, and determines therefrom in the above described method whether AC motor M1 operates in the regeneration mode or the powering mode (step S43).

If the motor operates in the regeneration mode, control portion 64B refers to the FIG. 16 map to further determine whether required power supply current Ibdc_com and voltage conversion ratio EXR received from calculation portion 66 exist on straight line k8 or in region RG6 to determine whether the current is smaller than negative critical current value Ibref2 (step S44).

If required power supply current Ibdc_com is smaller than negative critical current value Ibref2, control portion 64B determines that reactor current IL does not traverse the zero point, and generates and outputs signal OPE to voltage command calculation portion 61. Voltage command calculation portion 61 having received signal OPE from control portion 64B uses torque command value TR and motor rotation rate MRN received from the external ECU and follows the above described method to calculate and output voltage command Vdc_com to converter associated duty ratio calculation portion 62.

Converter associated duty ratio calculation portion 62 is driven by voltage command Vdc_com received from voltage command calculation portion 61 and voltages Vb, Vm and follows the above described method to generate and output duty ratio DRD to converter associated PWM signal conversion portion 63 and calculation portion 66. Converter associated PWM signal conversion portion 63 is driven by duty ratio DRD to generate and output signal PWMD to up converter 12. Converter control circuit 302B thus permits down conversion control (step S45).

In response, up converter 12 has NPN transistors Q1, Q2 turned on/off in response to signal PWMD from converter control circuit 302B to down convert voltage Vm across capacitor C2 to attain voltage command Vdc_com, and the down converted DC voltage is supplied to DC power supply B. Thus voltage and current are controlled (step S46), and the series of operation ends.

In contrast if at S44 required power supply current Ibdc_com is equal to or larger than negative critical current value Ibref2 control portion 64B determine that when up converter 12 performs a down converting operation reactor current IL traverses the zero point, and signals STP and DSTP are generated and output to voltage command calculation portion 61 and converter associated duty ratio calculation portion 62, respectively. Voltage command calculation portion 61, having received signal STP from control portion 64B, calculates and outputs voltage command Vdc_com_0 to converter associated duty ratio calculation portion 62.

Converter associated duty ratio calculation portion 62 is driven by Vdc_com_0 and signal DSTP from voltage command calculation portion 61 and control portion 64B, respectively, and follows the above described method to generate and output duty ratio DR_100_0 to converter associated PWM signal conversion portion 63. Converter associated PWM signal conversion portion 63 is driven by DR_100_0 to generate and output signal PWMS2 to up converter 12. Converter control circuit 302B thus prohibits down conversion control (step S47).

In response, up converter 12 has NPN transistor Q1 turned on in response to signal PWMS2 from converter control circuit 302B and has NPN transistor Q2 turned off in response to signal PWMS2, and up converter 12 stops switching to perform a down converting operation, and supplies a DC current via NPN transistor Q1 from capacitor C2 to DC power supply B. In other words, a current is controlled (step S48), and the series of operation ends.

Furthermore, if at step S43 a decision is made that AC motor M1 operates in the powering mode then the converter control circuit 302B control portion 64B further refers to the FIG. 15 map to determine whether required power supply current Ibdc_com and voltage conversion ratio EXR received from calculation portion 66 exist on straight line k5 or in region RG5 to determine whether the current is larger than positive critical current value Ibref1 (step S49).

If required power supply current Ibdc_com is larger than positive critical current value Ibref1, control portion 64B determines that reactor current IL does not traverse the zero point, and generates and outputs signal OPE to voltage command calculation portion 61. Voltage command calculation portion 61, having received signal OPE from control portion 64B, uses torque command value TR and motor rotation rate MRN received from the external ECU and follows the above described method to calculate voltage command Vdc_com and output it to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRU to converter associated PWM signal conversion portion 63 and calculation portion 66. Converter associated PWM signal conversion portion 63 is driven by duty ratio DRU to generate and output signal PWMU to up converter 12. Converter control circuit 302B thus permits up conversion control (step S50).

In response, up converter 12 has NPN transistors Q1, Q2 turned on/off in response to signal PWMU output from converter control circuit 302B to up convert DC voltage Vb provided from DC power supply B so that converter 12 outputs voltage Vm matching voltage command Vdc_com, and the up converted DC voltage is supplied to capacitor C2, i.e., voltage and current are controlled (step S51). The series of operations thus ends.

In contrast, if at step S49 required power supply current Ibdc_com is equal to or smaller than positive critical current value Ibref1, control portion 64B determines that when up converter 12 performs an up converting operation reactor current IL traverses the zero point, and control portion 64B generates and outputs signals STP and USTP to voltage command calculation portion 61 and converter associated duty ratio calculation portion 62, respectively.

In response, voltage command calculation portion 61 operates in response to signal STP received from control portion 64B to generate and output voltage command Vdc_com_0 to converter associated duty ratio calculation portion 62. Converter associated duty ratio calculation portion 62 is driven by voltage command Vdc_com_0 from voltage command calculation portion 61 and signal USTP from control portion 64B to generate and output duty ratio DR_0 to converter associated PWM signal conversion portion 63. Converter associated PWM signal conversion portion 63 is driven by duty ratio DR_0 to generate and output signal PWMS1 to up converter 12 for stopping switching to perform the up converting operation. Converter control circuit 302B thus prohibits up conversion control (step S52).

In response to signal PWMS1 up converter 12 stops NPN transistors Q1, Q2 from switching and supplies a DC current required for an operation of inverter 14 via diode D1 from DC power supply B to capacitor C2, i.e., a current is controlled (step S53). The series of operation thus ends.

Thus converter control circuit 302B determines a mode of operation of AC motor M1 from torque command value TR and motor rotation rate MRN and from the determined mode of operation and required power supply current Ibdc_com and voltage conversion ratio EXR determines whether reactor current IL traverses the zero point. If so, converter control circuit 302B controls up converter 12 to stop switching to perform an up converting or down converting operation, otherwise converter control circuit 302B controls up converter 12 to switch to perform the up converting or down converting operation.

Thus up converter 12 can have NPN transistors Q1, Q2 switching less frequently and thus providing reduced switching noise. Furthermore, NPN transistors Q1, Q2 switching less frequently can contribute to reduced switching loss.

Note that in the present invention the control of voltage conversion that contributes to reduced switching noise is in effect performed by a CPU reading from a ROM a program including each step of the FIG. 17 flow chart, and executing the read program and following the FIG. 17 flow chart to control up converter 12 to switch to perform an up converting or down converting operation. Accordingly, the ROM corresponds to a computer (CPU) readable storage medium having recorded therein the program including each step of the FIG. 17 flow chart.

Motor drive apparatus 100B provides a general operation corresponding to that of motor drive apparatus 100 having an operation of converter control circuit 302 contributing to reduced switching noise replaced with that of converter control circuit 302B.

Note that in the third embodiment, whether require power supply current Ibdc_com is "0" is determined and if so NPN transistors Q1, Q2 may be stopped from switching. In other words, in the third embodiment, whether to stop the transistors from switching may be determined from required power supply current Ibd_com.

Stopping NPN transistors Q1, Q2 from switching for required power supply current Ibd_com of zero can maintain power transmission and reception in balance without a particular process, as before and after the transistors are stopped from switching, up converter 12 passes an invariable amount of power.

The remainder is identical to that of the first embodiment.

Fourth Embodiment

Figure 18:
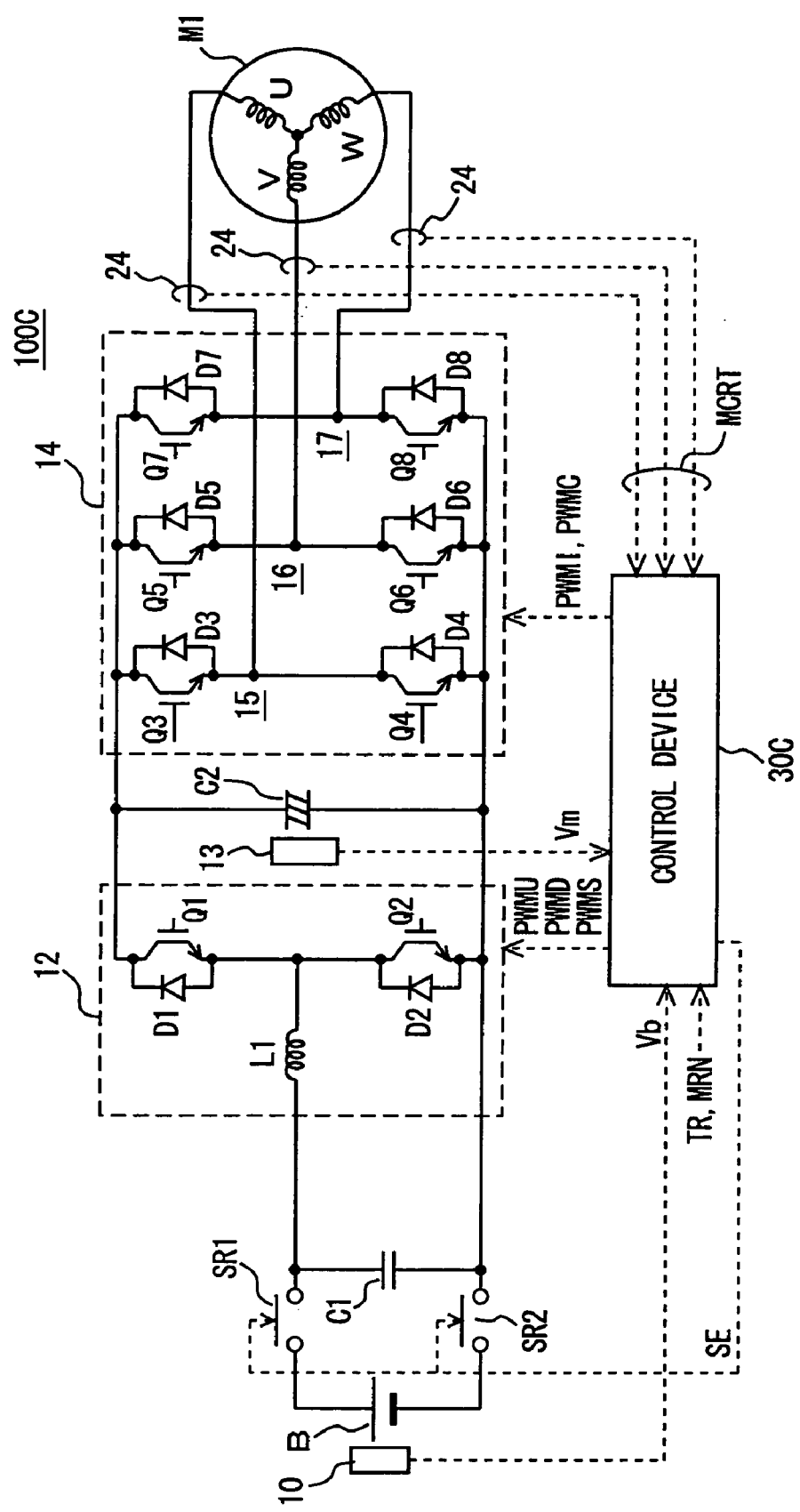
FIG. 18 is a schematic block diagram of a motor drive apparatus of a fourth embodiment.

FIG. 18 is a block diagram schematically showing the motor drive apparatus in a fourth embodiment. With reference to the figure, the fourth embodiment provides a motor drive apparatus 100C corresponding to motor drive apparatus 100 minus current sensors 11, 18 and having control device 30 replace with a control device 30C.

Control device 30C determines from torque command value TR and motor rotation rate MRN from an external ECU in a method, as will be described hereinafter, whether reactor current IL traverses the zero point. If so, control device 30C controls up converter 12 to stop switching to perform an up converting or down converting operation, otherwise control device 30C controls up converter 12 to switch to perform the up converting or down converting operation.

Control device 30C other than that provides the same function as control device 30.

Figure 19:
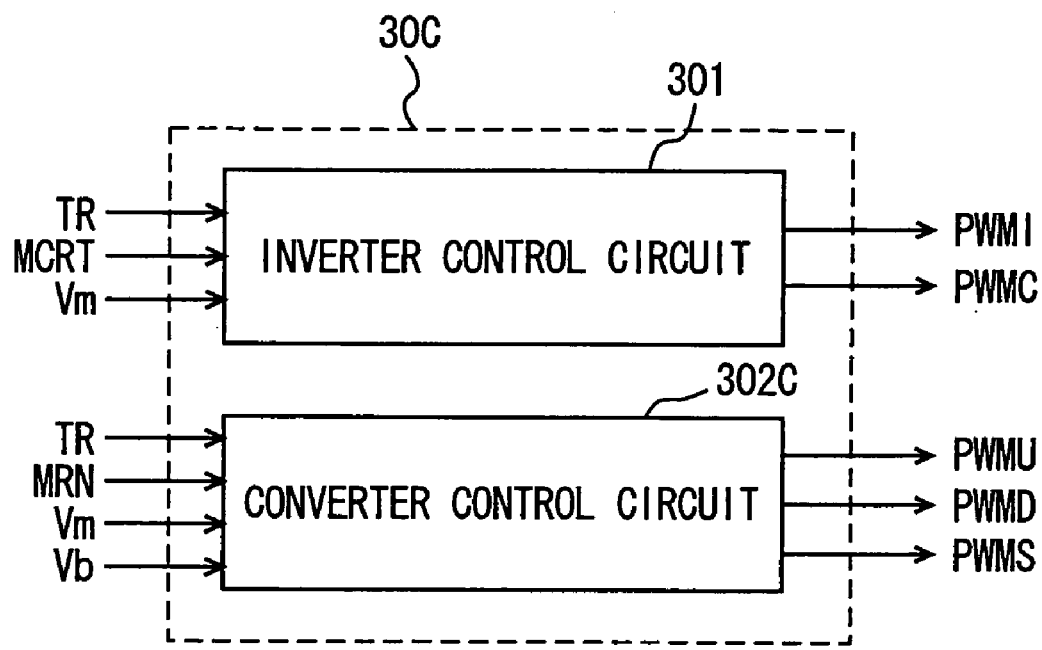
FIG. 19 is a block diagram of the control device shown in FIG. 18.

FIG. 19 is a block diagram of the FIG. 18 control device 30C. With reference to the figure, control device 30C corresponds to control device 30 having converter control circuit 302 replaced with a converter control circuit 302C.

Converter control circuit 302C determines from torque command value TR and motor rotation rate MRN in a method, as will be described hereinafter, whether reactor current IL traverses the zero point and if so converter control circuit 302C generates signal PWMS for stopping NPN transistors Q1, Q2 from switching and outputs the generated signal PWMS to up converter 12. If reactor current IL does not traverse the zero point, converter control circuit 302C generates signal PWMU or PWMD to control up converter 12 to switch to perform an up converting or down converting operation.

Converter control circuit 302C other than that performs the same function as converter control circuit 302.

Figure 20:
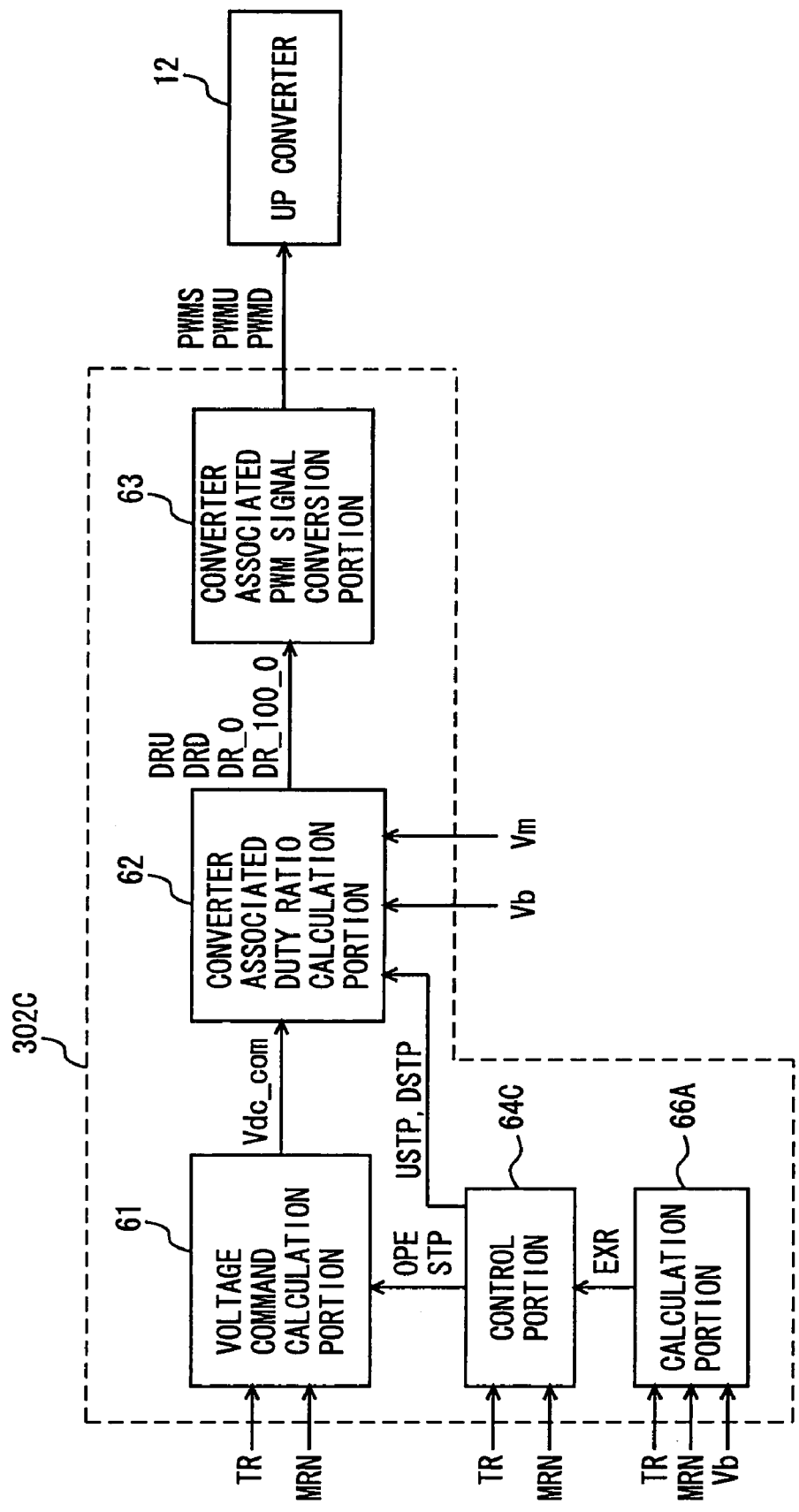
FIG. 20 is a functional block diagram of the converter control circuit shown in FIG. 19.

FIG. 20 is a block diagram of the FIG. 19 converter control circuit 302C. With reference to the figure, converter control circuit 302C corresponds to converter control circuit 302 having control portion 64 and peak detection portion 65 replaced with a control portion 64C and a calculation portion 66A, respectively.

Calculation portion 66A receives torque command value TR and motor rotation rate MRN from the external ECU and voltage Vb from voltage sensor 10 and uses them and expressions (1), (3) and (4) to calculate and output voltage conversion ratio EXR to control portion 64C.

Figure 21:
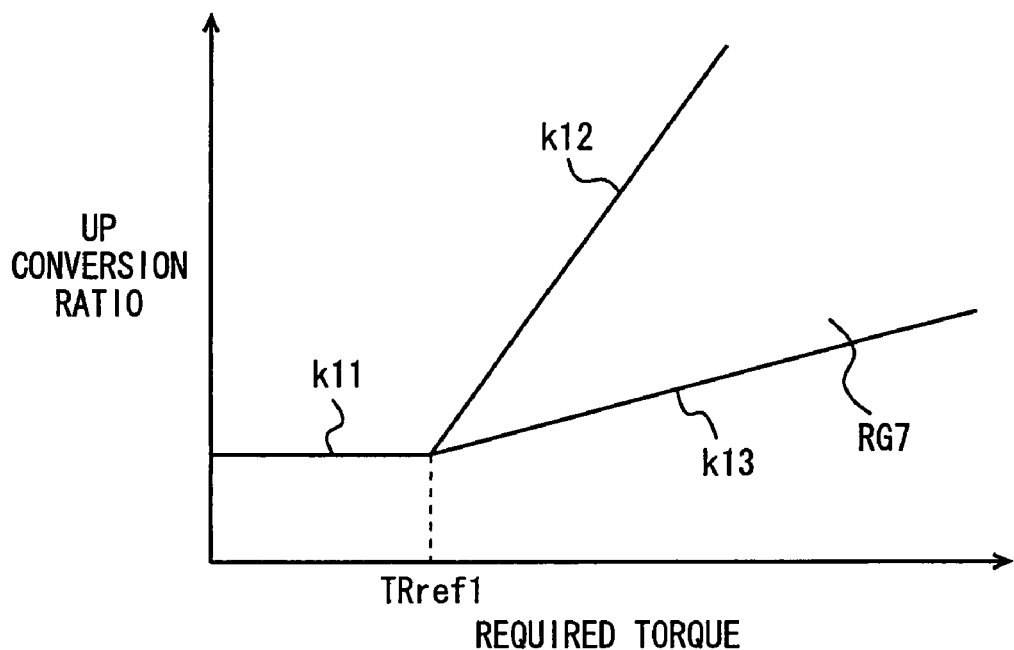
FIG. 21 represents a relationship between an up-conversion ratio and a required torque.

Control portion 64C receives torque command value TR and motor rotation rate MRN from the external ECU, and receives voltage conversion ratio EXR from calculation portion 66A. Furthermore, control portion 64C holds a map representing a relationship between an up conversion ratio and a required torque (i.e., a torque command value TR, which will also be referred to hereinafter) and a map representing a relationship between a down conversion ratio and required torque. FIG. 21 shows the former relationship and FIG. 22 shows the latter relationship.

With reference to FIG. 21, TRref1 represents a positive critical torque value. It is a torque value of a required torque when reactor current IL traverses the zero point when AC motor M1 operates in the powering mode.

When a required torque is equal to or smaller than positive critical torque value TRref1, the up conversion ratio holds a constant value in accordance with a straight line k11, and when required torque TR is larger than positive critical torque value TRref1 the up conversion ratio exists in a region RG7 surrounded by straight lines k12 and k13.

Figure 22:
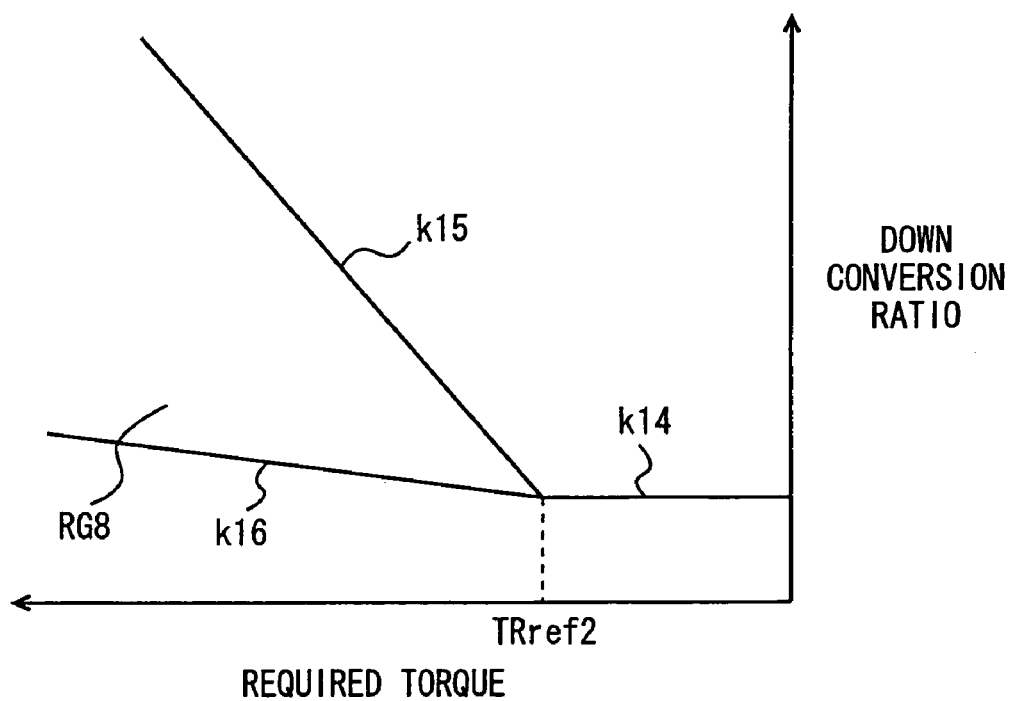
FIG. 22 represents a relationship between a down-conversion ratio and a required torque.

With reference to FIG. 22, TRref2 represents a negative critical torque value. It is a torque value of a required torque when reactor current IL traverses the zero point when AC motor M1 operates in the regeneration mode.

When a required torque is equal to or larger than negative critical torque value TRref2, the down conversion ratio holds a constant value in accordance with a straight line k14, and when required torque is smaller than negative critical torque value TRref2 the down conversion ratio exists in a region RG8 surrounded by straight lines k15 and k16.

Control portion 64C holds the FIG. 21 map and the FIG. 22 map.

Control portion 64C determines from torque command value TR (i.e., required torque) and motor rotation rate MRN in the above described method whether AC motor M1 operates in the regeneration mode or the powering mode. If the motor operates in the powering mode, control portion 64C determines whether the required torque from the external ECU (hereinafter referred to as "required torque TRdc_com") and voltage conversion ratio EXR (in this scenario, the up conversion ratio) received from calculation portion 66A exist in the FIG. 21 map on straight line k11 or in region RG7.

If required torque TRdc_com and voltage conversion ratio EXR exist on straight line k11, control portion 64C determines that reactor current IL traverses the zero point. If required torque TRdc_com and voltage conversion ratio EXR exist in region RG7, control portion 64C determines that reactor current IL does not traverse the zero point.

Determining that required torque TRdc_com and voltage conversion ratio EXR exist on straight line k11 corresponds to determining whether required torque TRdc_com is larger than positive critical torque value TRref1, and determining that the torque is equal to or smaller than the value. Determining that required torque TRdc_com and voltage conversion ratio EXR exist in region RG7 corresponds to determining whether the torque is larger than positive critical torque value TRref1, and determining that the torque is larger than the value.

When required torque TRdc_com and voltage conversion ratio EXR exist on straight line k11, control portion 64C generates and outputs signals STP and USTP to voltage command calculation portion 61 and converter associated duty ratio calculation portion 62, respectively.

When required torque TRdc_com and voltage conversion ratio EXR exist in region RG7, control portion 64C generates and outputs signal OPE to voltage command calculation portion 61.

If AC motor M1 operates in the regenerative mode, control portion 64C determines whether the required torque received from the external ECU and voltage conversion ratio EXR (in this scenario, the down conversion ratio) received from calculation portion 66A exist in the FIG. 22 map on straight line k14 or in region RG8.

If required torque TRdc_com and voltage conversion ratio EXR exist on straight line k14, control portion 64C determines that reactor current IL traverses the zero point. If required torque TRdc_com and voltage conversion ratio EXR exist in region RG8, control portion 64C determines that reactor current IL does not traverse the zero point.

Determining that required torque TRdc_com and voltage conversion ratio EXR exist on straight line k14 corresponds to determining whether required torque. TRdc_com is smaller than negative critical torque value TRref2, and determining that the torque is equal to or larger than the value. Determining that required torque TRdc_com and voltage conversion ratio EXR exist in region RG8 corresponds to determining whether the torque is smaller than negative critical torque value TRref2, and determining that the torque is smaller than the value.

When required torque TRdc_com and voltage conversion ratio EXR exist on straight line k14, control portion 64C generates and outputs signals STP and USTP to voltage command calculation portion 61 and converter associated duty ratio calculation portion 62, respectively.

When required torque TRdc_com and voltage conversion ratio EXR exist in region RG8, control portion 64C generates and outputs signal OPE to voltage command calculation portion 61.

Figure 23:
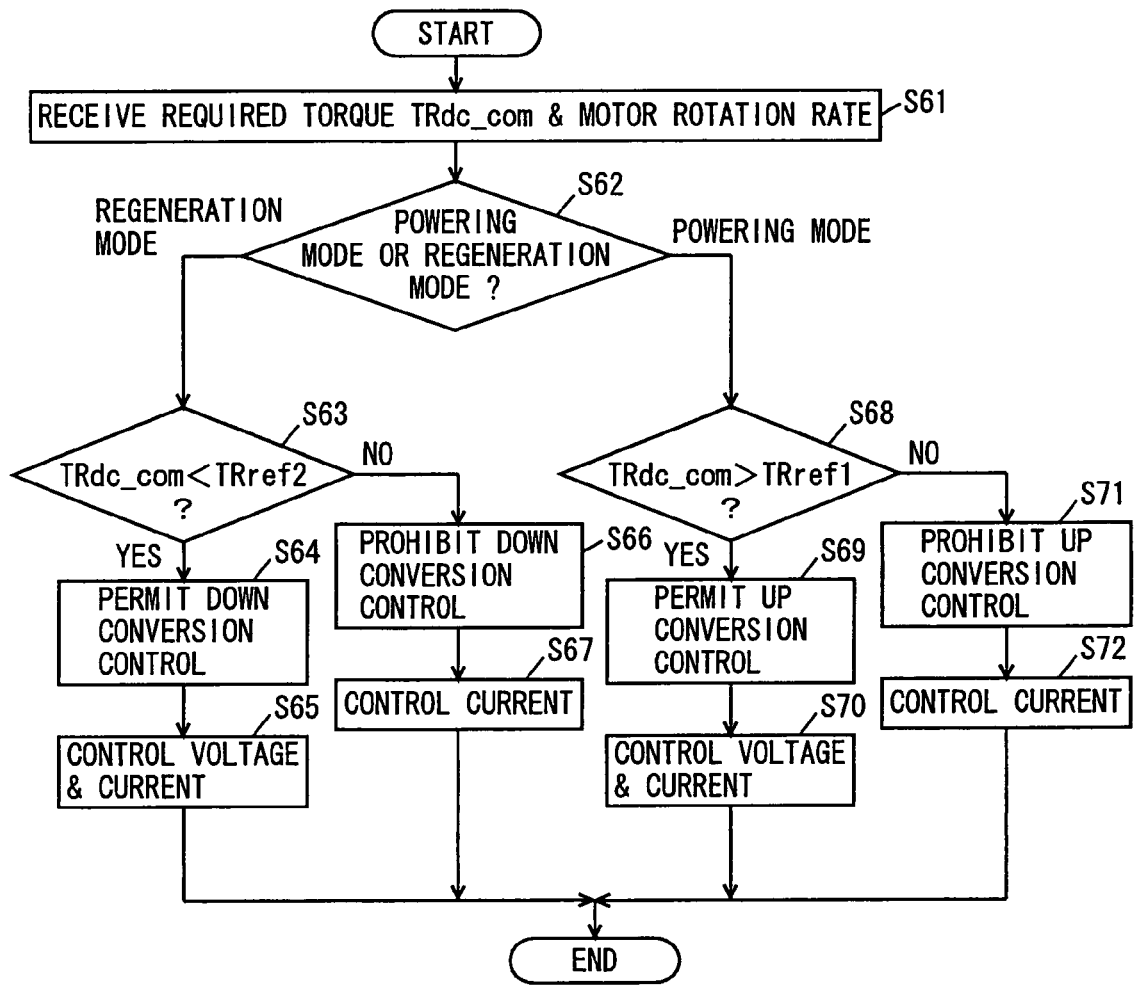
FIG. 23 is a flow chart for illustrating an operation of voltage conversion reducing switching noise in the fourth embodiment.

FIG. 23 is a flow chart for illustrating an operation of voltage conversion contributing to reduced switching noise in the fourth embodiment. With reference to FIG. 23, when a series of operation starts, converter control circuit 302C receives required torque TRdc_com and motor rotation rate MRN from the external ECU (step S61) and also receives voltage Vb from voltage sensor 10, and the converter control circuit 302C calculation portion 66A uses required torque TRdc_com, motor rotation rate MRN and voltage Vb and follows the above described method to calculate and output voltage conversion ratio EXR to control portion 64C.

Control portion 64C determines from required torque TRdc_com and motor rotation rate MRN in the above described method whether AC motor M1 operates in the regeneration mode or the powering mode (step S62).

If the motor operates in the regeneration mode, control portion 64C refers to the FIG. 22 map to further determine whether required torque TRdc_com received from the external ECU and voltage conversion ratio EXR exist on straight line k14 or in region RG8 to determine whether the torque is smaller than negative critical torque value TRref2 (step S63).

If required torque TRdc_com is smaller than negative critical torque value TRref2, control portion 64C determines that reactor current IL does not traverse the zero point, and generates and outputs signal OPE to voltage command calculation portion 61. Voltage command calculation portion 61 having received signal OPE from control portion 64C uses required torque TRdc_com and motor rotation rate MRN received from the external ECU and follows the above described method to calculate and output voltage command Vdc_com to converter associated duty ratio calculation portion 62.

Converter associated duty ratio calculation portion 62 is driven by voltage command Vdc_com received from voltage command calculation portion 61 and voltages Vb, Vm and follows the above described method to generate and output duty ratio DRD to converter associated PWM signal conversion portion 63. Converter associated PWM signal conversion portion 63 is driven by duty ratio DRD to generate and output signal PWMD to up converter 12. Converter control circuit 302C thus permits down conversion control (step S64).

In response, up converter 12 has NPN transistors Q1, Q2 turned on/off in response to signal PWMD from converter control circuit 302C to down convert voltage Vm across capacitor C2 to attain voltage command Vdc_com, and the down converted DC voltage is supplied to DC power supply B. Thus voltage and current are controlled (step S65), and the series of operation ends.

In contrast if at S63 required torque TRdc_com is equal to or larger than negative critical torque value TRref2 control portion 64C determines that when up converter 12 performs a down converting operation reactor current IL traverses the zero point, and signals STP and DSTP are generated and output to voltage command calculation portion 61 and converter associated duty ratio calculation portion 62, respectively. Voltage command calculation portion 61, having received signal STP from control portion 64C, calculates and outputs voltage command Vdc_com_0 to converter associated duty ratio calculation portion 62.

Converter associated duty ratio calculation portion 62 is driven by Vdc_com_0 and signal DSTP from voltage command calculation portion 61 and control portion 64C, respectively, and follows the above described method to generate and output duty ratio DR_100_0 to converter associated PWM signal conversion portion 63. Converter associated PWM signal conversion portion 63 is driven by DR_100_0 to generate and output signal PWMS2 to up converter 12. Converter control circuit 302C thus prohibits down conversion control (step S66).

In response, up converter 12 has NPN transistor Q1 turned on in response to signal PWMS2 from converter control circuit 302C and has NPN transistor Q2 turned off in response to signal PWMS2, and up converter 12 stops switching to perform a down converting operation, and supplies a DC current via NPN transistor Q1 from capacitor C2 to DC power supply B. In other words, a current is controlled (step S67), and the series of operation ends.

Furthermore, if at step S62 a decision is made that AC motor M1 operates in the powering mode then the converter control circuit 302C control portion 64C further refers to the FIG. 21 map to determine whether required torque TRdc_com and voltage conversion ratio EXR received from the external ECU and calculation portion 66A, respectively, exist on straight line k11 or in region RG7 to determine whether the torque is larger than positive critical torque value TRref1 (step S68).

If required torque TRdc_com is larger than positive critical torque value TRref1, control portion 64C determines that reactor current IL does not traverse the zero point, and generates and outputs signal OPE to voltage command calculation portion 61. Voltage command calculation portion 61, having received signal OPE from control portion 64C, uses required torque TRdc_com and motor rotation rate MRN received from the external ECU and follows the above described method to calculate voltage command Vdc_com and output it to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRU to converter associated PWM signal conversion portion 63. Converter associated PWM signal conversion portion 63 is driven by duty ratio DRU to generate and output signal PWMU to up converter 12. Converter control circuit 302C thus permits up conversion control (step S69).

In response, up converter 12 has NPN transistors Q1, Q2 turned on/off in response to signal PWMU output from converter control circuit 302C to up convert DC voltage Vb provided from DC power supply B so that converter 12 outputs voltage Vm matching voltage command Vdc_com, and the up converted DC voltage is supplied to capacitor C2, i.e., voltage and current are controlled (step S70). The series of operations thus ends.

In contrast, if at step S68 required torque TRdc_com is equal to or smaller than positive critical torque value TRref1, control portion 64C determines that when up converter 12 performs an up converting operation reactor current IL traverses the zero point, and control portion 64C generates and outputs signals STP and USTP to voltage command calculation portion 61 and converter associated duty ratio calculation portion 62, respectively.

In response, voltage command calculation portion 61 operates in response to signal STP received from control portion 64C to generate and output voltage command Vdc_com_0 to converter associated duty ratio calculation portion 62. Converter associated duty ratio calculation portion 62 is driven by voltage command Vdc_com_0 from voltage command calculation portion 61 and signal USTP from control portion 64C to generate and output duty ratio DR_0 to converter associated PWM signal conversion portion 63. Converter associated PWM signal conversion portion 63 is driven by duty ratio DR_0 to generate and output signal PWMS1 to up converter 12 for stopping switching to perform the up converting operation. Converter control circuit 302C thus prohibits up conversion control (step S71).

In response to signal PWMS1 up converter 12 stops NPN transistors Q1, Q2 from switching and supplies a DC current required for an operation of inverter 14 via diode D1 from DC power supply B to capacitor C2, i.e., a current is controlled (step S72). The series of operation thus ends.

Thus converter control circuit 302C determines a mode of operation of AC motor M1 from torque command value TR and motor rotation rate MRN and from the determined mode of operation and required torque TRdc_com and voltage conversion ratio EXR determines whether reactor current IL traverses the zero point. If so, converter control circuit 302C controls up converter 12 to stop switching to perform an up converting or down converting operation, otherwise converter control circuit 302C controls up converter 12 to switch to perform the up converting or down converting operation.

Thus up converter 12 can have NPN transistors Q1, Q2 switching less frequently and thus providing reduced switching noise. Furthermore, NPN transistors Q1, Q2 switching less frequently can contribute to reduced switching loss.

Note that in the present invention the control of voltage conversion that contributes to reduced switching noise is in effect performed by a CPU reading from a ROM a program including each step of the FIG. 23 flow chart, and executing the read program and following the FIG. 23 flow chart to control up converter 12 to switch to perform an up converting or down converting operation. Accordingly, the ROM corresponds to a computer (CPU) readable storage medium having recorded therein the program including each step of the FIG. 23 flow chart.

Motor drive apparatus 100C provides a general operation corresponding to that of motor drive apparatus 100 having an operation of converter control circuit 302 contributing to reduced switching noise replaced with that of converter control circuit 302C.

The remainder is the same as that of the first embodiment.

Fifth Embodiment

Figure 24:
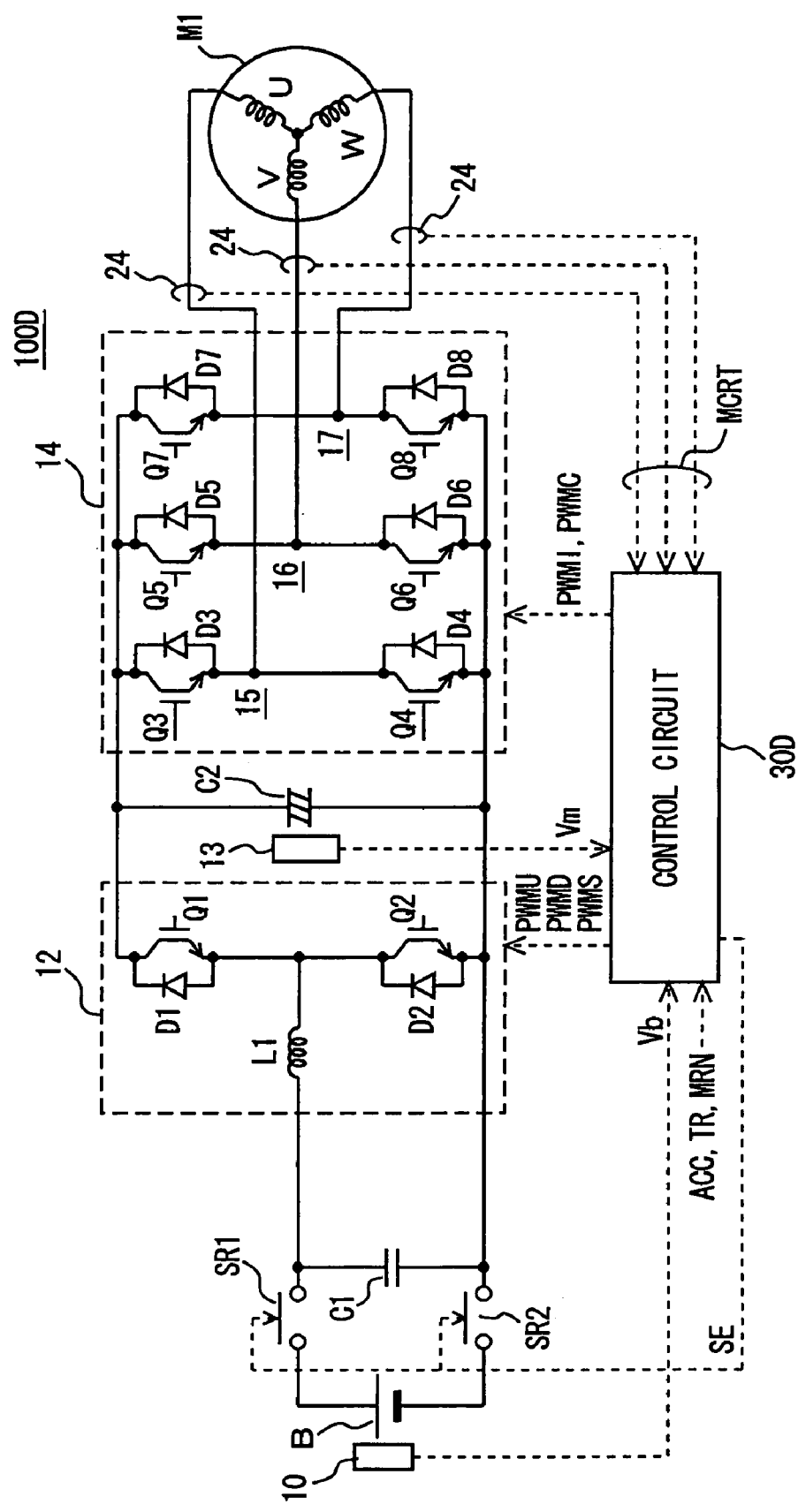
FIG. 24 is a schematic block diagram of a motor drive apparatus in a fifth embodiment.

FIG. 24 is a block diagram schematically showing the motor drive apparatus in a fifth embodiment. With reference to the figure, the fifth embodiment provides a motor drive apparatus 100D corresponding to motor drive apparatus 100 minus current sensors 11, 18 and having control device 30 replace with a control device 30D.

Control device 30D determines from torque command value TR, motor rotation rate MRN and an acceleration pedal position ACC from an external ECU in a method, as will be described hereinafter, whether reactor current IL traverses the zero point. If so, control device 30D controls up converter 12 to stop switching to perform an up converting or down converting operation, otherwise control device 30D controls up converter 12 to switch to perform the up converting or down converting operation.

Control device 30D other than that provides the same function as control device 30.

Figure 25:
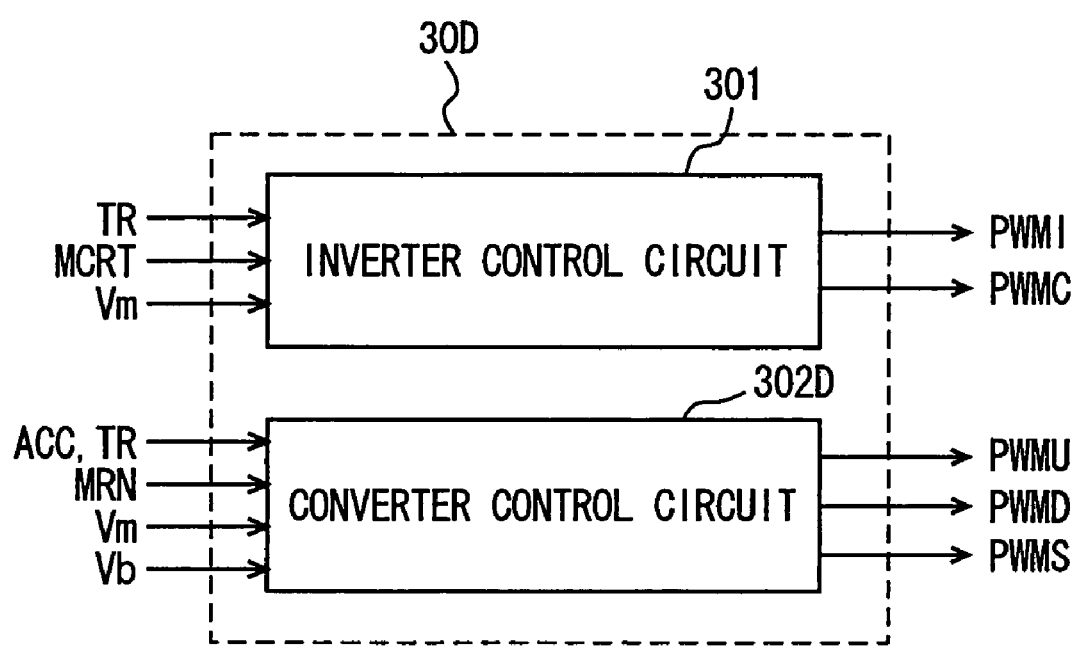
FIG. 25 is a block diagram of the control device shown in FIG. 24.

FIG. 25 is a block diagram of the FIG. 24 control device 30D. With reference to the figure, control device 30D corresponds to control device 30 having converter control circuit 302 replaced with a converter control circuit 302D.

Converter control circuit 302D determines from torque command value TR, motor rotation rate MRN and acceleration pedal position ACC in a method, as will be described hereinafter, whether reactor current IL traverses the zero point and if so converter control circuit 302D generates signal PWMS for stopping NPN transistors Q1, Q2 from switching and outputs the generated signal PWMS to up converter 12. If reactor current IL does not traverse the zero point, converter control circuit 302D generates signal PWMU or PWMD to control up converter 12 to switch to perform an up converting or down converting operation.

Converter control circuit 302D other than that performs the same function as converter control circuit 302.

Figure 26:
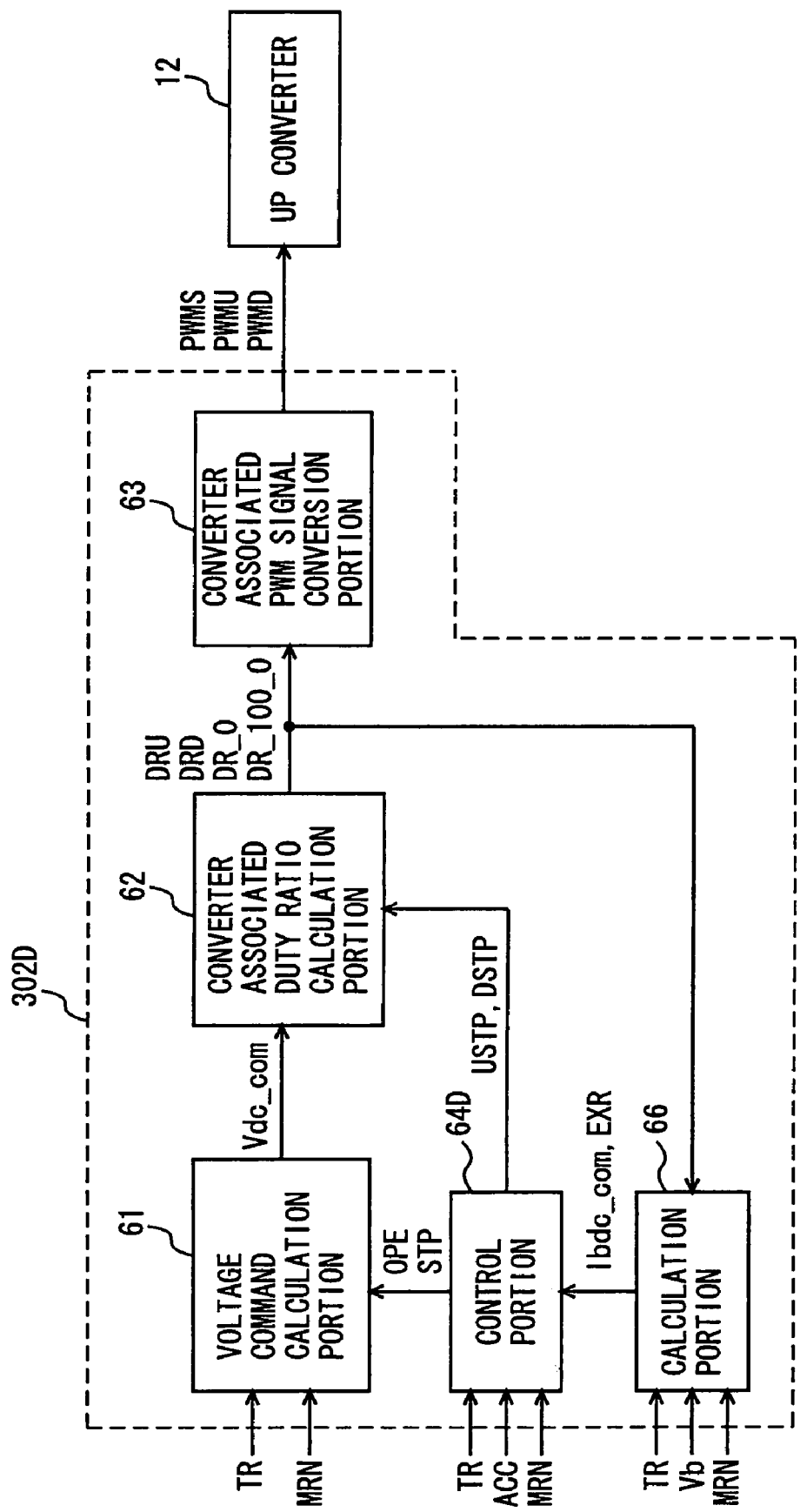
FIG. 26 is a block diagram of the converter control circuit shown in FIG. 25.

FIG. 26 is a block diagram of the FIG. 25 converter control circuit 302D. With reference to the figure, converter control circuit 302D corresponds to converter control circuit 302 having control portion 64 and peak detection portion 65 replaced with a control portion 64D and calculation portion 66, respectively. The remainder is the same as that of converter control circuit 302.

As has been described previously, calculation portion 66 uses torque command value TR, motor rotation rate motor rotation rate MRN and duty ratio DR (=DRU or DRD) and follows the above described expressions (1) to (5) to calculate and output required power supply current Ibdc_com and voltage conversion ratio EXR to control portion 64D.

Figure 27:
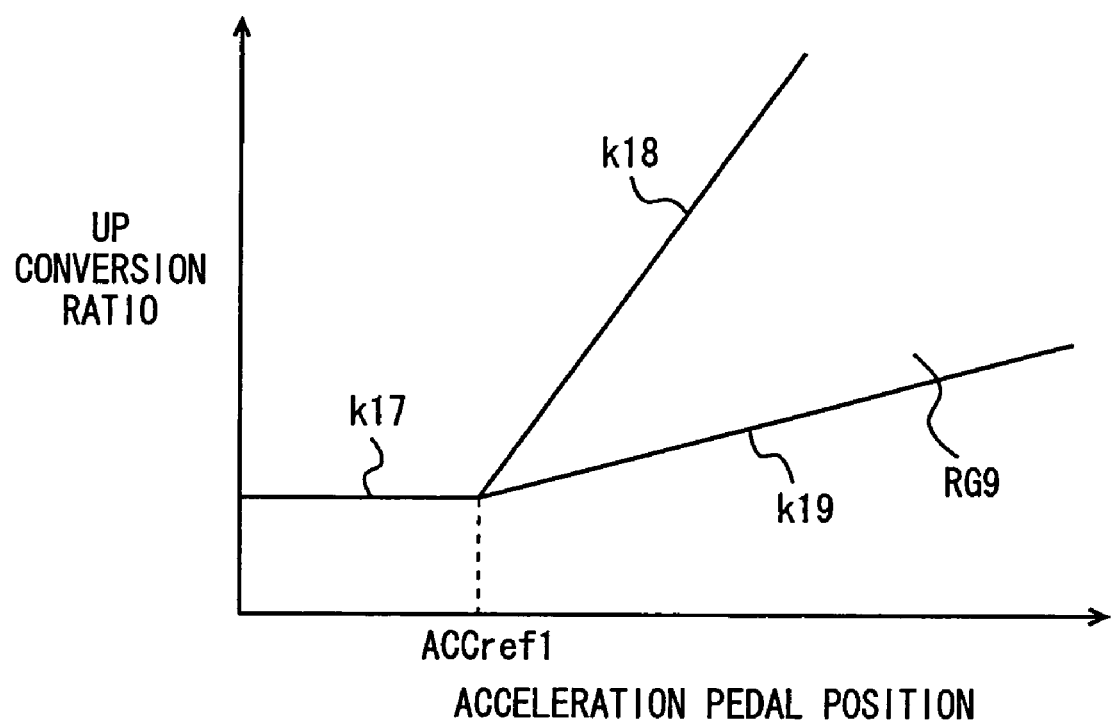
FIG. 27 represents a relationship between an acceleration pedal position and an up-conversion ratio.

Control portion 64D receives torque command value TR, motor rotation rate MRN, and acceleration pedal position ACC from the external ECU and receives required power supply current Ibdc_com and voltage conversion ratio EXR from calculation portion 66. Furthermore, control portion 64D holds a map representing a relationship between an up conversion ratio and an acceleration pedal position and that representing a relationship between a down conversion ratio and a required power supply current. FIG. 27 shows the relationship between the up conversion ratio and the acceleration pedal position.

With reference to FIG. 27, ACCref1 represents a critical acceleration pedal position value. It is a value of acceleration pedal position ACC provided when AC motor M1 operates in the powering mode and reactor current IL traverses the zero point.

When acceleration pedal position ACC is equal to or smaller than critical acceleration pedal position value ACCref1, the up conversion ratio holds a constant value in accordance with a straight line k17, and when acceleration pedal position ACC is larger than critical acceleration pedal position value ACCref1 the up conversion ratio exists in a region RG9 surrounded by straight lines k18 and k19.

Control portion 64D holds the FIG. 16 map and the FIG. 27 map.

Control portion 64D determines from torque command value TR and motor rotation rate MRN in the above described method whether AC motor M1 operates in the regeneration mode or the powering mode. If the motor operates in the powering mode, control portion 64D determines whether acceleration pedal position ACC received from the external ECU and voltage conversion ratio EXR (in this scenario, the up conversion ratio) received from calculation portion 66 exist in the FIG. 27 map on straight line k17 or in region RG9.

If acceleration pedal position ACC and voltage conversion ratio EXR exist on straight line k17, control portion 64D determines that reactor current IL traverses the zero point. If acceleration pedal position ACC and voltage conversion ratio EXR exist in region RG9, control portion 64D determines that reactor current IL does not traverse the zero point.

Determining that acceleration pedal position ACC and voltage conversion ratio EXR exist on straight line k17 corresponds to determining whether acceleration pedal position ACC is larger than critical acceleration pedal position value ACCref1, and determining that acceleration pedal position ACC is equal to or smaller than the value. Determining that acceleration pedal position ACC and voltage conversion ratio EXR exist in region RG9 corresponds to determining whether acceleration pedal position ACC is larger than critical acceleration pedal position value ACCref1, and determining that acceleration pedal position ACC is larger than the value.

When acceleration pedal position ACC and voltage conversion ratio EXR exist on straight line k17, control portion 64D generates and outputs signals STP and USTP to voltage command calculation portion 61 and converter associated duty ratio calculation portion 62, respectively.

When acceleration pedal position ACC and voltage conversion ratio EXR exist in region RG9, control portion 64D generates and outputs signal OPE to voltage command calculation portion 61.

In contrast, when AC motor M1 operates in the regeneration mode, control portion 64D fulfills the same function as control portion 64B as described above.

Figure 28:
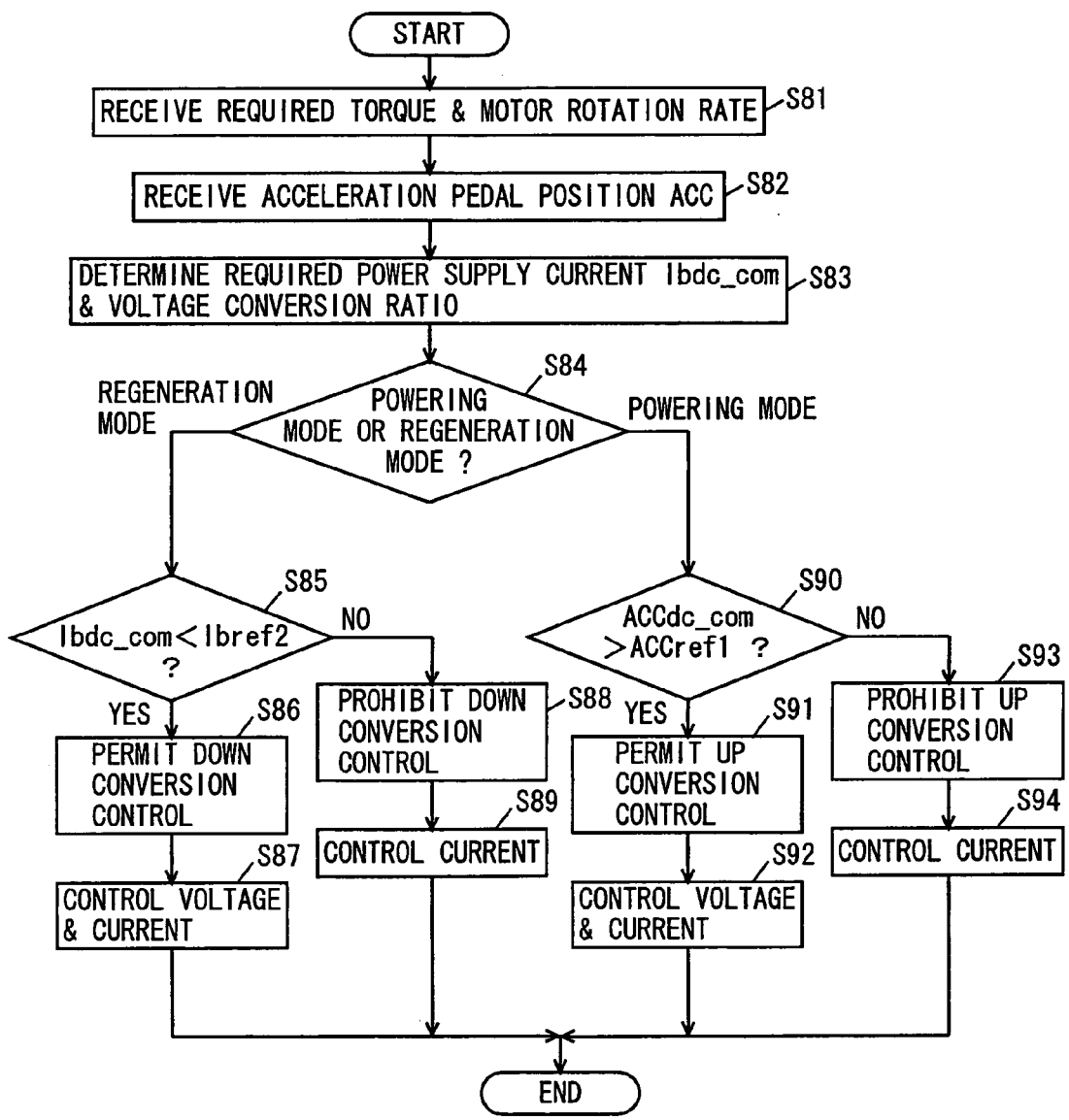
FIG. 28 is a flow chart for illustrating an operation of voltage conversion reducing switching noise in the fifth embodiment.

FIG. 28 is a flow chart for illustrating an operation of voltage conversion contributing to reduced switching noise in the fifth embodiment. With reference to FIG. 28, when a series of operation starts, converter control circuit 302D receives torque command value (i.e., a required torque) and motor rotation rate MRN from the external ECU (step S81) and also receives voltage Vb from voltage sensor 10, and the converter control circuit 302D calculation portion 66 uses required torque TR, motor rotation rate MRN, voltage Vb, and duty ratio DRU or DRD and follows the above described method to calculate and output required power supply current Ibdc_com and voltage conversion ratio EXR to control portion 64D (step S83).

Control portion 64D determines from required torque TR and motor rotation rate MRN in the above described method whether AC motor M1 operates in the powering mode or the regeneration mode (step S84).

If the motor operates in the regeneration mode, control portion 64D refers to the FIG. 16 map to further determine whether required power supply current Ibdc_com and voltage conversion ratio EXR received from calculation portion 66 exist on straight line k8 or in region RG6 to determine whether the current is smaller than negative critical current value Ibref2 (step S85).

If required power supply current Ibdc_com is smaller than negative critical current value Ibref2, control portion 64D determines that reactor current IL does not traverse the zero point, and generates and outputs signal OPE to voltage command calculation portion 61. Voltage command calculation portion 61 having received signal OPE from control portion 64D uses torque command value TR and motor rotation rate MRN received from the external ECU and follows the above described method to calculate and output voltage command Vdc_com to converter associated duty ratio calculation portion 62.

Converter associated duty ratio calculation portion 62 is driven by voltage command Vdc_com received from voltage command calculation portion 61 and voltages Vb, Vm and follows the above described method to generate and output duty ratio DRD to converter associated PWM signal conversion portion 63. Converter associated PWM signal conversion portion 63 is driven by duty ratio DRD to generate and output signal PWMD to up converter 12. Converter control circuit 302D thus permits down conversion control (step S86).

In response, up converter 12 has NPN transistors Q1, Q2 turned on/off in response to signal PWMD from converter control circuit 302D to down convert voltage Vm across capacitor C2 to attain voltage command Vdc_com, and the down converted DC voltage is supplied to DC power supply B. Thus voltage and current are controlled (step S87), and the series of operation ends.

In contrast if at S85 required power supply current Ibdc_com is equal to or larger than negative critical current value Ibref2 control portion 64D determine that when up converter 12 performs a down converting operation reactor current IL traverses the zero point, and signals STP and DSTP are generated and output to voltage command calculation portion 61 and converter associated duty ratio calculation portion 62, respectively. Voltage command calculation portion 61, having received signal STP from control portion 64D, calculates and outputs voltage command Vdc_com_0 to converter associated duty ratio calculation portion 62.

Converter associated duty ratio calculation portion 62 is driven by Vdc_com_0 and signal DSTP from voltage command calculation portion 61 and control portion 64D, respectively, and follows the above described method to generate and output duty ratio DR_100_0 to converter associated PWM signal conversion portion 63. Converter associated PWM signal conversion portion 63 is driven by DR_100_0 to generate and output signal PWMS2 to up converter 12. Converter control circuit 302D thus prohibits down conversion control (step S88).

In response, up converter 12 has NPN transistor Q1 turned on in response to signal PWMS2 from converter control circuit 302D and has NPN transistor Q2 turned off in response to signal PWMS2, and up converter 12 stops switching to perform a down converting operation, and supplies a DC current via NPN transistor Q1 from capacitor C2 to DC power supply B. In other words, a current is controlled (step S89), and the series of operation ends.

Furthermore, if at step S84 a decision is made that AC motor M1 operates in the powering mode then the converter control circuit 302D control portion 64D further refers to the FIG. 27 map to determine whether acceleration pedal position ACC and voltage conversion ratio EXR received from the external ECU and calculation portion 66, respectively, exist on straight line k17 or in region RG9 to determine whether acceleration pedal position ACC is larger than critical acceleration pedal position value ACCref1 (step S90).

If acceleration pedal position ACC is larger than critical acceleration pedal position value ACCref1, control portion 64D determines that reactor current IL does not traverse the zero point, and generates and outputs signal OPE to voltage command calculation portion 61. Voltage command calculation portion 61, having received signal OPE from control portion 64D, uses torque command value TR and motor rotation rate MRN received from the external ECU and follows the above described method to calculate voltage command Vdc_com and output it to converter associated duty ratio calculation portion 62.

Converter associated duty ratio calculation portion 62 is driven by voltage command Vdc_com from voltage command calculation portion 61 and voltages Vb, Vm and follows the above described method to generate and output duty ratio DRU to converter associated PWM signal conversion portion 63. Converter associated PWM signal conversion portion 63 is driven by duty ratio DRU to generate and output signal PWMU to up converter 12. Converter control circuit 302D thus permits up conversion control (step S91).

In response, up converter 12 has NPN transistors Q1, Q2 turned on/off in response to signal PWMU output from converter control circuit 302D to up convert DC voltage Vb provided from DC power supply B so that converter 12 outputs voltage Vm matching voltage command Vdc_com, and the up converted DC voltage is supplied to capacitor C2, i.e., voltage and current are controlled (step S92). The series of operations thus ends.

In contrast, if at step S90 acceleration pedal position ACC is equal to or smaller than critical acceleration pedal position value ACCref1, control portion 64D determines that when up converter 12 performs an up converting operation reactor current IL traverses the zero point, and control portion 64D generates and outputs signals STP and USTP to voltage command calculation portion 61 and converter associated duty ratio calculation portion 62, respectively.

In response, voltage command calculation portion 61 operates in response to signal STP received from control portion 64D to generate and output voltage command Vdc_com_0 to converter associated duty ratio calculation portion 62. Converter associated duty ratio calculation portion 62 is driven by voltage command Vdc_com_0 from voltage command calculation portion 61 and signal USTP from control portion 64D to generate and output duty ratio DR_0 to converter associated PWM signal conversion portion 63. Converter associated PWM signal conversion portion 63 is driven by duty ratio DR_0 to generate and output signal PWMS1 to up converter 12 for stopping switching to perform the up converting operation. Converter control circuit 302D thus prohibits up conversion control (step S93).

In response to signal PWMS1 up converter 12 stops NPN transistors Q1, Q2 from switching and supplies a DC current required for an operation of inverter 14 via diode D1 from DC power supply B to capacitor C2, i.e., a current is controlled (step S94). The series of operation thus ends.

Thus converter control circuit 302D determines a mode of operation of AC motor M1 from torque command value TR and motor rotation rate MRN and from the determined mode of operation, and acceleration pedal position ACC and required power supply current Ibdc_com determines whether reactor current IL traverses the zero point. More specifically, when AC motor M1 operates in the powering mode, converter control circuit 302D determines from acceleration pedal position ACC whether reactor current IL traverses the zero point, and when AC motor M1 operates in the regeneration mode, converter control circuit 302D determines from required power supply current Ibdc_com whether reactor current IL traverses the zero point.

When AC motor M1 operates in the regeneration mode whether reactor current IL traverses the zero point is determined from required power supply current Ibdc_com because an acceleration pedal position in the regeneration mode cannot be considered.

When reactor current IL traverses the zero point, converter control circuit 302D controls up converter 12 to stop switching to perform an up converting or down converting operation, otherwise converter control circuit 302D controls up converter 12 to switch to perform the up converting or down converting operation.

Thus up converter 12 can have NPN transistors Q1, Q2 switching less frequently and thus providing reduced switching noise. Furthermore, NPN transistors Q1, Q2 switching less frequently can contribute to reduced switching loss.

Note that in the present invention the control of voltage conversion that contributes to reduced switching noise is in effect performed by a CPU reading from a ROM a program including each step of the FIG. 28 flow chart, and executing the read program and following the FIG. 28 flow chart to control up converter 12 to switch to perform an up converting or down converting operation. Accordingly, the ROM corresponds to a computer (CPU) readable storage medium having recorded therein the program including each step of the FIG. 28 flow chart.

Motor drive apparatus 100D provides a general operation corresponding to that of motor drive apparatus 100 having an operation of converter control circuit 302 contributing to reduced switching noise replaced with that of converter control circuit 302D.

The remainder is the same as those of the first and third embodiments.

Sixth Embodiment

Figure 29:
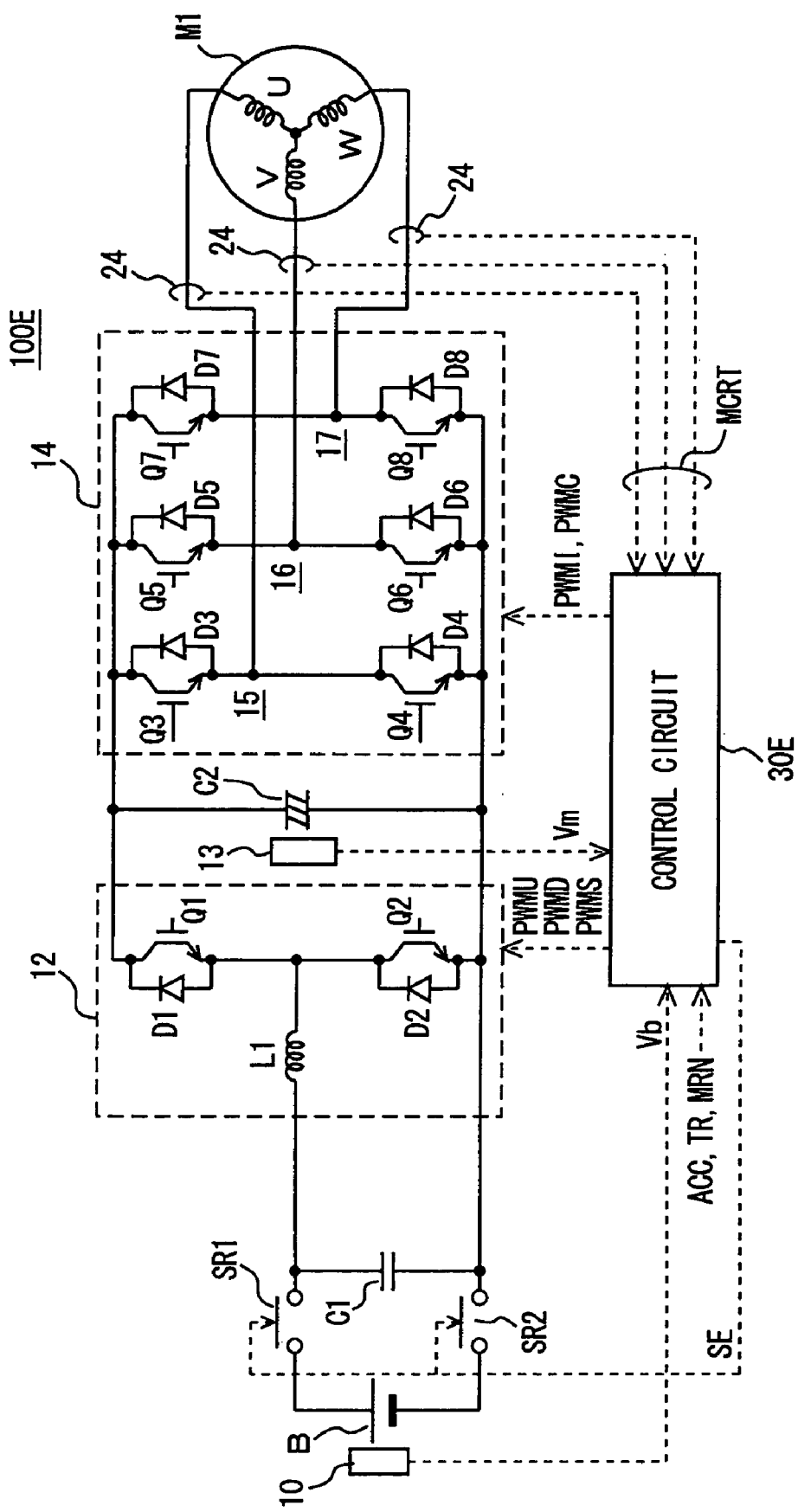
FIG. 29 is a schematic block diagram of a motor drive apparatus in a sixth embodiment.

FIG. 29 is a block diagram schematically showing the motor drive apparatus in a sixth embodiment. With reference to the figure, the sixth embodiment provides a motor drive apparatus 100E corresponding to motor drive apparatus 100 minus current sensors 11, 18 and having control device 30 replace with a control device 30E.

Control device 30E determines from torque command value TR, motor rotation rate MRN and acceleration pedal position ACC from an external ECU in a method, as will be described hereinafter, whether reactor current IL traverses the zero point. If so, control device 30E controls up converter 12 to stop switching to perform an up converting or down converting operation, otherwise control device 30E controls up converter 12 to switch to perform the up converting or down converting operation.

Control device 30E other than that provides the same function as control device 30.

Figure 30:
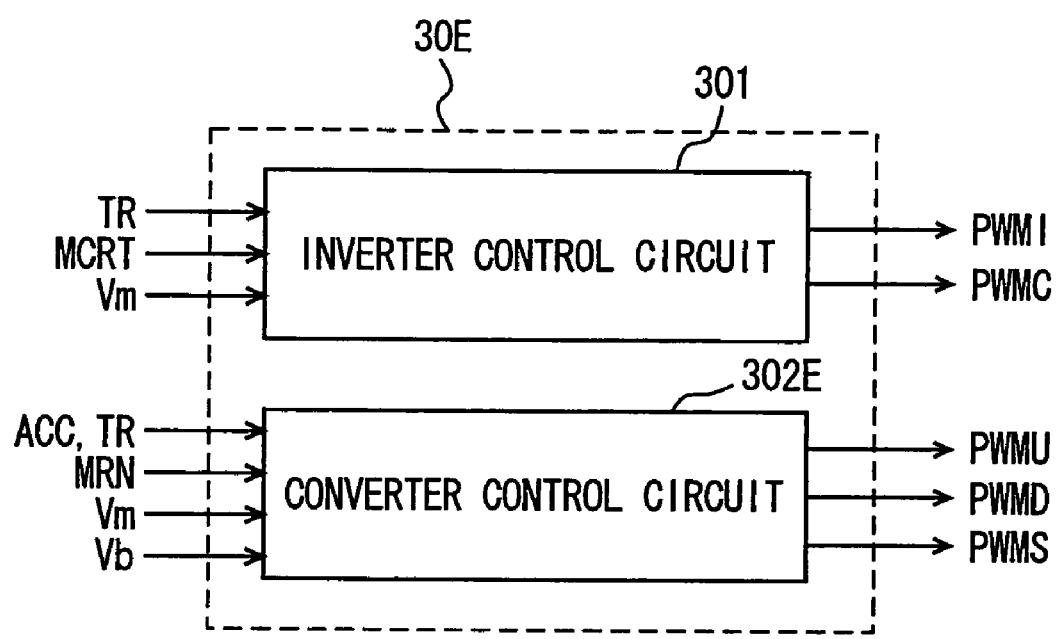
FIG. 30 is a block diagram of the control device shown in FIG. 29.

FIG. 30 is a block diagram of the FIG. 29 control device 30E. With reference to the figure, control device 30E corresponds to control device 30 having converter control circuit 302 replaced with a converter control circuit 302E.

Converter control circuit 302E determines from torque command value TR, motor rotation rate MRN and acceleration pedal position ACC in a method, as will be described hereinafter, whether reactor current IL traverses the zero point and if so converter control circuit 302E generates signal PWMS for stopping NPN transistors Q1, Q2 from switching and outputs the generated signal PWMS to up converter 12. If reactor current IL does not traverse the zero point, converter control circuit 302E generates signal PWMU or PWMD to control up converter 12 to switch to perform an up converting or down converting operation.

Converter control circuit 302E other than that performs the same function as converter control circuit 302.

Figure 31:
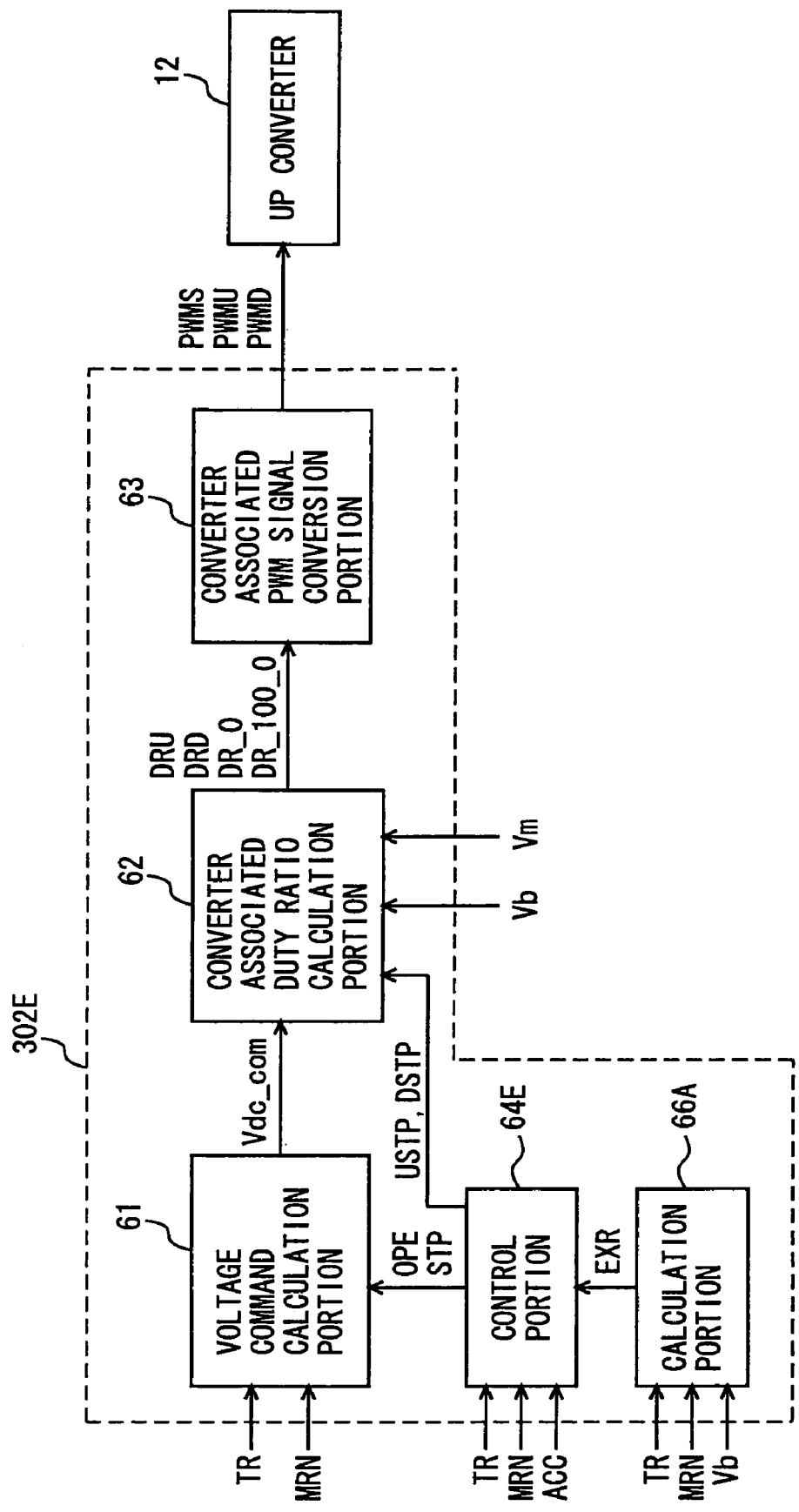
FIG. 31 is a block diagram of the converter control circuit shown in FIG. 30.

FIG. 31 is a block diagram of the FIG. 30 converter control circuit 302E. With reference to the figure, converter control circuit 302E corresponds to converter control circuit 302 having control portion 64 and peak detection portion 65 replaced with a control portion 64E and calculation portion 66A, respectively. The remainder is the same as that of converter control circuit 302.

As has been described previously, calculation portion 66A uses torque command value TR, motor rotation rate MRN and voltage Vb, and the above described expressions (1), (3) and (4) to calculate and output voltage conversion ratio EXR to control portion 64E.

Control portion 64E receives torque command value TR, motor rotation rate MRN, and acceleration pedal position ACC from the external ECU and receives voltage conversion ratio EXR from calculation portion 66A. Furthermore, control portion 64E holds a map representing a relationship between an up conversion ratio and an acceleration pedal position and that representing a relationship between a down conversion ratio and required torque TRdc_com. In other words, control portion 64E holds the map shown in FIG. 22 and that shown in FIG. 27.

Control portion 64E determines from torque command value TR and motor rotation rate MRN in the above described method whether AC motor M1 operates in the regeneration mode or the powering mode. If the motor operates in the powering mode, control portion 64E performs the same function as control portion 64D, as described above. When the motor operates in the regeneration mode, control portion 64E performs the same function as control portion 64C, as has been described previously.

More specifically, when AC motor M1 operates in the regeneration mode, control portion 64E determines from required torque TRdc_com provided from the external ECU whether reactor current IL traverses the zero point, and when the motor operates in the powering mode, control portion 64E determines from acceleration pedal position ACC provided from the external ECU whether reactor current IL traverses the zero point. When control portion 64E determines that in the regeneration mode and the powering mode reactor current IL does not traverse the zero point, control portion 64E generates and outputs signal OPE to voltage command calculation portion 61. When control portion 64E determines that when AC motor M1 operates in the powering mode reactor current IL traverses the zero point, control portion 64E generates and outputs signals STP and USTP to voltage command calculation portion 61 and converter associated duty ratio calculation portion 62, respectively. Furthermore, when control portion 64E determines that when AC motor M1 operates in the regeneration mode reactor current IL traverses the zero point, control portion 64E generates and outputs signals STP and DSTP to voltage command calculation portion 61 and converter associated duty ratio calculation portion 62, respectively.

Figure 32:
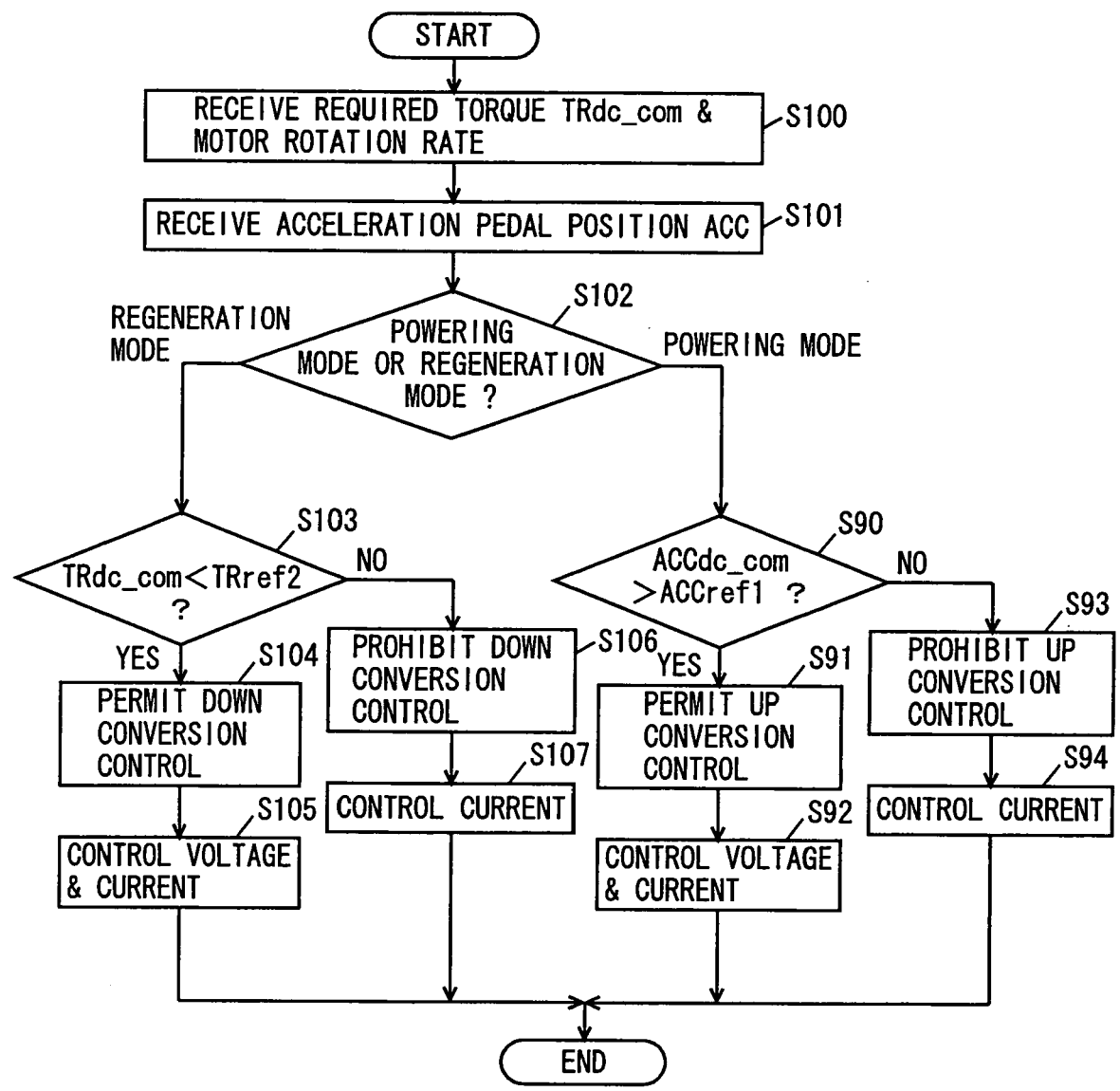
FIG. 32 is a flow chart for illustrating an operation of voltage conversion reducing switching noise in a sixth embodiment.

FIG. 32 is a flow chart for illustrating an operation of voltage conversion contributing to reduced switching noise in the sixth embodiment. The FIG. 32 flow chart corresponds to the FIG. 28 flow chart having steps S81–S89 replaced with steps S100–S107.

With reference to the figure, when a series of operation starts, converter control circuit 302E receives torque command value TR (i.e., required torque TRdc_com) and motor rotation rate MRN from the external ECU (step S100) and also receives acceleration pedal position ACC from the external ECU (step S101) and furthermore receives voltage Vb from voltage sensor 10, and the converter control circuit 302E calculation portion 66A uses required torque TRdc_com, motor rotation rate MRN and voltage Vb and follows the above described method to calculate and output voltage conversion ratio EXR to control portion 64E.

Control portion 64E determines from required torque TRdc_com and motor rotation rate MRN in the above described method whether AC motor M1 operates in the powering mode or the regeneration mode (step S102).

If the motor operates in the regeneration mode, control portion 64E refers to the FIG. 22 map to further determine whether required torque TRdc_com received from the external ECU and voltage conversion ratio EXR received from calculation portion 66A exist on straight line k14 or in region RG8 to determine whether the torque is smaller than negative critical torque value TRref2 (step S103).

If required torque TRdc_com is smaller than negative critical torque value TRref2, control portion 64E determines that reactor current IL does not traverse the zero point, and generates and outputs signal OPE to voltage command calculation portion 61. Voltage command calculation portion 61 having received signal OPE from control portion 64E uses torque command value TR and motor rotation rate MRN received from the external ECU and follows the above described method to calculate and output voltage command Vdc_com to converter associated duty ratio calculation portion 62.

Converter associated duty ratio calculation portion 62 is driven by voltage command Vdc_com received from voltage command calculation portion 61 and voltages Vb, Vm and follows the above described method to generate and output duty ratio DRD to converter associated PWM signal conversion portion 63. Converter associated PWM signal conversion portion 63 is driven by duty ratio DRD to generate and output signal PWMD to up converter 12. Converter control circuit 302E thus permits down conversion control (step S104).

In response, up converter 12 has NPN transistors Q1, Q2 turned on/off in response to signal PWMD from converter control circuit 302E to down convert voltage Vm across capacitor C2 to attain voltage command Vdc_com, and the down converted DC voltage is supplied to DC power supply B. Thus voltage and current are controlled (step S105), and the series of operation ends.

In contrast if at S103 required torque TRdc_com is equal to or larger than negative critical torque value TRref2 control portion 64E determines that when up converter 12 performs a down converting operation reactor current IL traverses the zero point, and signals STP and DSTP are generated and output to voltage command calculation portion 61 and converter associated duty ratio calculation portion 62, respectively. Voltage command calculation portion 61, having received signal STP from control portion 64E, calculates and outputs voltage command Vdc_com_0 to converter associated duty ratio calculation portion 62.

Converter associated duty ratio calculation portion 62 is driven by Vdc_com_0 and signal DSTP from voltage command calculation portion 61 and control portion 64E, respectively, and follows the above described method to generate and output duty ratio DR_100_0 to converter associated PWM signal conversion portion 63. Converter associated PWM signal conversion portion 63 is driven by DR_100_0 to generate and output signal PWMS2 to up converter 12. Converter control circuit 302E thus prohibits down conversion control (step S106).

In response, up converter 12 has NPN transistor Q1 turned on in response to signal PWMS2 from converter control circuit 302E and has NPN transistor Q2 turned off in response to signal PWMS2, and up converter 12 stops switching to perform a down converting operation, and supplies a DC current via NPN transistor Q1 from capacitor C2 to DC power supply B. In other words, a current is controlled (step S107), and the series of operation ends.

If at step S102, a decision is made that AC motor M1 operates in the powering mode, the above described steps S90–S94 (see FIG. 28) are performed, and the series of operation ends.

Thus converter control circuit 302E determines a mode of operation of AC motor M1 from torque command value TR and motor rotation rate MRN and from the determined mode of operation, and acceleration pedal position ACC and required torque TRdc_com determines whether reactor current IL traverses the zero point. More specifically, when AC motor M1 operates in the powering mode, converter control circuit 302E determines from acceleration pedal position ACC whether reactor current IL traverses the zero point, and when AC motor M1 operates in the regeneration mode, converter control circuit 302E determines from required torque TRdc_com whether reactor current IL traverses the zero point.

When AC motor M1 operates in the regeneration mode whether reactor current IL traverses the zero point is determined from required torque TRdc_com because an acceleration pedal position in the regeneration mode cannot be considered.

When reactor current IL traverses the zero point, converter control circuit 302E controls up converter 12 to stop switching to perform an up converting or down converting operation, otherwise converter control circuit 302E controls up converter 12 to switch to perform the up converting or down converting operation.

Thus up converter 12 can have NPN transistors Q1, Q2 switching less frequently and thus providing reduced switching noise. Furthermore, NPN transistors Q1, Q2 switching less frequently can contribute to reduced switching loss.

Note that in the present invention the control of voltage conversion that contributes to reduced switching noise is in effect performed by a CPU reading from a ROM a program including each step of the FIG. 32 flow chart, and executing the read program and following the FIG. 32 flow chart to control up converter 12 to switch to perform an up converting or down converting operation. Accordingly, the ROM corresponds to a computer (CPU) readable storage medium having recorded therein the program including each step of the FIG. 32 flow chart.

Motor drive apparatus 100E provides a general operation corresponding to that of motor drive apparatus 100 having an operation of converter control circuit 302 contributing to reduced switching noise replaced with that of converter control circuit 302E.

The remainder is the same as those of the first, fourth and fifth embodiments.

Note that as described above, motor drive apparatuses 100, 100A, 100B, 100C, 100D, 100E drive a single AC motor. However, the present motor drive apparatus may drive a plurality of motors. In that case, the motor drive apparatus includes a plurality of inverters corresponding to the plurality of motors and connected in parallel at opposite ends of capacitor C2 close to an output of up converter 12.

Figure 33:
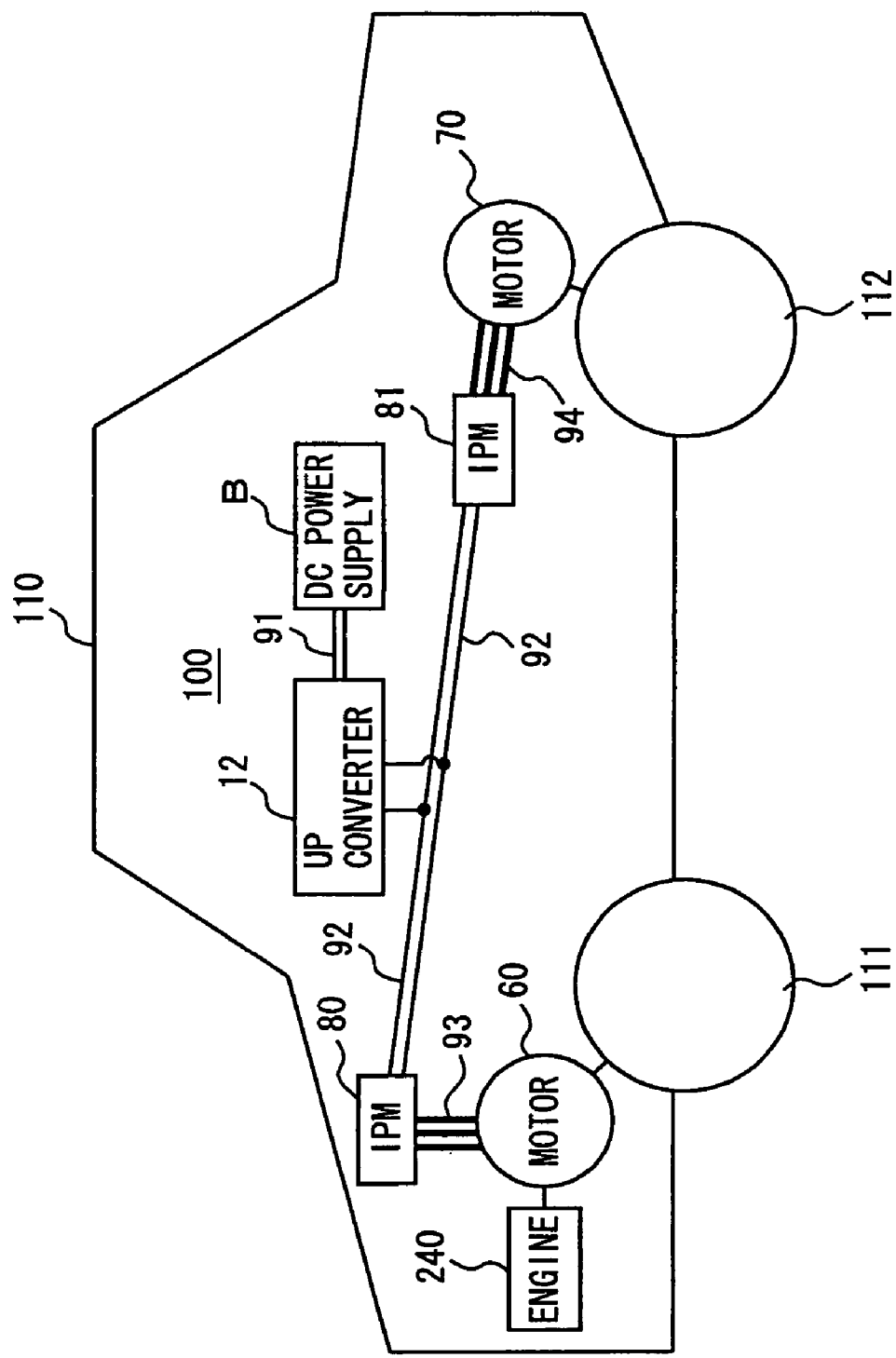
FIG. 33 shows a configuration of a hybrid vehicle having the FIG. 1 motor drive apparatus mounted therein.

Hereinafter will be described a hybrid vehicle having motor drive apparatus 100 mounted therein. FIG. 33 shows a configuration of a hybrid vehicle 110 having the FIG. 1 motor drive apparatus 100 mounted therein. Note that in FIG. 33 motor drive apparatus 100 is shown as that driving two motors 60 and 70.

With reference to FIG. 33, motor drive apparatus 100 has motor 60 arranged adjacent to a front wheel 111 of hybrid vehicle 110. An intelligent power module (IPM) 80 is arranged adjacent to motor 60 and connected to motor 60 by a cable 93. DC power supply B and up converter 12 are arranged between front wheel 111 and a rear wheel 112. DC power supply B is connected to up converter 12 by a cable 91 and up converter 12 is connected to IPMs 80 and 81 by a cable 92. Motor 60 is linked to front wheel 111 and an engine 240.

Motor 70 is arranged adjacent to rear wheel 112 of hybrid vehicle 110. IPM 81 is arranged adjacent to motor 70 and connected to motor 70 by a cable 94. Motor 70 is linked to rear wheel 112.

Note that cables 91, 92 are high voltage DC power supply lines having (+, −). Furthermore, cables 93, 94 are motor drive lines having U phase, V phase, W phase.

Figure 34:
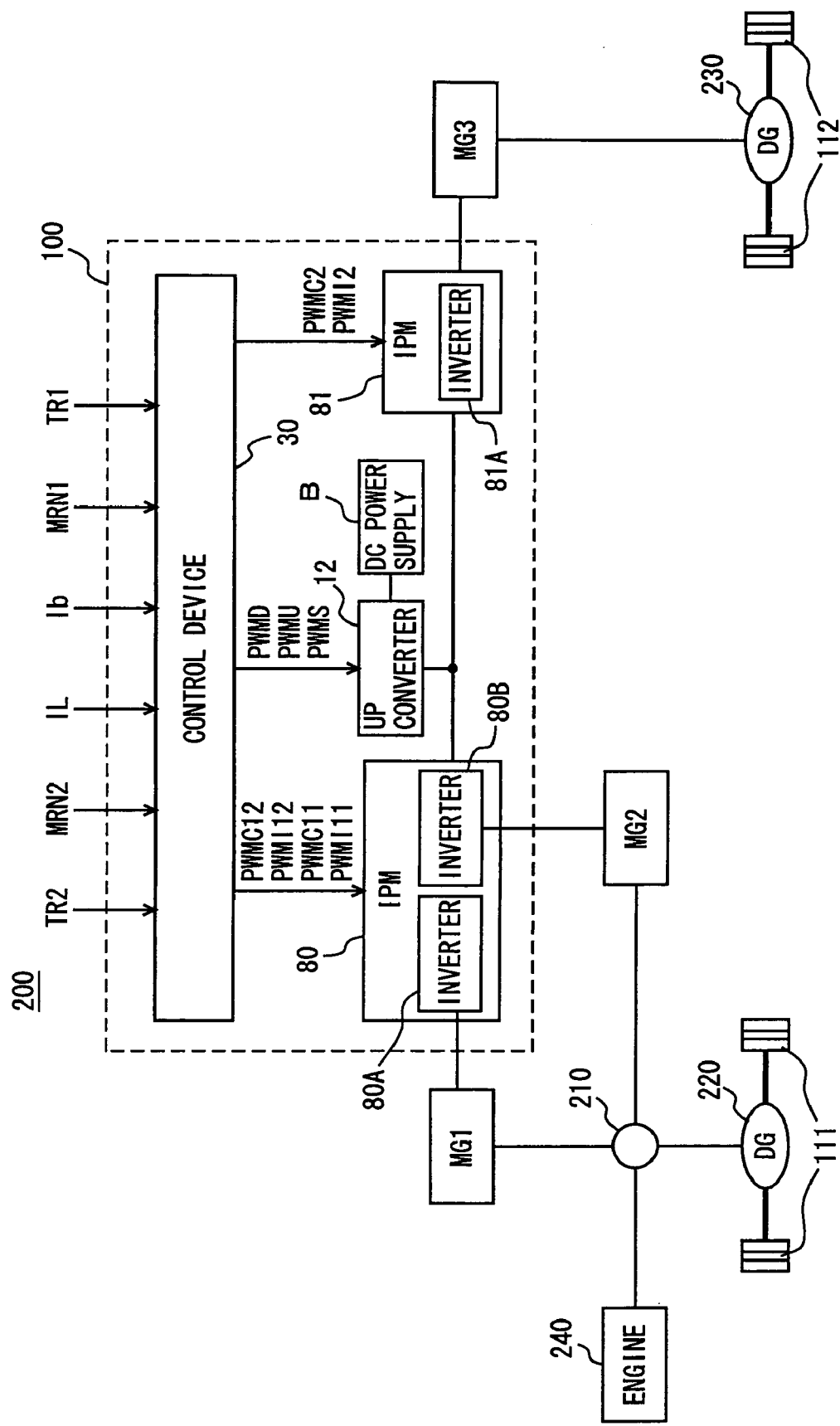
FIG. 34 is a schematic block diagram of a drive system of the hybrid vehicle with the FIG. 1 motor drive apparatus mounted therein.

FIG. 34 is a block diagram schematically showing a drive system of hybrid vehicle 110 having the FIG. 1 motor drive apparatus 100 mounted therein. With reference to the figure, drive system 200 includes motor drive apparatus 100, front wheel 111, rear wheel 112, a force division mechanism 210, a differential gear (DG) 220, 230, engine 240, and motor generators MG1–MG3.

In drive system 200 motor generators MG1, MG2 correspond to motor 60 and motor generator MG3 corresponds to motor 70, and as motor 60 is configured of two motor generators MG1 and MG2, IPM 80 is accordingly formed of two inverters 80A and 80B. Inverter 80A drives motor generator MG1 and inverter 80B drives motor generator MG2. Furthermore, IPM 81 includes an inverter 81A driving motor generator MG3.

Motor generator MG1 is linked to engine 240 via force division mechanism 210, and starts engine 240 or generates power by force of rotation of engine 240.

Furthermore, motor generator MG2 drives front wheel 111 via force division mechanism 210.

Furthermore, motor generator MG3 drives rear wheel 112.

Figure 35:
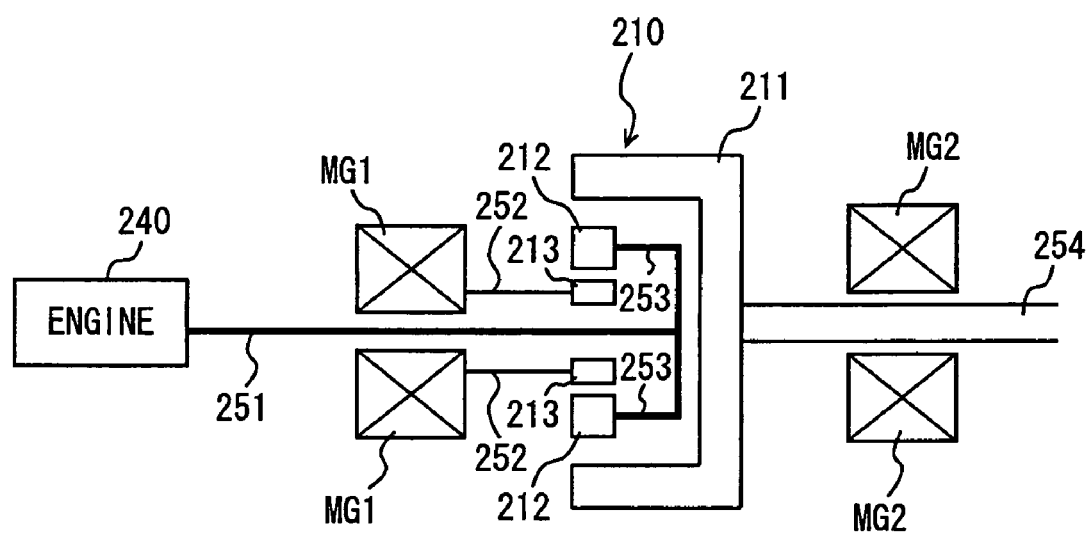
FIG. 35 schematically shows the force division mechanism shown in FIG. 34.

FIG. 35 schematically shows force division mechanism 210 shown in FIG. 34. With reference to FIG. 35, force division mechanism 210 includes a ring gear 211, a carrier gear 212, and a sun gear 213. The engine 240 shaft 251 is connected via a planetary gear 253 to carrier gear 212, and the motor generator MG1 shaft 252 is connected to sun gear 213, and the motor generator MG2 shaft 254 to ring gear 211. The motor generator MG2 shaft 254 is linked via DG 220 to a shaft driving front wheel 111.

Motor generator MG1 rotates shaft 251 via shaft 252, sun gear 213, carrier gear 212 and planetary carrier 253 to start engine 240. Furthermore, motor generator MG1 receives force of rotation of engine 240 via shaft 251, planetary carrier 253, carrier gear 212, sun gear 213 and shaft 252 and generates power by the received force.

With reference again to FIG. 34, when the hybrid vehicle with drive system 200 mounted therein starts, drives off, and runs in a light load running mode, an intermediate speed, low load running mode, an acceleration and rapid acceleration mode, a low μ road running mode, and a deceleration and braking mode, drive system 200 operates, as will be described hereinafter. Note that for starting, driving off and the variety of modes as described above, the motors 60, 70, torque command values TR1, TR2 and signals PWMU, PWMD, PWMI1, PWMI2, PWMC1, PWM2 are indicated in Table 1.

Initially when hybrid vehicle 110 has its engine started, drive system 200 operates, as will be describe hereinafter. When a series of operation starts, control device 30 receives torque command value TR11 and a motor rotation rate MRN1 from an external ECU and is driven by torque command value TR11, motor rotation rate MRN1, voltage Vb provided from voltage sensor 10, and voltage Vm provided from voltage sensor 13 to generate and output signal PWMU1 to up converter 12. Furthermore, control device 30 is driven by voltage Vm, a motor current MCRT1 (a type of motor current MCRT) provided from current sensor 24, and torque command value TR11 and follows the above described method to generate and output signal PWMI11 to inverter 80A.

In response, up converter 12 responds to signal PWMU1 by up converting a DC voltage provided from DC power supply B, and supplying the voltage to inverter 80A, and control device 30 makes a decision from power supply current Ib provided from current sensor 11 and the reactor current IL maximum value ILmax and minimum value ILmin provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

Up converter 12 for reactor current IL traversing the zero point stops switching and for reactor current IL failing to traverse the zero point allows switching to perform the up converting operation to supply inverter 80A with voltage Vm matching voltage command Vdc_com.

Inverter 80A converts a DC voltage provided from up converter 12 to an AC voltage in response to signal PWMI11 and drives motor generator MG1 to output a torque designated by torque command value TR11.

Thus motor generator MG1 rotates crank shaft 251 of engine 240 via force division mechanism 210 at rotation rate MRN1 to start engine 240. Thus the drive system 200 operation performed in starting the engine of hybrid vehicle 110 ends.

When hybrid vehicle 110 drives off, drive system 200 operates as will be described hereinafter. When a series of operation starts, control device 30 receives torque command values TR12 and TR21, and motor rotation rates MRN1, MRN2 from the external ECU. In that case, torque command value TR12 is formed of a torque command value TR121 applied for causing motor generator MG1 to function

TABLE 1

| States of Hybrid Vehicle | Torque Command Value TR1 of Motor 60 | Torque Command Value TR2 of Motor 70 | Signal PWMU or Signal PWMD | Signal PWMI1 or Signal PWMC1 | Signal PWMI2 or Signal PWMC2 |
| --- | --- | --- | --- | --- | --- |
| Start | TR11 | — | PWMU1 | PWMI11 | — |
| Drive off | TR12 | TR21 | PWMU2 | PWMI12 | PWMI21 |
| Light Load Running Mode | TR13 | — | PWMU3 | PWMI13 | — |
| Intermediate Speed, Low Load Running Mode | TR11 | — | PWMU1 | PWMI11 | — |
| Acceleration and Rapid Acceleration Mode | TR14 | TR22 | PWMU4 | PWMI14 | PWMI22 |
| Low μ Road Running Mode | TR15 | TR23 | PWMU5 | PWMC1 | PWMI23 |
| Deceleration and Braking Mode | TR16 | TR24 | PWMD1 | PWMC1 | PWMC2 | as a power generator by force of rotation of engine 240 after it has started, and a torque command value TR122 applied to use motor generator MG2 for driving off Torque command value TR21 is a torque command value applied to use motor generator MG3 for driving off Control device 30 is driven by torque command value TR122, motor current MCRT1, and voltage Vm provided from voltage sensor 13 and follows the above described method to generate and output signal PWMI12 to inverter 80B. Furthermore, control device 30 is driven by torque command value TR121, motor current MCRT1 and voltage Vm and follows the above described method to generate and output signal PWMC1 to inverter 80A. Furthermore, control device 30 is driven by torque command value TR21, a motor current MCRT2, and voltage Vm provided from voltage sensor 13 and follows the above described method to generate and output signal PWMI21 to inverter 81A. Furthermore, control device 30 is driven by torque command value TR22 or TR21, voltages Vb, Vm, and motor rotation rate MRN1 or MRN2 and follows the above described method to generate and output signal PWMU2 to up converter 12.

Up converter 12 responds to signal PWMU2 by up converting voltage Vb output from DC power supply B, and supplying the up converted DC voltage to inverters 80B and 81A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverters 80B and 81A with voltage Vm matching voltage command Vdc_com. Furthermore, inverter 80A converts to a DC voltage by signal PWMC1 an AC voltage generated by motor generator MG1 through force of rotation of engine 240, and supplies the DC voltage to inverter 80B. Inverter 80B receives the DC voltage from up converter 12 and that from inverter 80A and converts the received DC voltages in response to signal PWMI12 to AC voltage to drive motor generator MG2 to output a torque designated by torque command value TR22, and motor generator MG2 drives front wheel 111 via force division mechanism 210 and differential gear 220.

Furthermore, inverter 81A receives DC voltage from up converter 12 and converts the received DC voltage by signal PWMI21 to an AC voltage to drive motor generator MG3 to output a torque designated by torque command value TR21, and motor generator MG3 drives rear wheel 112 via differential gear 230.

Thus hybrid vehicle 110 has front and rear wheels 111 and 112 rotated by motor generators MG2 and MG3, respectively, and hybrid vehicle 110 drives off by 4WD. Thus an operation of drive system 200 performed when hybrid vehicle 110 drives off ends.

When hybrid vehicle 110 is in the light load running mode, drive system 200 operates as described hereinafter. When a series of operation starts, control device 30 receives torque command value TR13 and motor rotation rate MRN1 from the external ECU. Note that torque command value TR13 is a torque command value applied to drive the hybrid vehicle 110 front wheel 111 by motor generator MG2 alone.

Control device 30 is driven by torque command value TR13, motor rotation rate MRN1 and voltages Vb and Vm provided from voltage sensors 10 and 13, respectively, to generate and output signal PWMU3 to up converter 12. Furthermore, control device 30 is driven by voltage Vm, motor current MCRT1 provided from current sensor 24, and torque command value TR13 provided from the external ECU and follows the above described method to generate and output signal PWMI13 to inverter 80B.

Up converter 12 responds to signal PWMU3 by up converting DC voltage output from DC power supply B, and supplying the up converted DC voltage to inverter 80B, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverter 80B with voltage Vm matching voltage command Vdc_com.

Furthermore, inverter 81B receives DC voltage from up converter 12 and converts the received DC voltage by signal PWMI13 to an AC voltage to drive motor generator MG2 to output a torque designated by torque command value TR13. Motor generator MG2 drives front wheel 111 via force division mechanism 210 and differential gear 220, and hybrid vehicle 110 is run by motor generator MG2 for light load. Thus an operation of drive system 200 performed when hybrid vehicle 110 is in the light load running mode, ends.

When hybrid vehicle 110 is in the intermediate speed, low load running mode, drive system 200 operates as described hereinafter. This operation of drive system 200 is the same as that of the system performed when the hybrid vehicle 110 engine 240 starts, as described above, and motor generator MG1 starts engine 240 and the hybrid vehicle is run by the driving force of engine 240.

When hybrid vehicle 110 is in the acceleration and rapid acceleration mode, drive system 200 operates as will be described hereinafter. When a series of operation starts, control device 30 receives torque command values TR14 and TR22, and motor rotation rates MRN1, MRN2 from the external ECU. Torque command value TR14 is configured of a torque command value TR141 applied to cause motor generator MG1 to function as a power generator and a torque command value TR142 applied to use motor generator MG2 for acceleration and rapid acceleration. Torque command value TR22 is a torque command value applied to use motor generator MG3 for acceleration and rapid acceleration.

Control device 30 is driven by torque command value TR142, motor current MCRT1, and voltage Vm provided from voltage sensor 13 and follows the above described method to generate and output signal PWMI14 to inverter 80B. Furthermore, control device 30 is driven by torque command value TR141, motor current MCRT1 and voltage Vm and follows the above described method to generate and output signal PWMC1 to inverter 80A. Furthermore, control device 30 is driven by torque command value TR22, a motor current MCRT2, and voltage Vm provided from voltage sensor 13 and follows the above described method to generate and output signal PWMI22 to inverter 81A. Furthermore, control device 30 is driven by torque command value TR142 or TR21, voltages Vb, Vm, and motor rotation rate MRN1 or MRN2 and follows the above described method to generate and output signal PWMU4 to up converter 12.

Up converter 12 responds to signal PWMU4 by up converting voltage Vb output from DC power supply B, and supplying the up converted DC voltage to inverters 80B and 81A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverters 80B and 81A with voltage Vm matching voltage command Vdc_com.

Inverter 80A converts to a DC voltage by signal PWMC1 an AC voltage generated by motor generator MG1 through force of rotation of engine 240 (having a rotation rate higher than before acceleration) and supplies the DC voltage to inverter 80B. Inverter 80B receives the DC voltage from up converter 12 and that from inverter 80A and converts the received DC voltages in response to signal PWMI14 to AC voltage to drive motor generator MG2 to output a torque designated by torque command value TR142.

Motor generator MG2 thus drives front wheel 111 via force division mechanism 210 and differential gear 220.

Furthermore, inverter 81A receives DC voltage from up converter 12 and converts the received DC voltage by signal PWMI22 to an AC voltage to drive motor generator MG3 to output a torque designated by torque command value TR22, and motor generator MG3 drives rear wheel 112 via differential gear 230.

Thus hybrid vehicle 110 has front and rear wheels 111 and 112 rotated by motor generators MG2 and MG3, respectively, and hybrid vehicle 110 is accelerated and rapidly accelerated by 4WD. Thus an operation of drive system 200 performed when hybrid vehicle 110 is in the acceleration and rapid acceleration mode, ends.

When hybrid vehicle 110 is in the low μ road running mode, drive system 200 operates as will be described hereinafter. When a series of operation starts, control device 30 receives torque command values TR15, TR23 and motor rotation rate MRN2 from the external ECU. Note that torque command value TR15 is a torque command value applied to drive motor generator MG2 in the regeneration mode and torque command value TR23 is a torque command value applied to use motor generator MG3 as a drive motor.

Control device 30 is driven by torque command value TR15, motor current MCRT1 and voltage Vm and follows the above described method to generate and output signal PWMC1 to inverter 80B.

In the low μ road running mode, engine 240 drives front wheel 111 and a portion of force driving front wheel 111 is transmitted to motor generator MG2.

Inverter 80B responds to signal PWMC1 to drive motor generator MG2 in the regeneration mode, and an AC voltage generated by motor generator MG2 receiving a portion of force driving front wheel 111 is converted to a DC voltage which is in turn supplied to inverter 80A.

Furthermore, control device 30 is driven by torque command value TR23, motor current MCRT2 and voltage Vm to generate and output signal PWMI23 to inverter 81A. Inverter 81A receives DC voltage from inverter 80B and converts the received DC voltage by signal PWMI23 to an AC voltage to drive motor generator MG3 to output a torque designated by torque command value TR23, and motor generator MG3 drives rear wheel 112 via differential gear 230. Thus hybrid vehicle 110 drives front wheel 111 by the engine 240 driving force and drives rear wheel 112 by power generated by motor generator MG2 receiving a portion of the force, and thus runs for low μ road. As up converter 12 is stopped, switching noise is reduced.

If power generated by motor generator MG2 cannot cause motor generator MG3 to drive rear wheel 112, control device 30 is driven by torque command value TR23, motor rotation rate MRN2, and voltages Vb and Vm provided from voltage sensors 10 and 13, respectively, and follows the above described method to generate and output signal PWMU5 to up converter 12.

Up converter 12 responds to signal PWMU5 by up converting DC voltage output from DC power supply B, and supplying the up converted DC voltage to inverter 81A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverter 81A with voltage Vm matching voltage command Vdc_com.

Inverter 81A receives DC voltage up converter 12 and inverter 80B and converts the received DC voltage by signal PWMI23 to an AC voltage to drive motor generator MG3 to drive rear wheel 112 via differential gear 230. Thus hybrid vehicle 110 drives front wheel 111 by the engine 240 driving force and drives rear wheel 112 by power generated by motor generator MG2 receiving a portion of the force and that provided from DC power supply B, and thus runs for low μ road.

Thus the operation of drive system 200 performed when hybrid vehicle 110 is in the low μ road running mode, ends.

Finally when hybrid vehicle 110 is in the deceleration and braking mode, drive system 200 operates as will be described hereinafter. When a series of operation starts, control device 30 receives torque command values TR16, TR24 from the external ECU and in response thereto drives motor generator MG2 and/or motor generator MG3 in the regeneration mode. More specifically, control device 30 is driven by torque command values TR16, TR24, motor currents MCRT1, MCRT2, and voltage Vm to generate and output signals PWMC1 and PWMC2 to inverters 80B and 81A, respectively. Furthermore, control device 30 is driven by torque command values TR16, TR24, motor rotation rates MRN1, MRN2, and voltages Vb, Vm to generate and output signal PWMD1 to up converter 12.

Inverter 80B converts in response to signal PWMC1 an AC voltage generated by motor generator MG2 to a DC voltage which is in turn supplied to up converter 12. Furthermore, inverter 81A converts in response to signal PWMC2 an AC voltage generated by motor generator MG3 to a DC voltage which is in turn supplied to up converter 12. Up converter 30 down converts in response to signal PWMD1 the DC voltages provided from inverters 80B and 81A.

Control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform a down converting operation, otherwise control device 30 controls up converter 12 to switch to perform the down converting operation.

Motor generators MG1 and MG2 drive front and rear wheels 111A and 112A, respectively.

When electric vehicle 110A with electric drive system 200A mounted therein, drives off, and runs in a light load running mode, an intermediate speed, low load running mode, an acceleration and rapid acceleration mode, a low μ road running mode, and a deceleration and braking mode, electric drive system 200A operates, as will be described hereinafter. Note that for, driving off and the variety of modes as described above, the motors 60, 70, torque command values TR1, TR2 and signals PWMU, PWMD, PWMI1, PWMI2, PWMC1, PWM2 are indicated in Table 2.

TABLE 2

| States of Hybrid Vehicle | Torque Command Value TR1 of Motor 60 | Torque Command Value TR2 of Motor 70 | Signal PWMU or Signal PWMD | Signal PWMI1 or Signal PWMC1 | Signal PWMI2 or Signal PWMC2 |
|---|---|---|---|---|---|
| Drive off | TR11 | TR21 | PWMU1 | PWMI11 | PWHI21 |
| Light Load Running Mode | TR12 | — | PWMU2 | PWMI12 | — |
| Intermediate Speed, Low Load Running Mode | TR13 | — | PWMU3 | PWMI13 | — |
| Acceleration and Rapid Acceleration Mode | TR14 | TR22 | PWMU4 | PWMI14 | PWMI22 |
| Low μ Road Running Mode | TR15 | TR23 | PWMD1 | PWMC11 | PWMI23 |
| Deceleration and Braking Mode | TR16 | TR24 | PWMD2 | PWMC12 | PWMC21 |

When reactor current IL traverses the zero point, up converter 12 stops switching, and when reactor current IL does not traverse the zero point, up converter 12 switches to perform the down converting operation to down convert voltage Vm output from up converter 12 to match voltage command Vdc_com, and charge DC power supply B.

Thus hybrid vehicle 110 is decelerated and braked by regenerative braking and/or mechanical braking, and the operation of drive system 200 performed when hybrid vehicle 110 is decelerated and braked, ends.

Note that while in the above description motor drive apparatus 100 is applied to drive system 200, motor drive apparatus 100 may be replaced with motor drive apparatus 100A, 100B, 100C, 100D, 100E.

Figure 36:
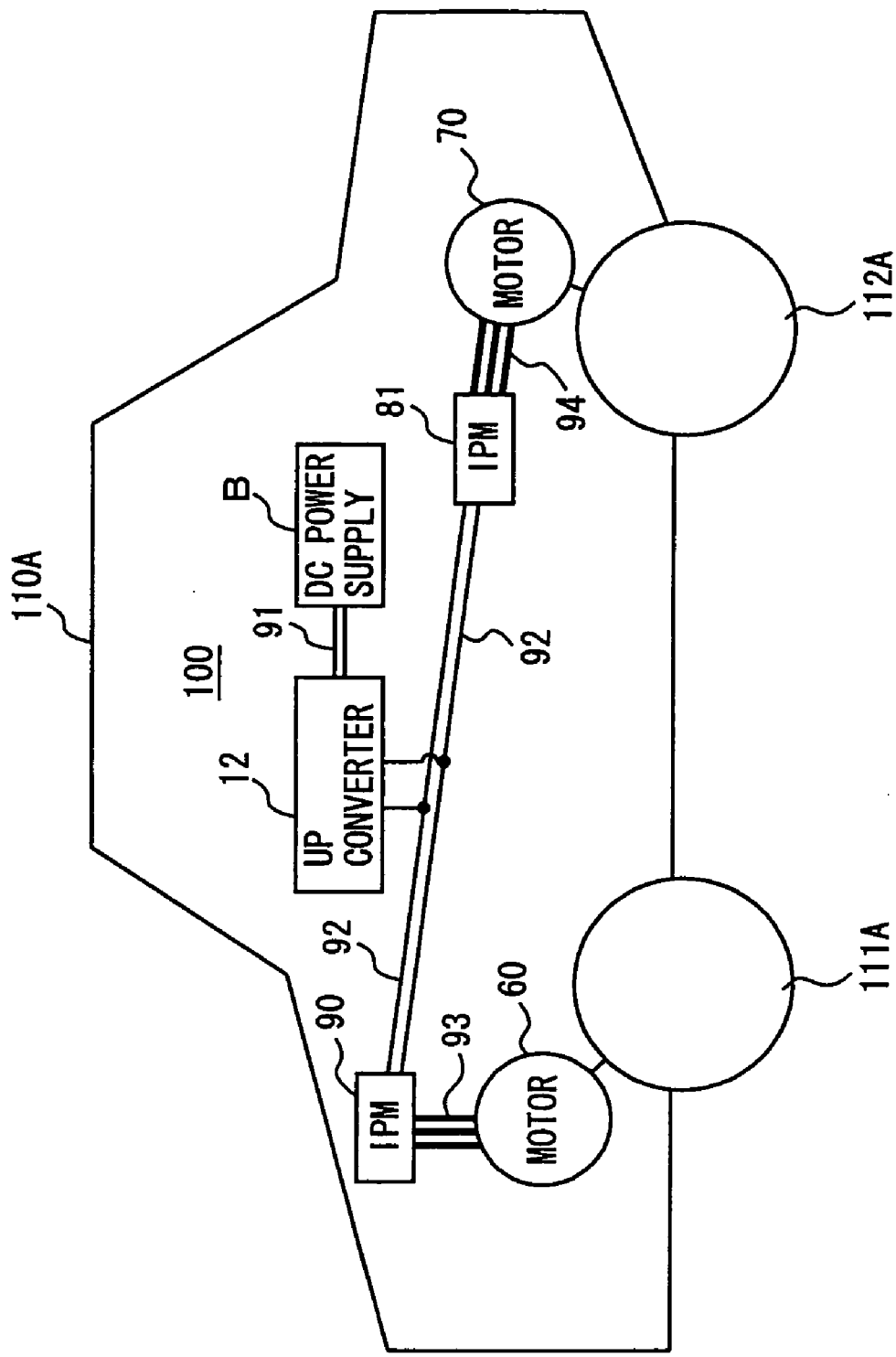
FIG. 36 shows a configuration of an electric vehicle having the FIG. 1 motor drive apparatus mounted therein.

FIG. 36 shows a configuration of an electric vehicle 110A having the FIG. 1 motor drive apparatus 100 mounted therein. Note that FIG. 36 also shows motor drive apparatus 100 as a motor drive apparatus driving two motors 60, 70. With reference to the figure, electric vehicle 110A corresponds to hybrid vehicle 110 having engine 240 removed and IPM 80 replaced with an IPM 90.

Figure 37:
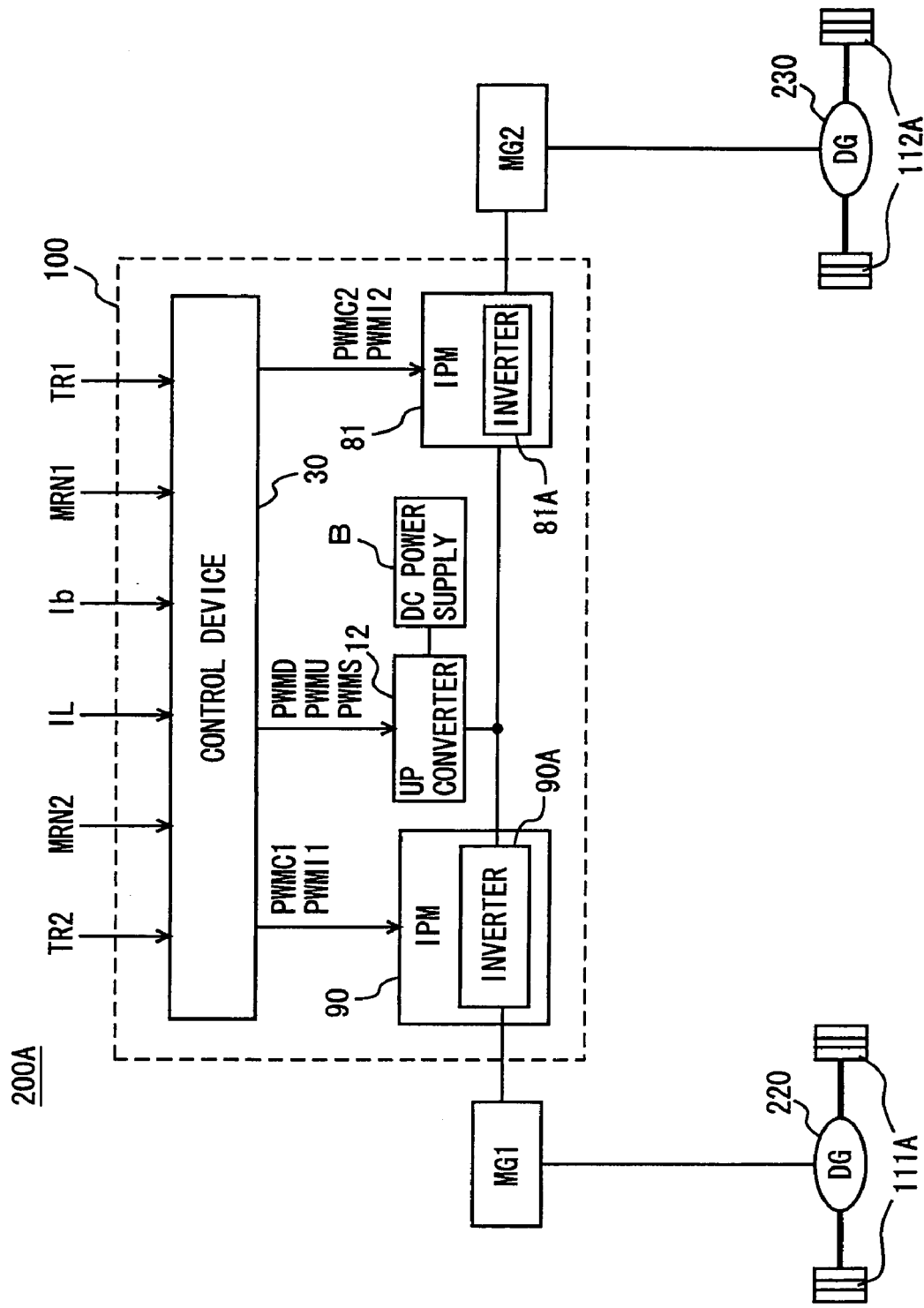
FIG. 37 is a schematic block diagram of an electric drive system of the electric vehicle having the FIG. 1 motor drive apparatus mounted therein.

FIG. 37 is a block diagram schematically showing an electric drive system of electric vehicle 110A having the FIG. 1 motor drive apparatus 100 mounted therein. With reference to the figure, an electric drive system 200A includes motor drive apparatus 100, motor generators MG1, MG2, a front wheel 111A, a rear wheel 112A, and differential gears 220, 230.

In electric drive system 200A motor generators MG1 and MG2 correspond to motors 60 and 70, respectively, and as motor 60 is configured of a single motor generator MG1, IPM 90 accordingly includes a single inverter 90A. Inverter 90A drives motor generator MG1. Furthermore, IPM 81 includes inverter 81A, which drives motor generator MG2.

Initially, when electric vehicle 110A drives off, electric drive system 200A operates as will be described hereinafter. When a series of operation starts, control device 30 receives torque command values TR11 and TR21, and motor rotation rates MRN1, MRN2 from the external ECU. In that case, torque command value TR11 is a torque command value applied to use motor generator MG1 for driving off, and a torque command value TR21 is a torque command value applied to use motor generator MG2 for driving off.

Control device 30 is driven by voltage Vm, motor current MCRT1 and torque command value TR11 provided from the external ECU and follows the above described method to generate and output signal PWMI11 to inverter 90A. Furthermore, control device 30 is driven by torque command value TR21, motor current MCRT2 and voltage Vm and follows the above described method to generate and output signal PWMI21 to inverter 81A.

Furthermore, control device 30 is driven by torque command value TR11 or TR21, voltages Vb, Vm, and motor rotation rate MRN1 or MRN2 and follows the above described method to generate and output signal PWMU1 to up converter 12.

Up converter 12 up converts in response to signal PWMU1 a DC voltage provided from DC power supply B and supplies the up converted DC voltage to inverters 90A, 81A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverters 90A and 81A with voltage Vm matching voltage command Vdc_com.

Furthermore, inverter 90A receives DC voltage from up converter 12 and converts the received DC voltage by signal PWMI11 to an AC voltage to drive motor generator MG1 to output a torque designated by torque command value TR11, and motor generator MG1 drives front wheel 111A via differential gear 220.

Furthermore, inverter 81A receives DC voltage from up converter 12 and converts the received DC voltage by signal PWMI21 to an AC voltage to drive motor generator MG2 to output a torque designated by torque command value TR21, and motor generator MG2 drives rear wheel 112A via differential gear 230.

Thus electric vehicle 110A has front and rear wheels 111A and 112A rotated by motor generators MG1 and MG2, respectively, and electric vehicle 110A drives off by 4WD. Thus an operation of electric drive system 200A performed when electric vehicle 110A drives offends.

When electric vehicle 110A is in the light load running mode, electric drive system 200A operates as described hereinafter. When a series of operation starts, control device 30 receives torque command value TR12 and motor rotation rate MRN1 from the external ECU.

Control device 30 is driven by voltage Vm, motor current MCRT1 and torque command value TR12 and follows the above described method to generate and output signal PWMI12 to inverter 90A. Furthermore, control device 30 is driven by torque command value TR21, voltages Vb, Vm, and motor current MRN1 and follows the above described method to generate and output signal PWMU2 to up converter 12.

Up converter 12 up converts in response to signal PWMU2 a DC voltage provided from DC power supply B and supplies the up converted DC voltage to inverter 90A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverter 90A with voltage Vm matching voltage command Vdc_com.

Furthermore, inverter 90A receives DC voltage from up converter 12 and converts the received DC voltage by signal PWMI12 to an AC voltage to drive motor generator MG1 to output a torque designated by torque command value TR12, and motor generator MG1 drives front wheel 111A via differential gear 220 and electric vehicle 110A is caused by motor generator MG1 to run for light load. The operation of electric drive system 200A thus ends that is performed when electric vehicle 110A is in the light load running mode.

When electric vehicle 110A is in the intermediate speed, low load running mode, electric drive system 200A operates as described hereinafter. When a series of operation starts, control device 30 receives torque command value TR13 and motor rotation rate MRN1 from the external ECU, and is driven by voltage Vm, motor current MCRT1 and torque command value TR13 and follows the above described method to generate and output signal PWMI13 to inverter 90A. Furthermore, control device 30 is driven by torque command value TR13, voltages Vb, Vm, and motor current MRN1 and follows the above described method to generate and output signal PWMU3 to up converter 12.

Up converter 12 up converts in response to signal PWMU3 a DC voltage provided from DC power supply B and supplies the up converted DC voltage to inverter 90A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverter 90A with voltage Vm matching voltage command Vdc_com.

Furthermore, inverter 90A receives DC voltage from up converter 12 and converts the received DC voltage by signal PWMI13 to an AC voltage to drive motor generator MG1 to output a torque designated by torque command value TR13.

Motor generator MG1 thus drives front wheel 111A via differential gear 220 and electric vehicle 110A runs at intermediate speed for low load. The operation of electric drive system 200A thus ends that is performed when electric vehicle 110A is in the intermediate speed, low load running mode.

When electric vehicle 110A is in the acceleration and rapid acceleration mode, electric drive system 200A operates as will be described hereinafter. When a series of operation starts, control device 30 receives torque command values TR14 and TR22, and motor rotation rates MRN1, MRN2 from the external ECU. Torque command value TR14 is a torque command value applied to use motor generator MG1 for acceleration and rapid acceleration and torque command value TR22 is a torque command value applied to use motor generator MG2 for acceleration and rapid acceleration.

Control device 30 is driven by voltage Vm, motor current MCRT1 and torque command value TR14 and follows the above described method to generate and output signal PWMI14 to inverter 90A. Furthermore, control device 30 is driven by voltage Vm, motor current MCRT2 and torque command value TR22 and follows the above described method to generate and output signal PWMI22 to inverter 81A. Furthermore control device 30 is driven by torque command value TR14 or TR22, voltages Vb, Vm, motor rotation rate MCRT1 or MCRT2 and follows the above described method to generate and output signal PWMU4 to up converter 12.

Up converter 12 up converts in response to signal PWMU4 a DC voltage provided from DC power supply B and supplies the up converted DC voltage to inverters 90A and 81A, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an up converting operation, otherwise control device 30 controls up converter 12 to switch to perform the up converting operation.

When reactor current IL traverses the zero point, up converter 12 stops switching, and when reactor current IL does not traverse the zero point, up converter 12 switches to perform the up converting operation to supply inverters 90A and 81A with voltage Vm matching voltage command Vdc_com.

Furthermore, inverter 90A receives DC voltage from up converter 12 and converts the received DC voltage by signal PWMI14 to an AC voltage to drive motor generator MG1 to output a torque designated by torque command value TR14, and motor generator MG1 drives front wheel 111A via differential gear 220.

Furthermore, inverter 81A receives DC voltage from up converter 12 and converts the received DC voltage by signal PWMI22 to an AC voltage to drive motor generator MG2 to output a torque designated by torque command value TR22, and motor generator MG2 drives rear wheel 112A via differential gear 230.

Thus electric vehicle 110A has front and rear wheels 111A and 112A rotated by motor generators MG1 and MG2, respectively, and electric vehicle 110A is accelerated and rapidly accelerated by 4WD. The operation of electric drive system 200A thus ends that is performed when electric vehicle 110A is in the acceleration and rapid acceleration mode.

When electric vehicle 110A is in the low μ road running mode, electric drive system 200A operates as will be described hereinafter. When a series of operation starts, control device 30 receives torque command values TR15, TR23 and motor rotation rates MRN1 and MRN2 from the external ECU. Note that torque command value TR15 is a torque command value applied to drive motor generator MG1 in the regeneration mode and torque command value TR23 is a torque command value applied to use motor generator MG2 as a drive motor.

Control device 30 is driven by torque command value TR15, voltage Vm and motor current MCRT1 and follows the above described method to generate and output signal PWMC11 to inverter 90A. Furthermore, control device 30 is driven by torque command value TR23, voltage Vm and motor current MCRT2 and follows the above described method to generate and output signal PWM23 to inverter 81A. Furthermore control device 30 is driven by torque command value TR15 or TR22, voltages Vb, Vm, motor rotation rate MCRT1 or MCRT2 and follows the above described method to generate and output signal PWMD1 to up converter 12.

Inverter 90A responds to signal PWMC11 to drive motor generator MG1 in the regeneration mode, and an AC voltage generated by motor generator MG1 receiving a portion of force driving front wheel 111A is converted to a DC voltage which is in turn supplied to up converter 12 and inverter 81A. Inverter 81A receives DC voltage from inverter 90A and converts the received DC voltage by signal PWMI23 to an AC voltage to drive motor generator MG2 to output a torque designated by torque command value TR23, and motor generator MG2 drives rear wheel 112A via differential gear 230.

Furthermore, up converter 12 operates in response to signal PWMD1 issued from control device 30 to down convert a DC current provided from inverter 90A and the down converted DC voltage is used to charge DC power supply B, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform a down converting operation, otherwise control device 30 controls up converter 12 to switch to perform the down converting operation.

When reactor current IL traverses the zero point, up converter 12 stops switching, and when reactor current IL does not traverse the zero point, up converter 12 switches to perform the down converting operation to down convert voltage Vm to match voltage command Vdc_com, and charge DC power supply B.

Thus electric vehicle 110A employs power generated by motor generator MG1 receiving a portion of power driving front wheel 111A to drive rear wheel 112A as well as charge DC power supply B and thus runs for a low μ road. As a result, electric vehicle 110A can run for the low μ road stably. Thus the operation of electric drive system 200A thus ends that is performed when electric vehicle 110A runs for low μ road.

Finally, when electric vehicle 110A is in the deceleration and braking mode, electric drive system 200A operates as will be described hereinafter. When a series of operation starts, control device 30 receives torque command values TR16, TR24 and motor rotation rates MRN1 and MRN2 from the external ECU. Note that torque command value TR16 is a torque command value applied to drive motor generator MG1 in the regeneration mode and torque command value TR24 is a torque command value applied to drive motor generator MG2 in the regeneration mode.

Control device 30 receives torque command values TR16, TR24, voltage Vm and motor currents MCRT1 and MCRT2 to generate and output signals PWMC12 and/or PWMC21 to inverters 90A and/or 81A, respectively. Furthermore, control device 30 is driven by torque command values TR16, TR24, voltages Vb, Vm and motor rotation rate MRN1 or MRN2 to generate and output signal PWMD2 to up converter 12.

Inverter 90A responds to signal PWMC12 to drive motor generator MG1 in the regeneration mode, and an AC voltage generated by motor generator MG1 receiving a portion of force driving front wheel 111A is converted to a DC voltage which is in turn supplied to up converter 12. Furthermore Inverter 81A responds to signal PWMC21 to drive motor generator MG2 in the regeneration mode, and an AC voltage generated by motor generator MG2 receiving a portion of force driving rear wheel 112A is converted to a DC voltage which is in turn supplied to up converter 12.

Up converter 12 down converts in response to signal PWMD2 a DC voltage provided from inverter 90A and/or 81A and supplies the down converted DC voltage to DC power supply B, and control device 30 makes a decision from power supply current Ib provided from current sensor 11 and maximum value ILmax and minimum value ILmin of reactor current IL provided from current sensor 18 in the above described method as to whether reactor current IL traverses the zero point and if so control device 30 controls up converter 12 to stop switching to perform an down converting operation, otherwise control device 30 controls up converter 12 to switch to perform the down converting operation.

When reactor current IL traverses the zero point, up converter 12 stops switching, and when reactor current IL does not traverse the zero point, up converter 12 switches to perform the down converting operation to down convert voltage Vm to attain voltage command Vdc_com, and charge DC power supply B.

Thus electric vehicle 110A is decelerated and braked by regenerative braking and/or mechanical braking, and the operation of electric drive system 200A thus ends that is performed when electric vehicle 110A is decelerated and braked.

Note that while in the above description electric vehicle 110A has motor drive apparatus 100 mounted therein, the present invention is not limited thereto and electric vehicle 110A may have any of motor drive apparatuses 100A, 100B, 100C, 100D, 100E mounted therein.

Seventh Embodiment

Figure 38:
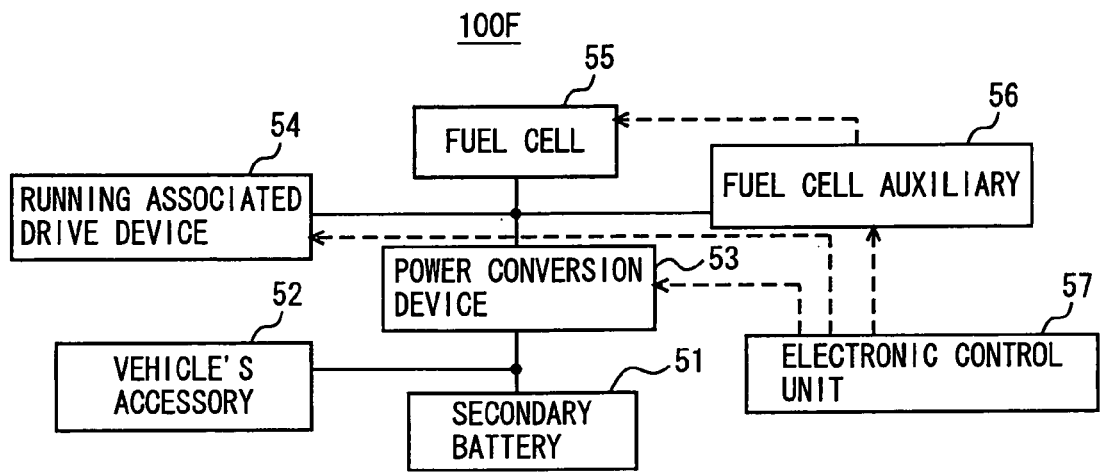
FIG. 38 is a functional block diagram of the motor drive apparatus in the seventh embodiment.

FIG. 38 is a functional block diagram of the motor drive apparatus in a seventh embodiment. With reference to the figure, the seventh embodiment provides a motor drive apparatus 100F including a secondary battery 51, a vehicle accessory 52, a power conversion device 53, a running associated drive device 54, a fuel cell 55, a fuel cell auxiliary 56, and an electronic control unit 57. Note that motor drive apparatus 100F is mounted in a fuel cell vehicle.

Power conversion device 53 is connected between secondary battery 51 and fuel cell 55. Vehicle accessory 52 is connected between secondary battery 51 and power conversion device 53. Drive device 54 and fuel cell auxiliary 56 are connected between power conversion device 53 and fuel cell 55.

Secondary battery 51 is implemented for example by a nickel metal hydride or lithium ion or similar, chargeable battery and outputs DC voltage. Vehicle accessory 52 includes an electrically driven air conditioner, an electrically driven power steering and the like and is driven by DC voltage received from secondary battery 51.

Power conversion device 53 is implemented by the up converter 12 as described above and is driven by DC voltage received from secondary battery 51 and/or fuel cell 55. Power conversion device 53 is controlled by electronic control unit 57 to perform voltage conversion between secondary battery 51, and drive device 54, fuel cell 55 and fuel cell auxiliary 56. More specifically, power conversion device 53 up converts DC voltage received from secondary battery 51 and supplies it to drive device 54, fuel cell 55 and fuel cell auxiliary 56 and also down converts DC voltage received from drive device 54, fuel cell 55 and fuel cell auxiliary 56 to charge secondary battery 51.

Drive device 54 is implemented by the inverter 14 as described above and receives DC voltage from fuel cell 55 or power conversion device 53 and fuel cell 55 and converts the received DC voltage, as controlled by electronic control unit 57, to AC voltage to drive a motor (not shown). Furthermore, drive device 54 converts to DC voltage the AC voltage generated by the motor through force of rotation of a drive wheel of the fuel cell vehicle, and supplies the DC voltage to power conversion device 53.

Fuel cell 55 is driven by fuel cell auxiliary 56 to generate power. Fuel cell auxiliary 56 receives DC voltage from fuel cell 55 and is driven by the received DC voltage, and is controlled by electronic control unit 57 to drive fuel cell 55.

Electronic control unit 57 calculates a load command Ptm associated when drive device 54 drives the motor, and electronic control unit 57 controls drive device 54 so that the calculated load command Ptm is output by the motor. Furthermore, electronic control unit 57 calculates a load Paux in fuel cell auxiliary 56, and uses load command Ptm and load Paux to calculate power output command Pfc in fuel cell 55, and electronic control unit 57 controls fuel cell auxiliary 56 so that fuel cell 55 provides a power output designated by power output command Pfc.

Furthermore, electronic control unit 57 controls switching of NPN transistors Q1, Q2 of voltage conversion device 53 to perform voltage conversion between secondary battery 51, and drive device, fuel cell 55 and fuel cell auxiliary 56.

Furthermore, electronic control unit 57 substitutes load command Ptm, load Paux and power output command Pfc into the following expression:

$$Ph = Ptm + Paux - Pfc \qquad (6)$$

to calculate power Ph output and received by power conversion device 53.

If power Ph calculated by expression (6) has a negative value, power Ph represents power supplied via power conversion device 53 from drive device 54, fuel cell 55 and fuel cell auxiliary 56 toward secondary battery 51 and if power Ph thus calculated has a positive value then it represents power supplied via power conversion device 53 from secondary battery 51 toward drive device 54, fuel cell 55 and fuel cell auxiliary 56.

Electronic control unit 57 determines whether power Ph calculated by expression (6) satisfies Ps<Ph<0 and if so electronic control unit 57 stops power conversion device 53. Otherwise, electronic control unit 57 continues to drive power conversion device 53.

Herein, Ps represents a power loss value in power conversion device 53 and is comprised for example of power for controlling switching of NPN transistors Q1, Q2 of power conversion device 53, thermal and magnetic loss in reactor L1, and the like. As power loss value Ps, a negative value is used.

When load command Ptm is positive, it corresponds to a torque generated by a motor driven by drive device 54, and when load command Ptm is negative, it corresponds to power generated by the motor. When load command Ptm is positive and drive device 54 is supplied with excessive power, the excessive power is used to charge secondary battery 51 via voltage conversion device 53.

If secondary battery 51 is charged via power conversion device 53 with power smaller than power loss value Ps in power conversion device 53, charging secondary battery 51 with excessive power only results in a negative total power balance and power is only lost at power conversion device 53. Accordingly, if secondary battery 51 is charged via power conversion device 53 with power smaller than power loss value Ps in power conversion device 53, power conversion device 53 is adapted to stop to switch less frequently.

Furthermore for example in a regeneration mode allowing a motor to generate power, generally, it generates a large amount of power, and power Ph calculated by expression (6) does not satisfy Ps<Ph<0. Power Ph is larger than power loss value Ps in power conversion device 53, and accordingly, adaptation is made to continue to drive power conversion device 53 to charge secondary battery 51.

Figure 39:
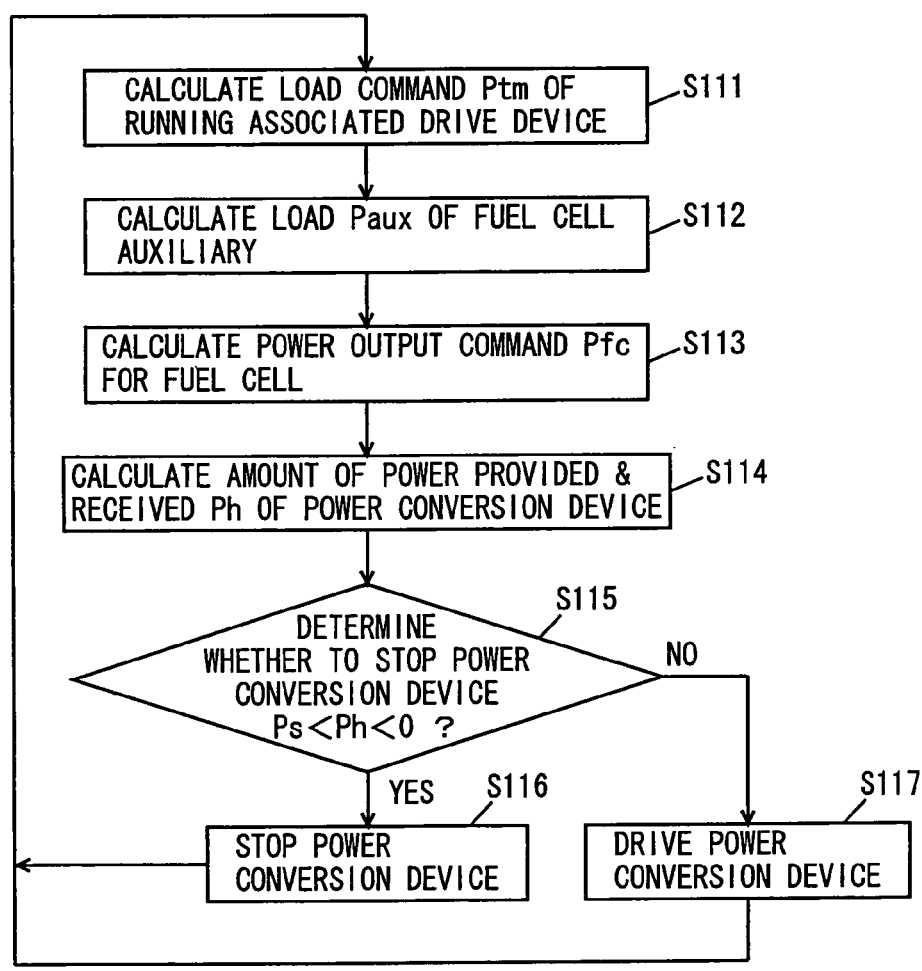
FIG. 39 is a flow chart for illustrating an operation of voltage conversion reducing switching noise in the seventh embodiment.

FIG. 39 is a flow chart for illustrating an operation of power conversion contributing reduced switching noise in the seventh embodiment. With reference to the figure, when a series of operation starts, electronic control unit 57 uses the fuel cell vehicle's acceleration pedal position, motor rotation rate and the like to calculate load command Ptm of drive device 54 (step S111). Subsequently, electronic control unit 57 calculates load Paux of fuel cell auxiliary 56 (step S112).

Electronic control unit 57 uses load command Ptm and load Paux to calculate power output command Pfc of fuel cell 55. More specifically, electronic control unit 57 calculates power output command Pfc to provided for load command Ptm and load Paux (step S113).

Electronic control unit 57 substitutes the calculated load command Ptm, load Paux and power output command Pfc into expression (6) to calculate power Ph input to/output from power conversion device 53 (step S114) and determines whether the calculated power Ph satisfies Ps<Ph<0 (step S115).

If Ps<Ph<0 is satisfied, electronic control unit 57 stops power conversion device 53 (step S116), otherwise the unit drives the device (step S117).

After step S116 or S117 the above described steps S111–S117 are repeated.

At step S115 whether power Ph satisfies Ps<Ph<0 is determined because in a mode charging secondary battery 51 when power (Ph) charging secondary battery 51 is smaller than power loss value Ps of power conversion device 53 power conversion device 53 is adapted to be stopped. More specifically, it is because when power Ph has a negative value, power Ph represents power charging secondary battery 51, as described above, and power loss value Ps is set to a negative value, and accordingly the expression for decision will be Ps<Ph<0. As such, when Ps<Ph<0 is satisfied, a decision is made that power (Ph) supplied to secondary battery 51 to charge it is smaller than power loss value Ps, otherwise a decision is made that the former is larger than the latter. Consequently, determining whether Ps<Ph<0 is satisfied corresponds to determining whether power (Ph) supplied to secondary battery 51 to charge it is smaller than power loss value Ps in power conversion device 53.

Figure 40:
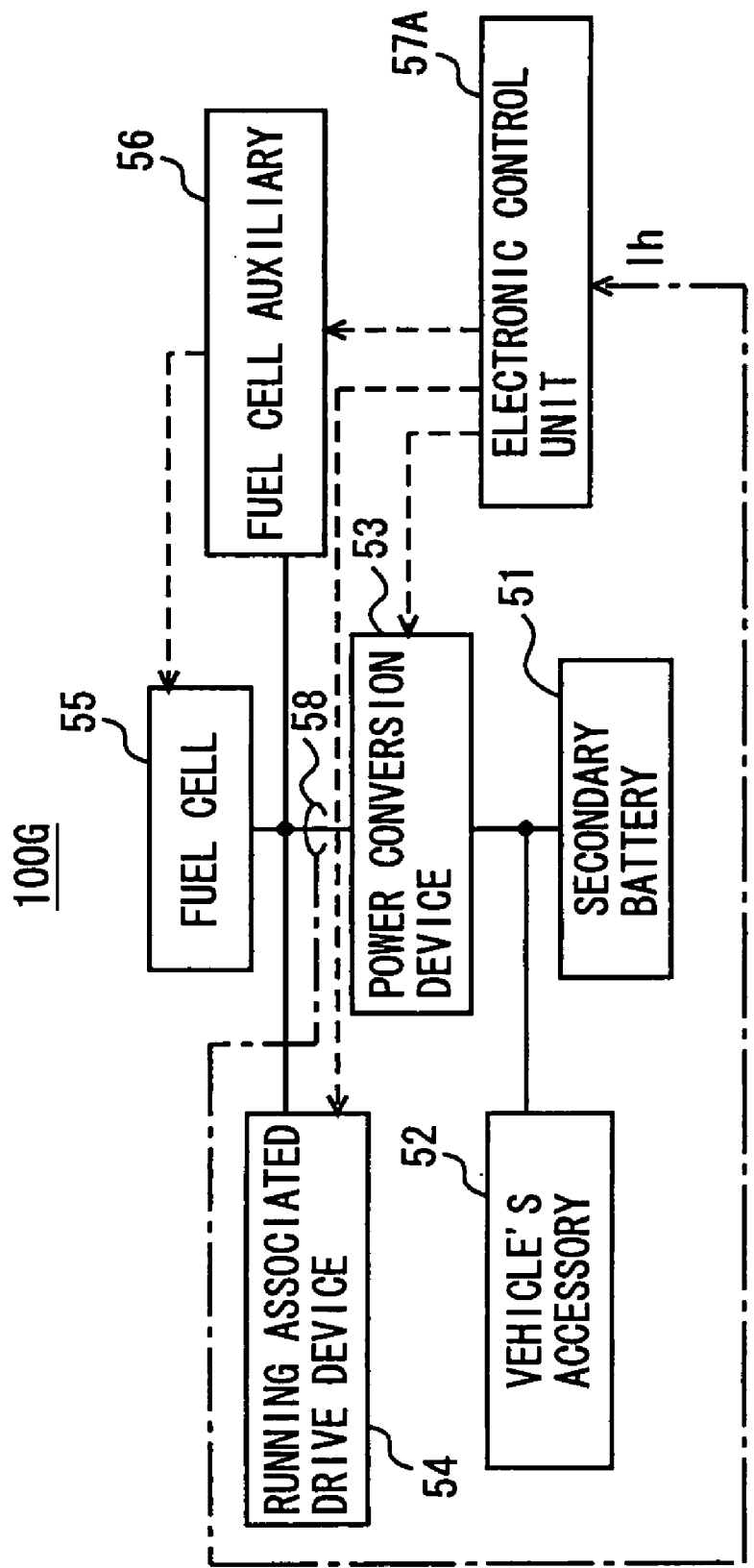
FIG. 40 is another functional block diagram of the motor drive apparatus of the seventh embodiment.

FIG. 40 is another functional block diagram of the motor drive apparatus in the seventh embodiment. With reference to the figure, a motor drive apparatus 100G corresponds to the FIG. 38 motor drive apparatus 100F plus a current detection device 58 and having electronic control unit 57 replaced with an electronic control unit 57A.

Current detection device 58 is provided between power conversion device 53 and fuel cell 55, and detects a current Ih input to and output from power conversion device 53 and outputs the detected current Ih to electronic control unit 57A.

Electronic control unit 57A determines whether current Ih satisfies—Is<Ih<0 and if so the unit stops power conversion device 53, otherwise the unit drives the device.

When current Ih flows via power conversion device 53 from secondary battery 51 toward drive device 54, fuel cell 55 and fuel cell auxiliary 56, the current has a positive value, and in the opposite case the current has a negative value.

Furthermore, Is represents a current loss value in power conversion device 53. Accordingly, electronic control unit 57A in a mode charging secondary battery 51 with current Ih smaller than current loss value Is stops power conversion device 53 and with current Ih larger than current loss value Is drives power conversion device 53.

Electronic control unit 57A other than that fulfills the same function as electronic control unit 57.

Note that current detection device 58 may be provided between secondary battery 51 and power conversion device 53.

Figure 41:
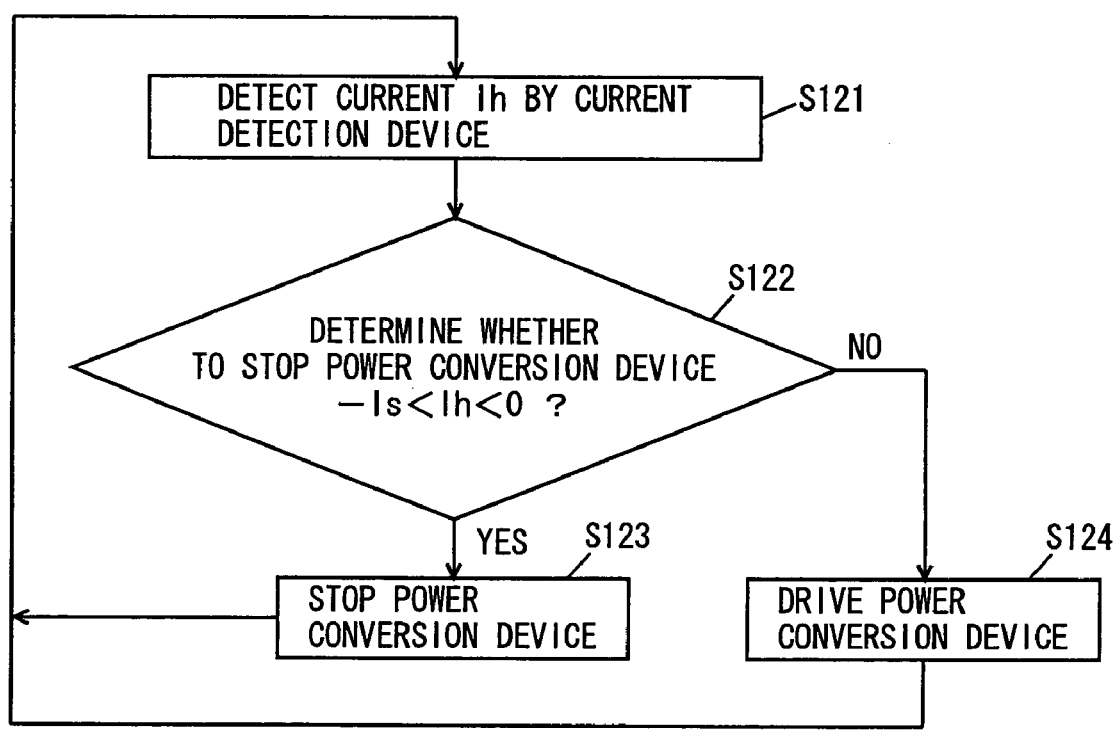
FIG. 41 is another flow chart for illustrating the operation of voltage conversion reducing switching noise in the seventh embodiment.
Figure 42:
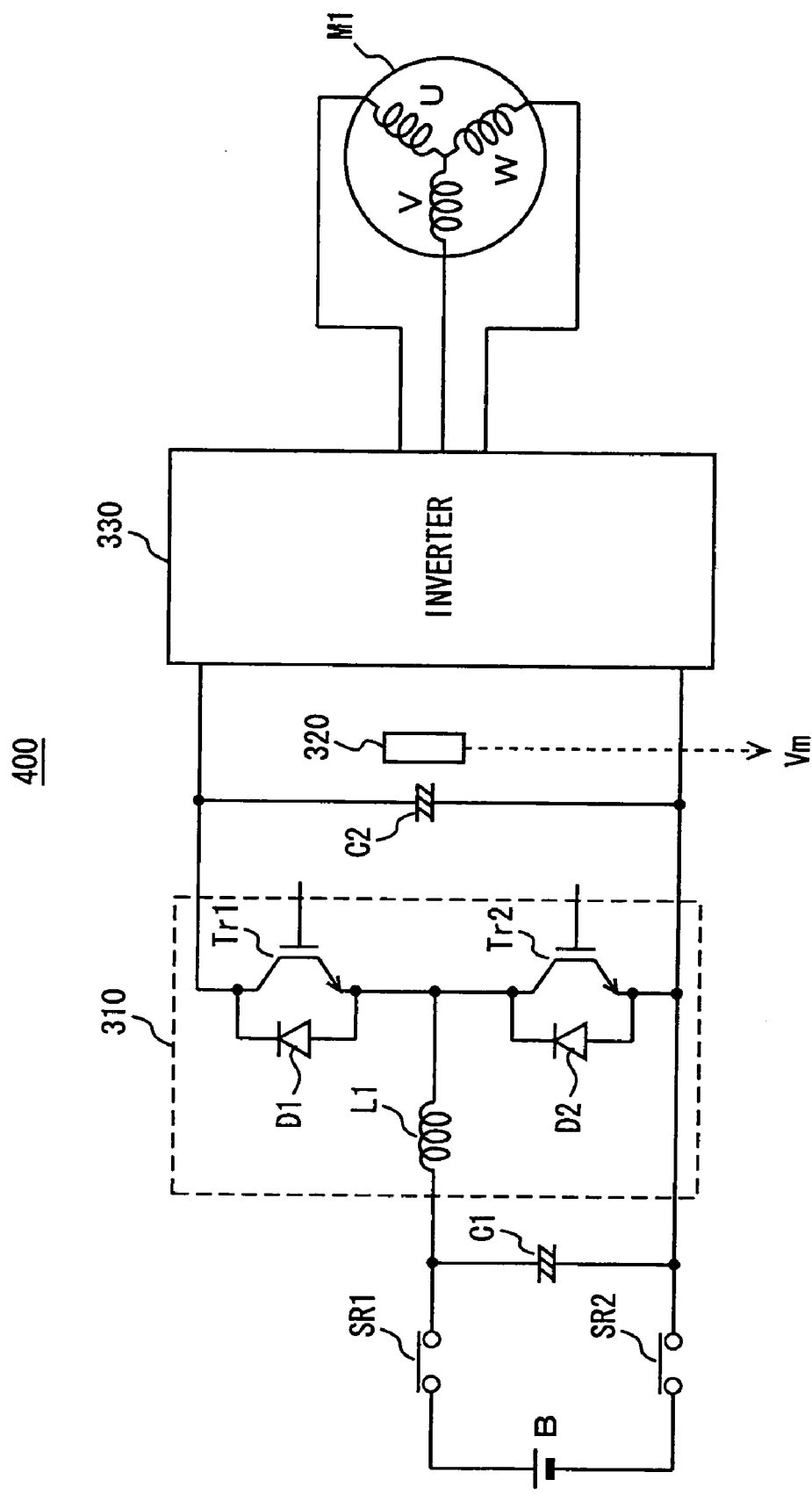
FIG. 42 is a schematic block diagram of a conventional motor drive apparatus.
Figure 43:
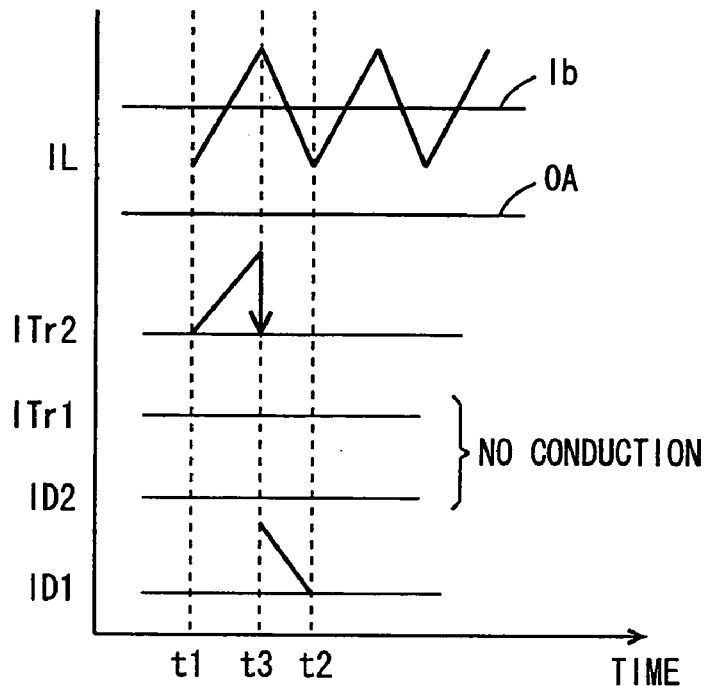
FIG. 43 is timing plots of a reactor current, a current flowing through an NPN transistor, and a current flowing through a diode when the reactor current is uninverted in polarity.
Figure 44:
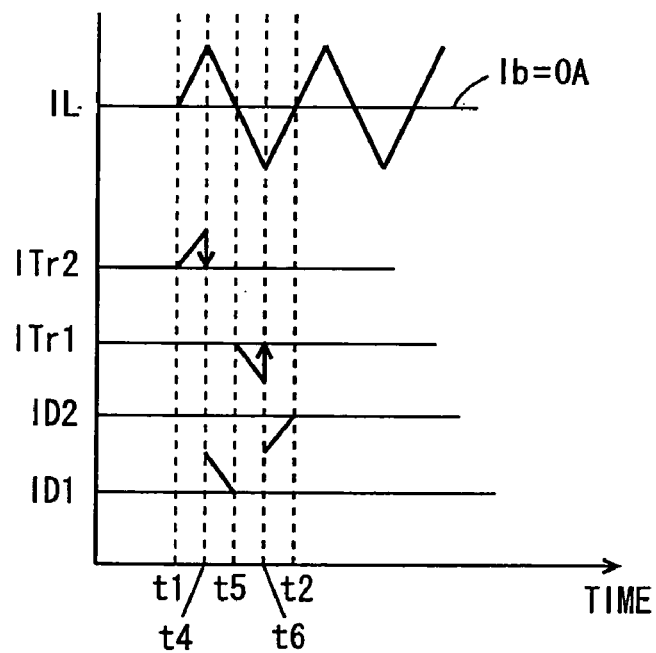
FIG. 44 is timing plots of a reactor current, a current flowing through an NPN transistor, and a current flowing through a diode when the reactor current is inverted in polarity.

FIG. 41 is another flow chart for illustrating an operation of voltage conversion contributing to reduced switching noise in the seventh embodiment. With reference to the figure, when a series of operation starts, current detection device 58 detects current Ih (step S121) and outputs the detected current Ih to electronic control unit 57A.

Electronic control unit 57A determines whether current Ih satisfies—Is<Ih<0 (step S122) and if so the unit stops power conversion device 53 (step S123), otherwise the unit drives the device (step S124). After step S123 or S124, the above described steps S121–S124 are repeated.

As has been described above, in the seventh embodiment, if power Ph (current Ih) supplied via power conversion device 53 to secondary battery 51 is smaller than power loss value Ps (current loss value Is) in power conversion device 53, power conversion device 53 is stopped, and if power Ph (current Ih) supplied via power conversion device 53 to secondary battery 51 is larger than power loss value Ps (current loss value Is) in power conversion device 53, power conversion device 53 is driven.

Thus power conversion device 53 can be switched less frequently. As a result, reduced switching noise and reduced switching loss can be achieved.

Note that in the present invention the control of voltage conversion that contributes to reduced switching noise is performed in effect by a CPU reading from a ROM a program including each step of the FIG. 39 or 41 flow chart, and executing the read program and following the FIG. 39 or FIG. 41 flow chart to control switching of power conversion device 53. Accordingly, the ROM corresponds to a computer (CPU) readable storage medium having recorded therein the program including each step of the FIG. 39 or 41 flow chart.

The FIG. 41 flow chart is used only in making a decision as to whether power conversion device 53 should be stopped while motor drive apparatus 100G is driven.

While in each embodiment described above the motor is an AC motor, in the present invention the motor may be a DC motor.

Preferred Embodiment

In the present motor drive apparatus when a control circuit detects that a reactor current has maximum and minimum values identical in polarity, the control circuit controls a voltage converter to switch and to provide an up converting or down converting operation.

Furthermore in the present motor drive apparatus when a reactor current has a positive maximum or minimum value the control circuit controls the voltage converter to switch to provide the up converting operation.

Furthermore in the present motor drive apparatus when a reactor current has a negative maximum or minimum value the control circuit controls the voltage converter to switch to provide the down converting operation.

Furthermore the present motor drive apparatus further includes a current sensor detecting a reactor current and from the reactor current detected by the current sensor the control circuit detects reactor current's maximum and minimum values and from the detected maximum and minimum values and a motor's mode of operation determines whether to stop switching.

Furthermore in the present motor drive apparatus when the motor operates in a powering mode and a reactor current has a minimum value equal to or smaller than zero the control circuit controls a voltage converter to stop it from switching to perform an up converting operation.

Furthermore in the present motor drive apparatus when the motor operates in the powering mode and a reactor current has a positive minimum value the control circuit further controls the voltage converter to switch to perform the up converting operation.

Furthermore in the present motor drive apparatus when the motor operates in a regeneration mode and a reactor current has a maximum value equal to or larger than zero the control circuit controls the voltage converter to stop it from switching to provide a down converting operation.

Furthermore in the present motor drive apparatus when the motor operates in the regeneration mode and a reactor current has a negative maximum value the control circuit further controls the voltage converter to switch to perform the down converting operation.

Furthermore in the present motor drive apparatus when the motor operates in the powering mode and a required power supply current is equal to or smaller than a positive critical current value the control circuit controls the voltage converter to stop an up converting operation. The positive critical current value is a current value of the required power supply current provided when the motor operates in the powering mode and a reactor current traverses the zero point.

Furthermore in the present motor drive apparatus when the motor operates in the powering mode and the required power supply current is larger than the positive critical current value the control circuit further controls the voltage converter to switch to perform the up converting operation.

Furthermore in the present motor drive apparatus the control circuit holds a map which represents a relationship between an up conversion ratio in the voltage converter applied when a motor in the powering mode outputs required power and the required power supply current and which includes the positive critical current value, and the control circuit is driven by a result of comparing the required power supply current with the positive critical current value included in the map to control the voltage converter to stop switching to provide an up converting operation, or to switch to perform the up converting operation.

Furthermore in the present motor drive apparatus when the motor operates in the regeneration mode and the required power supply current is equal to or larger than a negative critical current value the control circuit controls the voltage converter to stop it from switching to provide a down converting operation. The negative critical current value is a current value of the required power supply current provided when the motor operates in the regeneration mode and a reactor current traverses the zero point.

Furthermore in the present motor drive apparatus when the motor operates in the regeneration mode and the required power supply current is smaller than the negative critical current value the control circuit further controls the voltage converter to switch to perform the down converting operation.

Furthermore in the present motor drive apparatus the control circuit holds a map which represents a relationship between a down conversion ratio in the voltage converter applied when the motor in the regeneration mode outputs required power and the required power supply current and which includes the negative critical current value, and the control circuit is driven by a result of comparing the required power supply current with the negative critical current value included in the map to control the voltage converter to stop switching to provide the down converting operation, or to switch to perform the down converting operation.

Furthermore in the present motor drive apparatus when the motor operates in the powering mode and a required torque is equal to or smaller than a positive critical torque value the control circuit controls the voltage converter to stop it from switching to provide an up converting operation. The positive critical torque value is a torque value of the required torque provided when the motor operates in the powering mode and the reactor current traverses the zero point.

Furthermore in the present motor drive apparatus when the motor operates in the powering mode and the required torque is larger than the positive critical torque value the control circuit further controls the voltage converter to switch to provide the up converting operation.

Furthermore in the present motor drive apparatus the control circuit holds a map which represents a relationship between an up conversion ratio in the voltage converter applied when a motor in the powering mode outputs required power and the required torque and which includes the positive critical torque value, and the control circuit is driven by a result of comparing the required torque with the positive critical torque value included in the map to control the voltage converter to stop switching to provide an up converting operation, or to switch to perform the up converting operation.

Furthermore in the present motor drive apparatus when the motor operates in the regeneration mode and the required torque is equal to or larger than a negative critical torque value the control circuit controls the voltage converter to stop it from switching to provide a down converting operation. The negative critical torque value is a torque value of the required torque provided when the motor operates in the regeneration mode and a reactor current traverses the zero point.

Furthermore in the present motor drive apparatus when the motor operates in the regeneration mode and the required torque is smaller than the negative critical torque value the control circuit further controls the voltage converter to switch to perform the down converting operation.

Furthermore in the present motor drive apparatus the control circuit holds a map which represents a relationship between a down conversion ratio in the voltage converter applied when the motor in the regeneration mode outputs required power and the required torque and which includes the negative critical torque value, and the control circuit is driven by a result of comparing the required torque with the negative critical torque value included in the map to control the voltage converter to stop switching to provide the down converting operation, or to switch to perform the down converting operation.

Furthermore in the present motor drive apparatus when the motor operates in the powering mode the control circuit determines from an acceleration pedal position whether to stop switching to provide an up converting operation and when the motor operates in the regeneration mode the control circuit determines from a required torque whether to stop switching to provide a down converting operation.

Furthermore in the present motor drive apparatus when the motor operates in the powering mode and an acceleration pedal position is equal to or smaller than a critical acceleration pedal position value the control circuit controls the voltage converter to stop it from switching to provide an up converting operation. The critical acceleration pedal position value is an acceleration pedal position value provided when the motor operates in the powering mode and the reactor current traverses the zero point.

Furthermore in the present motor drive apparatus when the motor operates in the powering mode and the acceleration pedal position is larger than the critical acceleration pedal position value the control circuit further controls the voltage converter to switch to provide the up converting operation.

Furthermore in the present motor drive apparatus the control circuit holds a map which represents a relationship between an up conversion ratio in the voltage converter applied when the motor in the powering mode outputs required power and the acceleration pedal position and which includes the critical acceleration pedal position value, and the control circuit is driven by a result of comparing the acceleration pedal position with the critical acceleration pedal position value included in the map to control the voltage converter to stop switching to provide an up converting operation, or to switch to perform the up converting operation.

Furthermore in the present motor drive apparatus when the motor operates in the regeneration mode and the required torque is equal to or larger than the negative critical torque value the control circuit controls the voltage converter to stop it from switching to provide a down converting operation. The negative critical torque value is a torque value of the required torque provided when the motor operates in the regeneration mode and a reactor current traverses the zero point.

Furthermore in the present motor drive apparatus when the motor operates in the regeneration mode and the required torque is smaller than the negative critical torque value the control circuit further controls the voltage converter to switch to perform the down converting operation.

Furthermore in the present motor drive apparatus the control circuit holds a map which represents a relationship between a down conversion ratio in the voltage converter applied when the motor in the regeneration mode outputs required power and the required torque and which includes the negative critical torque value, and the control circuit is driven by a result of comparing the required torque with the negative critical torque value included in the map to control the voltage converter to stop switching to provide the down converting operation, or to switch to perform the down converting operation.

Furthermore in the motor drive apparatus the control circuit makes a decision from an acceleration pedal position of a vehicle having the motor drive apparatus mounted therein, a mode of operation of the motor, and a power supply current required for the motor to output required power as to whether to stop switching and in accordance with the decision controls the voltage converter to switch to perform an up converting operation or to stop it from switching to provide a down converting operation.

Furthermore in the present motor drive apparatus when the motor operates in the powering mode the control circuit determines from an acceleration pedal position whether to stop switching to provide an up converting operation and when the motor operates in the regeneration mode the control circuit determines from a required power supply current whether to stop switching to provide a down converting operation.

Furthermore in the present motor drive apparatus when the motor operates in the powering mode and an acceleration pedal position is equal to or smaller than the critical acceleration pedal position value the control circuit controls the voltage converter to stop it from switching to provide an up converting operation. The critical acceleration pedal position value is an acceleration pedal position value provided when the motor operates in the powering mode and the reactor current traverses the zero point.

Furthermore in the present motor drive apparatus when the motor operates in the powering mode and the acceleration pedal position is larger than the critical acceleration pedal position value the control circuit further controls the voltage converter to switch to provide the up converting operation.

Furthermore in the present motor drive apparatus the control circuit holds a map which represents a relationship between an up conversion ratio in the voltage converter applied when the motor in the powering mode outputs required power and the acceleration pedal position and which includes the critical acceleration pedal position value, and the control circuit is driven by a result of comparing the acceleration pedal position with the critical acceleration pedal position value included in the map to control the voltage converter to stop switching to provide an up converting operation, or to switch to perform the up converting operation.

Furthermore in the present motor drive apparatus when the motor operates in the regeneration mode and the required power supply current is equal to or larger than the negative critical current value the control circuit controls the voltage converter to stop it from switching to provide a down converting operation. The negative critical current value is a current value of the required power supply current provided when the motor operates in the regeneration mode and a reactor current traverses the zero point.

Furthermore in the present motor drive apparatus when the motor operates in the regeneration mode and the required power supply current is smaller than the negative critical current value the control circuit further controls the voltage converter to switch to perform the down converting operation.

Furthermore in the present motor drive apparatus the control circuit holds a map which represents a relationship between a down conversion ratio in the voltage converter applied when the motor in the regeneration mode outputs required power and the required power supply current and which includes the negative critical current value, and the control circuit is driven by a result of comparing the required power supply current with the negative critical current value included in the map to control the voltage converter to stop switching to provide the down converting operation, or to switch to perform the down converting operation.

The present invention provides a program including a first step including a first substep of detecting a reactor current's maximum and minimum values, a second substep of determining that the reactor current traverses the zero point when the reactor current's maximum and minimum values are different in polarity, and a third substep of determining that the reactor current does not traverse the zero point when the reactor current's maximum and minimum values are identical in polarity. Furthermore, the program includes a second step including after the second substep a fourth substep of detecting a power supply current input to and output from a power supply, a fifth substep of controlling a voltage converter to stop it from switching and thus performing an up converting operation when the power supply current flows from the power supply to the voltage converter, and a sixth substep of controlling the voltage converter to stop it from switching to perform a down converting operation when the power supply current flows from the voltage converter to the power supply.

Furthermore the present program causes a computer to further perform a third step of controlling the voltage converter to switch to perform an up or down converting operation when the reactor current does not traverse the zero point.

Furthermore in the present program the third step includes after the third substep a seventh substep of controlling the voltage converter to switch and thus perform an up converting operation when the reactor current's maximum or minimum value is positive and an eighth substep of controlling the voltage converter to switch and thus perform a down converting operation when the reactor current's maximum or minimum value is negative.

Furthermore the present program includes a first step including a first substep of detecting a reactor current's maximum and minimum values, a second substep of making a decision when a motor operates in a powering mode and the reactor current's minimum value is equal to or smaller than zero that in the motor's powering mode the reactor current traverses the zero point, a third substep of making a decision when the motor operates in a regeneration mode and the reactor current's maximum value is equal to or larger than zero that in the motor's regeneration mode the reactor current traverses the zero point, a fourth substep of making a decision when the motor operates in the powering mode and the reactor current's maximum value is larger than zero that in the motor's powering mode the reactor current does not traverse the zero point, and a fifth substep of making a decision when the motor operates in the regeneration mode and the reactor current's maximum value is smaller than zero that in the motor's regeneration mode the reactor current does not traverse the zero point. Furthermore the program includes a second step including after the second substep a sixth substep of controlling the voltage converter to stop it from switching and thus performing an up converting operation, and after the third substep a seventh substep of controlling the voltage converter to stop it from switching and thus performing a down converting operation.

Furthermore the present program causes a computer to further perform a third step of controlling the voltage converter to switch and thus perform an up or down converting operation when the reactor current does not traverse the zero point.

Furthermore the program includes a third step including after the fourth substep an eighth substep of controlling the voltage converter to switch and thus perform an up converting operation, and after the fifth substep a ninth substep of controlling the voltage converter to switch and thus perform a down converting operation.

Furthermore the present program includes a first step including a first substep of determining a power supply current required for a motor to output required power, a second substep of making a decision when the motor operates in a powering mode and the required power supply current is equal to or smaller than a positive critical current value that in the motor's powering mode a reactor current traverses the zero point, a third substep of making a decision when the motor operates in a regeneration mode and the required power supply current is equal to or larger than a negative critical current value that in the motor's regeneration mode the reactor current traverses the zero point, a fourth substep of making a decision when the motor operates in the powering mode and the required power supply current is larger than positive critical current value that in the motor's powering mode the reactor current does not traverse the zero point, and a fifth substep of making a decision when the motor operates in the regeneration mode and the required power supply current is smaller than the negative critical current value that in the motor's regeneration mode the reactor current does not traverse the zero point. Furthermore the program includes a second step including after the second substep a sixth substep of controlling the voltage converter to stop it from switching and thus performing an up converting operation, and after the third substep a seventh substep of controlling the voltage converter to stop it from switching and thus performing a down converting operation. The positive critical current value is a current value of the required power supply current provided when the motor operates in the powering mode and the reactor current traverses the zero point and the negative critical current value is a current value of the required power supply current provided when the motor operates in the regeneration mode and the reactor current traverses the zero point.

Furthermore the present program causes a computer to further perform a third step of controlling the voltage converter to switch and thus perform an up or down converting operation when the reactor current does not traverse the zero point.

Furthermore the program includes a third step including after the fourth substep an eighth substep of controlling the voltage converter to switch and thus perform an up converting operation, and after the fifth substep a ninth substep of controlling the voltage converter to switch and thus perform a down converting operation.

Furthermore the present program includes a first step including a first substep of receiving a motor's required torque, a second substep of making a decision when the motor operates in a powering mode and the required torque is equal to or smaller than a positive critical torque value that in the motor's powering mode a reactor current traverses the zero point, a third substep of making a decision when the motor operates in a regeneration mode and the required torque is equal to or larger than a negative critical torque value that in the motor's regeneration mode the reactor current traverses the zero point, a fourth substep of making a decision when the motor operates in the powering mode and the required torque is larger than positive critical torque value that in the motor's powering mode the reactor current does not traverse the zero point, and a fifth substep of making a decision when the motor operates in the regeneration mode and the required torque is smaller than the negative critical torque value that in the motor's regeneration mode the reactor current does not traverse the zero point. Furthermore the program includes a second step including after the second substep a sixth substep of controlling the voltage converter to stop it from switching and thus performing an up converting operation, and after the third substep a seventh substep of controlling the voltage converter to stop it from switching and thus performing a down converting operation. The positive critical torque value is a torque value of the required torque provided when the motor operates in the powering mode and the reactor current traverses the zero point and the negative critical torque value is a torque value of the required torque provided when the motor operates in the regeneration mode and the reactor current traverses the zero point.

Furthermore the present program causes a computer to further perform a third step of controlling the voltage converter to switch and thus perform an up or down converting operation when the reactor current does not traverse the zero point.

Furthermore the program includes a third step including after the fourth substep an eighth substep of controlling the voltage converter to switch and thus perform an up converting operation, and after the fifth substep a ninth substep of controlling the voltage converter to switch and thus perform a down converting operation.

Furthermore the present program includes a first step including a first substep of receiving a vehicle's acceleration pedal position, a second substep of determining a power supply current required for a motor to output required power, a third substep of making a decision when the motor operates in a powering mode and the acceleration pedal position is equal to or smaller than a critical acceleration pedal position value that in the motor's powering mode a reactor current traverses the zero point, a fourth substep of making a decision when the motor operates in a regeneration mode and the required power supply current is equal to or larger than a negative critical current value that in the motor's regeneration mode the reactor current traverses the zero point, a fifth substep of making a decision when the motor operates in the powering mode and the acceleration pedal position is larger than critical acceleration pedal position value that in the motor's powering mode the reactor current does not traverse the zero point, and a sixth substep of making a decision when the motor operates in the regeneration mode and the required power supply current is smaller than the negative critical current value that in the motor's regeneration mode the reactor current does not traverse the zero point. Furthermore the program includes a second step including after the third substep a seventh substep of controlling the voltage converter to stop it from switching and thus performing an up converting operation, and after the fourth substep an eighth substep of controlling the voltage converter to stop it from switching and thus performing a down converting operation. The critical acceleration pedal position value is a value of an acceleration pedal position provided when the motor operates in the powering mode and the reactor current traverses the zero point and the negative critical current value is a current value of the required power supply current provided when the motor operates in the regeneration mode and the reactor current traverses the zero point.

Furthermore the present program causes a computer to further perform a third step of controlling the voltage converter to switch and thus perform an up or down converting operation when the reactor current does not traverse the zero point.

Furthermore the program includes a third step including after the fifth substep a ninth substep of controlling the voltage converter to switch and thus perform an up converting operation, and after the sixth substep a tenth substep of controlling the voltage converter to switch and thus perform a down converting operation.

Furthermore the present program includes a first step including a first substep of receiving a vehicle's acceleration pedal position, a second substep of receiving a motor's required torque, a third substep of making a decision when the motor operates in a powering mode and the acceleration pedal position is equal to or smaller than the critical acceleration pedal position value that in the motor's powering mode a reactor current traverses the zero point, a fourth substep of making a decision when the motor operates in a regeneration mode and the required torque is equal to or larger than a negative critical torque value that in the motor's regeneration mode the reactor current traverses the zero point, a fifth substep of making a decision when the motor operates in the powering mode and the acceleration pedal position is larger than the critical acceleration pedal position value that in the motor's powering mode the reactor current does not traverse the zero point, and a sixth substep of making a decision when the motor operates in the regeneration mode and the required torque is smaller than the negative critical torque value that in the motor's regeneration mode the reactor current does not traverse the zero point. Furthermore the program includes a second step including after the third substep a seventh substep of controlling the voltage converter to stop it from switching and thus performing an up converting operation, and after the fourth substep an eighth substep of controlling the voltage converter to stop it from switching and thus performing a down converting operation. The critical acceleration pedal position value is a value of an acceleration pedal position provided when the motor operates in the powering mode and the reactor current traverses the zero point and the negative critical torque value is a torque value of the required torque provided when the motor operates in the regeneration mode and the reactor current traverses the zero point.

Furthermore the present program causes a computer to further perform a third step of controlling the voltage converter to switch and thus perform an up or down converting operation when the reactor current does not traverse the zero point.

Furthermore the program includes a third step including after the fifth substep a ninth substep of controlling the voltage converter to switch and thus perform an up converting operation, and after the sixth substep a tenth substep of controlling the voltage converter to switch and thus perform a down converting operation.

Although the present invention has been described and illustrated in detail, it is clearly understood that the same is by way of illustration and example only and is not to be taken by way of limitation, the spirit and scope of the present invention being limited only by the terms of the appended claims and intended to encompass any modifications/variations in a sense and range equivalent to the claims.

INDUSTRIAL APPLICABILITY

The present invention is applied to motor drive apparatuses capable of reducing switching loss. Furthermore the present invention is applied to vehicles having such motor drive apparatus mounted therein. Furthermore the present invention is applied to computer readable storage media having a program stored therein to cause a computer to control voltage conversion to provide for reduced switching loss.

The invention claimed is:

1. A motor drive apparatus comprising:
   an inverter driving a motor;
   a voltage converter including a switching element and a reactor and having said switching element switched to convert a DC voltage between a power supply and said inverter; and
   a control circuit controlling said voltage converter to stop said switching element from switching when said reactor's current traverses a zero point.

2. The motor drive apparatus of claim 1, wherein said control circuit makes a decision from a power supply current input to and output from said power supply and maximum and minimum values of said reactor's current as to whether to stop said switching element from switching and is driven by said decision to control said voltage converter to stop said switching element from switching to perform an up or down converting operation.

3. The motor drive apparatus of claim 2, further comprising:
   a first current sensor detecting said power supply current; and
   a second current sensor detecting said reactor's current, wherein from said reactor's current detected by said second current sensor said control circuit detects maximum and minimum values of said reactor's current and makes a decision from said maximum and minimum values detected and a power supply current detected by said first current sensor as to whether to stop said switching element from switching.

4. The motor drive apparatus of claim 2, wherein when said maximum and minimum values are different in polarity and said power supply current flows from said power supply to said voltage converter said control circuit controls said voltage converter to stop said up converting operation.

5. The motor drive apparatus of claim 2, wherein when said maximum and minimum values are different in polarity and said power supply current flows from said voltage converter to said power supply said control circuit controls said voltage converter to stop said down converting operation.

6. The motor drive apparatus of claim 1, wherein said control circuit makes a decision from a current input to and output from said voltage converter as to whether to stop said switching element from switching and is driven by said decision to control said voltage converter to stop said switching element from switching.

7. The motor drive apparatus of claim 1, wherein while said reactor's current does not traverse said zero point said control circuit further controls said voltage converter to have said switching element switched to perform an up or down converting operation.

8. The motor drive apparatus of claim 1, wherein said control circuit makes a decision from a mode of operation of said motor and maximum and minimum values of said reactor's current as to whether to stop said switching element from switching and is driven by said decision to control said voltage converter to stop said switching element from switching to perform an up or down converting operation.

9. The motor drive apparatus of claim 1, wherein said control circuit makes a decision from a mode of operation of said motor and a power supply current required for said motor to output required power as to whether to stop said switching element from switching and is driven by said decision to control said voltage converter to stop said switching element from switching to perform an up or down converting operation.

10. The motor drive apparatus of claim 1, wherein said control circuit makes a decision from a power supply current required for said motor to output required power as to whether to stop said switching element from switching and when said power supply current required is zero said control circuit controls said voltage converter to stop said switching element from switching.

11. The motor drive apparatus of claim 1, wherein said control circuit makes a decision from a mode of operation of said motor and a torque required for said motor as to whether to stop said switching element from switching and is driven by said decision to control said voltage converter to stop said switching element from switching to perform an up or down converting operation.

12. The motor drive apparatus of claim 1, wherein said control circuit makes a decision from an acceleration pedal position of a vehicle having the motor drive apparatus mounted therein, a mode of operation of said motor, and a torque required for said motor as to whether to stop said switching element from switching and is driven by said decision to control said voltage converter to stop said switching element from switching to perform an up or down converting operation.

13. A motor drive apparatus comprising:
a drive device driving a motor;
a power generation device generating power;
a power generation drive device driving said power generation device;
a voltage converter including a switching element and a reactor and having said switching element switched to convert DC voltage between a power supply, and said drive device, said power generation device and said power generation drive device; and
a control circuit controlling said voltage converter to stop said switching element from switching while an amount of power supplied via said voltage converter from said drive device, said power generation device and said power generation drive device toward said power supply to charge said power supply is smaller than a power loss value in said voltage converter.

14. The motor drive apparatus of claim 13, wherein said amount of power charging said power supply is determined by a load command of said drive device, power consumed by said power generation drive device, and power generated by said power generation device.

15. A motor drive apparatus comprising:
a drive device driving a motor;
a power generation device generating power;
a power generation drive device driving said power generation device;
a voltage converter including a switching element and a reactor and having said switching element switched to convert DC voltage between a power supply, and said drive device, said power generation device and said power generation drive device; and
a control circuit controlling said voltage converter to stop said switching element from switching while an amount of a current supplied via said voltage converter from said drive device, said power generation device and said power generation drive device toward said power supply to charge said power supply is smaller than a current loss value in said voltage converter.

16. The motor drive apparatus of claim 15, further comprising a current sensor detecting said amount of current charging said power supply.

17. A vehicle comprising:
a wheel;
a motor driving said wheel; and
the motor drive apparatus of claim 1 driving said motor.

18. A computer readable storage medium having a program stored therein for causing a computer to control voltage conversion between a power supply and a drive device driving a motor, said program causing the computer to execute:
a first step of making a decision as to whether a current flowing through a reactor included in a voltage converter effecting said voltage conversion traverses a zero point; and
when said current traverses said zero point, a second step of controlling said voltage converter to stop a switching element included in said voltage converter from switching while said current varies while traversing said zero point.

19. A computer readable storage medium having a program recorded therein for causing a computer to control voltage conversion in a motor drive apparatus, wherein:
said motor drive apparatus includes
a drive device driving a motor,
a power generation device generating power,
a power generation drive device driving said power generation device, and
a voltage converter converting voltage between a power supply, and said drive device, said power generation device and said power generation drive device; and
said program causes a computer to execute
a first step of making a decision as to whether an amount of power supplied from said drive device, said power generation device and said power generation drive device toward said power supply to charge said power supply is smaller than a power loss value in said voltage converter, and for said amount of power smaller than said power loss value, a second step of controlling said voltage converter to stop a switching element included in said voltage converter from switching while said amount of power is smaller than said power loss value.

20. A computer readable storage medium having a program recorded therein for causing a computer to control voltage conversion in a motor drive apparatus, wherein:

said motor drive apparatus includes a drive device driving a motor, a power generation device generating power, a power generation drive device driving said power generation device, and a voltage converter converting voltage between a power supply, and said drive device, said power generation device and said power generation drive device; and said program causes a computer to execute a first step of making a decision as to whether an amount of a current supplied from said drive device, said power generation device and said power generation drive device toward said power supply to charge said power supply is smaller than a current loss value in said voltage converter, and for said amount of the current smaller than said current loss value, a second step of controlling said voltage converter to stop a switching element included in said voltage converter from switching while said amount of the current is smaller than said current loss value.

21. A motor drive apparatus comprising:

a drive device driving a motor;

a voltage converter including a switching element and a reactor and having said switching element switched to convert a voltage between a power supply and said drive device; and a control circuit controlling said voltage converter to stop said switching element from switching when said reactor's current traverses a zero point while said current varies.

* * * * *